(12) United States Patent
Bolton et al.

(10) Patent No.: US 9,382,423 B2
(45) Date of Patent: Jul. 5, 2016

(54) CONTINUOUS PROCESS FOR FRACTIONING, COMBINATION, AND RECOMBINATION OF ASPHALT COMPONENTS FOR PELLETIZATION AND PACKAGING OF ASPHALT AND ASPHALT-CONTAINING PRODUCTS

(75) Inventors: John Bolton, Eagle Rock, VA (US); Roger B. Wright, Staunton, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 577 days.

(21) Appl. No.: 13/643,423

(22) PCT Filed: Apr. 26, 2011

(86) PCT No.: PCT/US2011/033960
§ 371 (c)(1),
(2), (4) Date: Oct. 25, 2012

(87) PCT Pub. No.: WO2011/139698
PCT Pub. Date: Nov. 10, 2011

(65) Prior Publication Data
US 2013/0036714 A1 Feb. 14, 2013

Related U.S. Application Data

(60) Provisional application No. 61/327,747, filed on Apr. 26, 2010.

(51) Int. Cl.
| | |
|---|---|
| C10C 3/06 | (2006.01) |
| C10C 3/08 | (2006.01) |
| C10C 3/14 | (2006.01) |
| C10C 3/16 | (2006.01) |
| C10C 1/00 | (2006.01) |
| C08L 95/00 | (2006.01) |

(52) U.S. Cl.
CPC .............. *C08L 95/00* (2013.01); *C08L 2555/40* (2013.01)

(58) Field of Classification Search
CPC .............. C10C 3/06; C10C 3/08; C10C 3/14; C10C 3/16; C10C 1/00; C10G 21/003
See application file for complete search history.

(56) References Cited

U.S. PATENT DOCUMENTS

| | | | |
|---|---|---|---|
| 3,026,568 A * | 3/1962 | Moar | ................ 264/7 |
| 3,235,483 A | 2/1966 | McCoy et al. | |
| 3,403,093 A | 9/1968 | Mills | |
| 3,847,751 A * | 11/1974 | Godino et al. | ................ 208/39 |
| 4,101,415 A * | 7/1978 | Crowley | ................ 208/45 |
| 4,428,824 A | 1/1984 | Choi et al. | |
| 4,572,781 A | 2/1986 | Krasuk et al. | |
| 4,686,028 A | 8/1987 | Van Driesen et al. | |
| 5,688,449 A | 11/1997 | Fox | |
| 6,558,462 B1 | 5/2003 | Nicholas | |
| 7,691,195 B2 * | 4/2010 | Fox | ........................ 106/281.1 |
| 2006/0288907 A1 | 12/2006 | Fox | |
| 2009/0272676 A1 | 11/2009 | Behelfer et al. | |
| 2009/0301931 A1 | 12/2009 | Koseoglu et al. | |

FOREIGN PATENT DOCUMENTS

| | | |
|---|---|---|
| JP | S5211221 A | 1/1977 |
| JP | H11152477 A | 6/1999 |
| JP | 2000063163 A | 2/2000 |
| JP | 2001192671 A | 7/2001 |
| JP | 2009526626 A | 7/2009 |
| WO | 2010025212 A1 | 3/2010 |

OTHER PUBLICATIONS

International Search Report and Written Opinion dated Oct. 6, 2011 for related PCT Appl. No. PCT/US2011/033960.
Chinese Office Action dated Mar. 25, 2014 for related U.S. PCT Application No. PCT/US2011/033960.
Office Action in related Japanese Application No. JP2013-508159, mailed Apr. 7, 2015.
Extended European Search Report in Related EP Application No. EP11777914.0, mailed Dec. 4, 2015.

* cited by examiner

*Primary Examiner* — Randy Boyer
(74) *Attorney, Agent, or Firm* — Troutman Sanders LLP; Ryan A. Schneider; Benjamin C. Wiles

(57) ABSTRACT

A continuous process for fractioning, combination, and recombination of asphalt sources into asphalt components for pelletization of asphalt and asphalt-containing products such that the pellets formed are generally uniform in dimension, freely flowing, free from agglomeration, and the pelletized asphalt is packaged, and preferably compatibly packaged, for additional processing and applications.

29 Claims, 25 Drawing Sheets

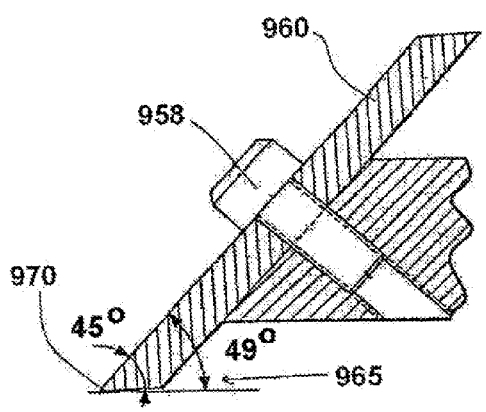
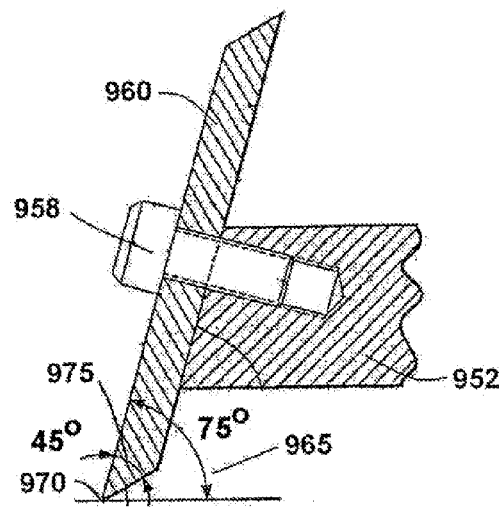
FIG. 17a
FIG. 17b
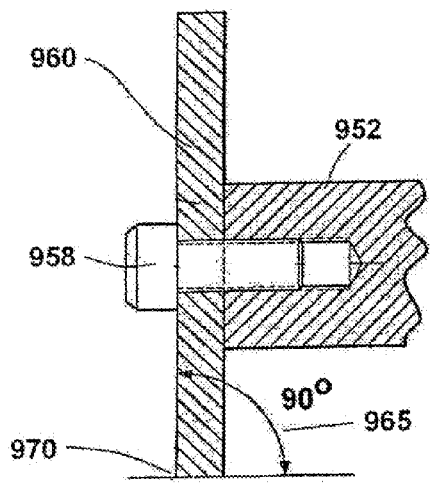
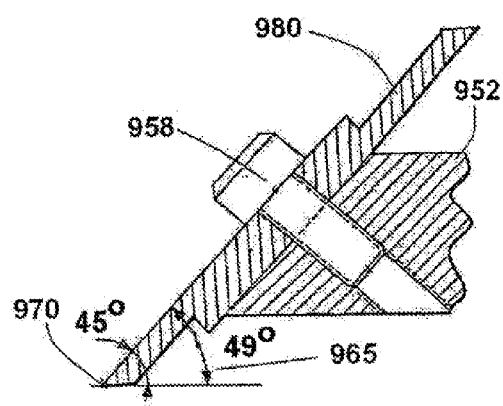
FIG. 17c
FIG. 17d

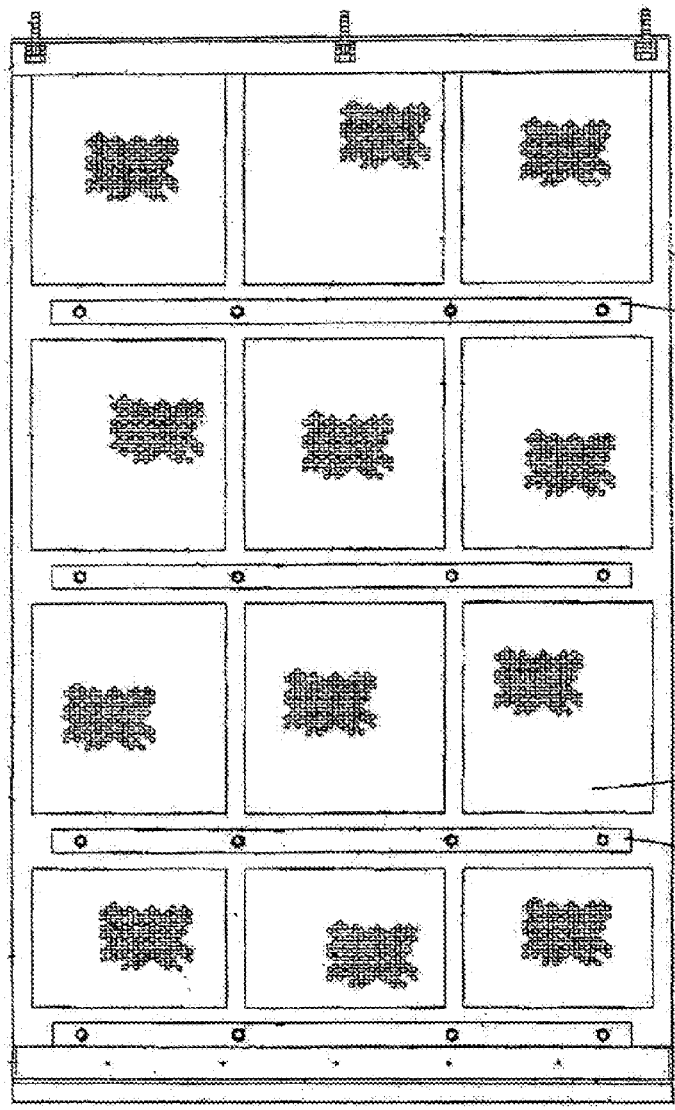
FIG. 21
FIG. 22

CONTINUOUS PROCESS FOR FRACTIONING, COMBINATION, AND RECOMBINATION OF ASPHALT COMPONENTS FOR PELLETIZATION AND PACKAGING OF ASPHALT AND ASPHALT-CONTAINING PRODUCTS

CROSS-REFERENCE TO RELATED APPLICATION

This application claims the benefit of priority to U.S. Provisional Application No. 61/327,747, entitled "Continuous Process for Fractioning, Combination, and Recombination of Asphalt Components for Pelletization and Packaging of Asphalt and Asphalt-Containing Products," and filed on 26 Apr. 2010, which is hereby incorporated by reference in its entirety herein.

BACKGROUND OF THE INVENTION

1. Field of the Invention

The present invention relates generally to a continuous process for fractioning, combining, and recombining asphalt components for pelletization of asphalt and asphalt-containing products such that the pellets formed are generally uniform in dimension, freely flowing, free from agglomeration, and the pelletized asphalt is packaged, and preferably compatibly packaged, for additional processing and applications.

2. Description of the Prior Art

Pelletization equipment and its use following extrusion processing has been introduced and/or utilized in applications by the assignee for many years as is exemplified by prior art disclosures including U.S. Pat. Nos. 4,123,207; 4,251,198; 4,500,271; 4,621,996; 4,728,176; 4,888,990; 5,059,103; 5,403,176; 5,624,688; 6,332,765; 6,551,087; 6,793,473; 6,824,371; 6,925,741; 7,033,152; 7,172,397; US Patent Application Publication Nos. 20050220920, 20060165834; German Patents and Applications including DE 32 43 332, DE 37 02 841, DE 87 01 490, DE 196 42 389, DE 196 51 354, DE 296 24 638; World Patent Application Publications WO2006/087179, WO2006/081140, WO2006/087179, WO2007/064580, WO2007/089497, WO2007/142783, and WO2009/020475; and European Patents including EP 1 218 156 and EP 1 582 327. These patents and applications are all owned by the assignee and are included herein by way of reference in their entirety.

Similarly, dryer equipment has been introduced and used in applications following extrusion and pelletization for many years by the assignee as demonstrated in, for example, U.S. Pat. Nos. 3,458,045; 4,218,323; 4,447,325; 4,565,015; 4,896,435; 5,265,347; 5,638,606; 6,138,375; 6,237,244; 6,739,457; 6,807,748; 7,024,794; 7,172,397; US Patent Application Publication No. 20060130353; World Patent Application Publication Nos. WO2006/069022, WO2006/127698, WO2008/113560, WO2008/147514, and WO2009/032745; German Patents and Applications including DE 19 53 741, DE 28 19 443, DE 43 30 078, DE 93 20 744, DE 197 08 988; and European Patents including EP 1 033 545, EP 1 602 888, EP 1 647 788, EP 1 650 516. These patents and applications are all owned by the assignee and are included herein by way of reference in their entirety.

United Kingdom Patent No. GB 252,802 discloses a process by which natural asphalt including Trimidad pitch lake asphalt is dug from the source, heated directly or indirectly by steam heat to reduce it to a liquid and transferred from the stills to drums for cooling. Alternatively, this material identified as epure can be formed into block, briquettes, or pulverized for further processing and application. The heating reduces the moisture content with melting at a temperature from 300° F. to 350° F. leaving a composition for the Trimidad epure of approximately 56% bitumen and approximately 44% of earthy matter. Similarly United Kingdom Patent No. 1897 5439 discloses rinsing of the lake asphalt to remove soluble salts and non-bituminous organic matters. This rinsed asphalt is warmed by passing steam therethrough and to it is added a heavy oil as well as crushed and pulverized stone and limestone material from which combination can be made into blocks, tiles, and the like.

French Patent No. 1,519,436 discloses packaging wet granular asphalt in a bag such that the controlled amount of water present with a small amount of surfactant is sufficient to maintain the pellets in a free-flowing manner.

U.S. Pat. No. 5,688,449 discloses a method of uniformly coating an extruded plastic pellet using a binder applied to the surface of the pellet to which is adhered an additive, and more specifically to use as an additive that is an anti-blocking agent. The document remains silent regarding a uniform coating applied to asphalt and asphalt-containing pellets. In addition, the patent discloses equipment for use in batch processes wherein the pellets are placed in a rotatable drum in one portion onto which is poured the adhesive binder and subsequent additive but remains silent as to a method by which a continuous flow of pellets is uniformly coated with adhesive binder to which is continuously and uniformly applied the additive component with subsequent drying.

German Patent No. DE 44 07 822 similarly discloses a hardenable coating formed by applying a binding agent onto the damp surface of an asphalt granule or pellet and allowing the binder to dry and harden. German Patent Application Publication No. DE 195 33 011 modifies this concept by adding the binder when dry to pulverulent asphalt to form a granule or pellet that hardens on moisturization.

Mineral-coated pellets can be formed by spraying molten asphalt in a downward direction into an upward flow of air carrying fine dust particles of the minerals to be coated on the surface as disclosed in U.S. Pat. No. 3,026,568. Limestone, clay, Portland cement, mineral flour, and diatomaceous earth are cited as fine mineral powders for directly coating on the sprayed asphalt material.

Sulfur-coated pellets are disclosed in U.S. Pat. No. 4,769,288 wherein pellets are described as being rolled into shape, cooled in a controlled fashion, and subsequently dipped in molten sulfur. Use of a binder is also disclosed. The patent remains silent regarding other pelletization processes.

Geopolymers are disclosed in European Patent No. EP 0 153 097; and U.S. Pat. Nos. 4,028,454; 4,349,386; 4,472,199; 4,509,985; 4,859,367; 4,888,311; 5,288,321; 5,342,595; 5,349,118; 5,352,427; 5,539,140; and 5,798,307. These documents remain silent as to their usefulness in asphalt and asphalt composites and formulations.

A coated hot melt adhesive pellet is disclosed in U.S. Pat. No. 6,120,899 wherein the coated pellet contains from 1% to 30% of a substantially continuous non-tacky coating material. The document remains silent as to the use of such coatings on materials that are not hot melt adhesive compositions. More specifically, the instant patent does not disclose that the coating material is compatible with the remaining pellet composition on melting.

U.S. Pat. No. 4,769,288 further discloses use of extrusion to make the asphalt pellets, typically as cylinder, but remains silent as to the importance of other under-fluid pelletization processes as well as the need for controlled cooling of the extrudate to insure sufficient viscosity for the pelletization process.

Asphalt components in a compatible and meltable bag are disclosed in U.S. Pat. No. 6,358,621 wherein the polymeric bag mixes into the granules upon melting. This document remains silent as to the use of fractioning, combination, and recombination of asphalt components in pellets to prevent the coalescence of the granules on standing in the packaging.

Pavement patching including the Güssasphalt or hot mix asphalt and the Viper patch method are discussed in U.S. Pat. No. 6,362,257 wherein the former concept suffers from having poor flexibility at low temperatures and the Viper method contains large percentages of aggregate and thus is expensive to ship. A process is disclosed whereby a lightweight aggregate is combined with an air-blown asphalt binder containing additional polymers for additional structural support.

U.S. Pat. Nos. 5,513,443 and 6,164,809 disclose the use of rotating drums of various designs for drying the asphalt materials. This concept is further advanced by U.S. Pat. No. 6,440,205 wherein it is disclosed that rotating drums can be used to make pellets and coated pellets. Use of high levels of sulfur in the disclosure necessitate the control of problematic hydrogen sulfide generation which is overcome by controlled cooling of the process wherein the coolant is not in direct contact with the pelleted material as disclosed herein. These documents remain silent regarding the use of extrusion processes as well as the use of underfluid pelletization processes with asphalt. A novel horizontal mixer for use in asphalt and asphalt formulations is similarly disclosed in U.S. Pat. No. 4,140,402.

Underwater pelletization following extrusion is disclosed in U.S. Pat. No. 6,679,941 for asphalt materials. Cooling of the melt to form pellets is discussed but the document remains silent as to cooling in upstream processes. The document further discloses a continuously cooled belt typically used to produce pastilles of asphalt and the like. No disclosure of fractioning, combination, and recombination of asphalt components forming free-flowing pellets and thus to prevent agglomeration is provided in the instant patent.

World Patent Application Publication No. WO/2007/064580 discloses the use of controlled cooling processes to form asphalt pellets but remains silent as to the methods for fractioning, combining, and recombining asphalt components to form free-flowing pellets and thus to prevent undue agglomeration of the pellets as they warm toward ambient temperatures on removal from the cooling process water.

Swiss Patent CH 327640 and U.S. Pat. Nos. 4,931,231; 6,331,245; 6,357,526; and 6,361,682 disclose prilling, spraying, or sputtering concepts as a way for producing discrete pellets. U.S. Pat. No. 6,824,600 discloses formation of slates, pastilles, and pellets wherein it is stated that pellets are formed by conventional pelletizer. U.S. Pat. No. 7,101,499 discloses the use of a water jet to impact a stream of asphalt resulting in the formation of pellets. The water jet can be atmospheric or underwater as disclosed.

Compatible bagging for adhesives is disclosed in US Reissue Patent No. RE36,177 wherein the bag is melted with the contents and is applied as a component of the adhesive formulation. The components in the bag can be a single uniform mass or a collection of particles, granules, pellets, and the like. Adhesives of the natural and bitumen group as disclosed can contain asphalt, shellac, rosin and its esters but the document remains silent as to the compatible bagging of asphalt and similar asphalt-containing formulations that are not for adhesive applications.

United Kingdom Patent No. GB 2,156,392 discloses compatible polyethylene bags into which is poured previously cooled asphalt to maintain an appropriate viscosity. The bags are cooled externally by water as a bath and/or as a spray and the packaged asphalt material can be melted directly for use in applications. The patent remains silent as to extrusion processes utilizing controlled cooling as well as underwater pelletizing to form individual pellets or to the fractioning, combination, and recombination of asphalt components to form free-flowing pellets that are contained in the compatible bags. U.S. Pat. No. 3,366,233 extends this concept to multiple layer bags that are compatible with the asphalt upon melting and U.S. Pat. No. 5,254,385 discloses a similar concept such that the size of the packaging is such that it may be used as an encapsulated asphalt even suggesting the size is sufficiently small to represent a granular material.

U.S. Pat. No. 4,450,962 discloses a closable two-layer tube in which the inner layer is compatible with asphalt on melting and the outer and separate layer is readily disposable. U.S. Pat. Nos. 619,810; 4,318,475; 4,335,560; 5,878,794; and 6,003,567 disclose use of bags as liners for containing the asphalt wherein the bags in the early patents are not compatible with the asphalt and wherein the liners are not melted at the temperature at which the fluid asphalt is introduced into the bag liner. The more recent patents cited prefer the bag to be compatible when molten with the asphalt contents on application. These patents remain silent as to continuous processes including fractioning, combination, and recombination of asphalt pellets to produce free-flowing pelletized asphalt contained in compatible bags.

A process is disclosed in US Patent Application Publication No. 20060288907 for combining tacky pellets, optionally coated, with flowable fine material such that the flowable material is of sufficient quantity to maintain the separation of the tacky pellets thus avoiding agglomeration. The tacky pellets can be prepared by underwater pelletization or prilling as disclosed and can be coated with one or more layers such that the tacky pellets are rendered sufficiently non-tacky. The pellets according to at least one embodiment can be effectively distributed in the flowable fines material with vibration. The document remains silent as to the fractioning, combination, and recombination of asphalt components to form free-flowing pellets. It is further silent to the need for controlled cooling of the extrusion process prior to underwater pelletization, the necessary modifications of the equipment to facilitate the non-agglomerating transport of the asphalt pellets into and through it, and the optional use of compatible packaging material such that it can be melted with the asphalt without detrimental effect in the product applications. US Patent Application Publication No. 20080224345 further discloses the use of these packaged mixtures of pellets and flowable fines for such uses as asphalt patching, curbing, and the like.

United Kingdom Patent No. GB 2,152,941 discloses a process by which Trimidad epure is packaged with higher melting material with a particle size smaller than that of the epure such that the granulates of asphalt do not agglomerate with each other. This is particularly advantageous when the packages are stacked and compressive forces increase on the lowest bag as the stack increases. The epure is stated as being less than 25 mm and the re-cake preventing material is disclosed as being less than 2.5 mm. It is further stipulated that the material is compatible with asphalt and has a volume that is 0.5 to 2.0 times the void volume of the granulated Trimidad epure. Included with the re-cake preventing material is gilsonite, cracked asphalt pitch, ethylene-vinyl acetate copolymer, ethylene-ethyl acrylate copolymer, polyolefin, limestone powder, Portland cement, fly ash, slaked lime, kaolin, aerosil, and mixtures of two or more of these materials. Also disclosed is Trimidad Epure Z which is 12 to 13 mm Trimidad Epure combined with 8% diatomaceous earth as well as Trimidad Pulver which is a 50:50 blend of pulverulent Trimidad Epure and paving stone powder both of which were not deemed satisfactory for stable packaging.

Similarly, U.S. Pat. No. 5,728,202 discloses the combination of bitumenic materials obtained from tar sands with gilsonite to emulate the properties of Trimidad Lake Asphalt. U.S. Pat. No. 6,588,974 discloses the combination of bitumen and Fischer-Tropsch microcrystalline waxes such that upon application, the heat released by the crystallizing component assists the uniform flow of the preparation applied to road surfaces for enhanced sealing. U.S. Pat. No. 4,155,833 discloses processes whereby the microcrystalline wax content of asphaltenes is actually reduced to provide enhancement of the asphalt properties.

Canadian Patent No. 426595 discloses the combination of asphalt and preferably unsaturated organic oils to make a more elastic asphalt composition that can be combined with filler including fibrous material and subsequently can be cross-linked. Extending this concept, incorporation of rubber, including latex and recycled tires, into pulverulent asphalt such that sites of unsaturation in the rubber can be cross-linked is disclosed in United Kingdom Patent No. GB 447,416. Use of high sulfur levels, up to 7% as free sulfur or as mineral pyrites, and in association with added accelerators, in powdered Lake Asphalt or Trimidad asphalt is further disclosed for vulcanization, cross-linking, of these polymer-modified asphalts.

European Patent No. EP 0 285 865 discloses the use of bitumens and elastomers to formulate a product of specific qualities. Bitumens cited include straight-reduced asphalts, thermal asphalts, air-blown asphalts, native asphalts differentiated by mineral content, coke oven-derived tars, and residues form pyrogenous distillations. Elastomers disclosed herein include block copolymers and polymers with crystallinity. The asphalt and elastomeric components are blended together according to this disclosure to achieve the specified properties.

Use of non-volatile petroleum oils typically that are solvents for asphalts are combined with carbon blacks as disclosed in U.S. Pat. No. 3,959,006 such that the carbon black is better compatibilized with the asphalt to achieve a more uniform composition. Carbon blacks disclosed include channel black, oil furnace black, gas furnace black, detonation black, thermal plasma black, arc black, and acetylene black. This document describes the evaluation of petroleum oils or flux oils in terms of their reaction with cold fuming sulfuric acid and/or cold sulfuric acid such that first acidiffins are those that react with 85% sulfuric acid but not with cold concentrated sulfuric acid and second acidiffins are those that react with cold fuming sulfuric acid but not cold concentrated sulfuric acid. Additionally, the petroleum composition disclosed includes asphaltenes, polar compounds including nitrogen bases, and saturated hydrocarbons. Similarly, U.S. Pat. No. 7,137,305 discloses incorporation of asphalt emulsion as well as Portland cement to effect a more uniform, less porous, stabilized asphalt for use in road construction.

U.S. Pat. No. 6,927,245 discloses the use of compatibilizers to improve the interaction between the asphalt, polymer, hydrocarbon liquids, and cross-linking agents. Sulfur, sulfur-donating compounds, phenolic resins, metal oxides, as well as fatty acids and their salts are disclosed as cross-linking agents in combination with metal oxide activators and/or accelerators. The compatibilizers as disclosed can be nonpolar, polar, or a combination as necessitated by the appropriate interactions with the formulation components. Compatibility tests to determine the effectiveness of the compatibilizer for a particular formulation are further disclosed in the instant invention. This concept is further extended as disclosed in U.S. Pat. No. 6,972,047 wherein gilsonite is combined with asphalt in the presence of flux oil and various cross-linkers to improve the overall asphalt qualities and to insure compatibility of the components in the formulation thus leading to a uniform product.

U.S. Pat. Nos. 7,144,933; 7,202,290; and 7,439,286 disclose the combination of pellets containing plastomers and elastomers with pellets containing plastomer and crosslinking agent in an extrusion process with asphalt to form a cross-linkable asphalt formulation. According to the disclosure the plastomer is preferably an oxidized polyolefin, a maleated polyolefin, or an acrylic acid grafted polyolefin. Elastomers are generically described as any synthetic rubber compound. The cross-linking agent can be one of elemental sulfur, hydrocarbyl polysulfides, peroxides, and transition metals. Crosslinking accelerators are also disclosed. The patents remain silent as to the method of pelletization for the plastomer/elastomers pellets as well as the plastomer/cross-linker pellet. They are also silent as to the pelletization of the asphalt formulation on extrusion. Similar processes are disclosed in U.S. Pat. No. 6,569,925 wherein the sulfur and other accelerators and modifiers are prepared in a gel to provide further stabilization prior to introduction into the asphalt preparation.

Similarly, U.S. Pat. No. 7,303,623 discloses the pelletization of sulfur or lime in combination with asphalt-compatible binders for use in asphalt formulations. The pelletization process is generically disclosed to include an extruder, die head and die opening. It is stated that the pellet formed can be either too moist or too hot for cutting and drying and/or cooling as disclosed prior to pelletization. The patent remains silent as to the concept of pelletization under fluid immediately at the cutter head as well as to the fractioning, combination, and recombination of asphalt components to form free-flowing pellets for packaging.

Chemically modified asphalt is disclosed in U.S. Pat. No. 5,306,750 wherein asphalt is chemically linked to epoxides for enhancement of the asphalt performance. Modifications of polyoxyalkylenes to contain functional groups reactive with asphalts to effect cross-linking are disclosed in U.S. Pat. No. 7,452,930.

United Kingdom Patent No. GB 483,907 combines asphalt with natural and synthetic rubbers, latex, as well as vegetable oils, animal fats and oils, as well as fatty acids to improve the elasticity of bitumens. Use of various sulfur-containing compounds is further disclosed such that heating the asphalt or the asphalt-rubber-and/or-oil blends resulted in oxidation and addition products of the formulation leading to enhancement of properties as well as reduction of water and residual sulfur content. The sulfur compounds herein disclosed include sulfuric acid, fuming sulfuric acid, sulfur trioxide, pyrosulfuric acid, polythionic acids, persulfuric acid, sulfur sesquioxide, and sulfur heptoxide. This document also discloses bitumenic sources including asphaltic, pitch, and tar derivatives of asphalts, mineral oils, lignite-tars, coal-tars, peat-tars, shale oil, wood-tar, resin-tar, fat-tar, and bone-tars, as well as montan pitch, and residues from distillation, refining, hydrogenation, and cracking process for petroleum. Similar processes are disclosed in U.S. Pat. No. 6,228,909 wherein additional mineral acids are utilized to enhance the oxidation of the asphalt in various formulary processes.

U.S. Pat. No. 4,437,896 discloses a synthetic asphalt made with combination of gilsonite or synthetic gilsonite, also known as soft coal or flaked asphaltene residuum, to replace the asphaltene portion of asphalt and tall oils and/or tall oil pitches obtained from the destructive distillation of pine and poplar trees to replace the maltenes portion of asphalt. Modifications of natural gilsonite or uintaite are disclosed in U.S. Pat. No. 5,047,143 such that nonpolar saturated hydrocarbons are combined with uintaite to extract lower melting components essentially to form a maltene-like component. This then can be combined with the residuum from the extraction process, essentially an asphaltene, to form a synthetic asphalt.

U.S. Pat. No. 4,494,958 combines pulverulent asphaltites or oil-bearing coal, solidified petroleum composed of 25% to 75% fixed carbon resulting from the slow and progressive loss of volatiles, such as grahamite with powdered bituminous materials such as lignite. Though similar, asphaltites are differentiated from coal by their ability to be dissolved in carbon disulfide. The instant patent remains silent as to the use of these combinations as filler in asphalts or asphalt formulations or as anti-blocking agents for enhancement of the product properties. U.S. Pat. No. 3,902,914 discloses the use of oil shale fines, regular shale fines, diatomaceous earth, rhyolite fines, slate fines, in lieu of or in combination with more conventional fillers including limestone dust, asbestos, silica, flour, clay, and Portland cement. These novel filler materials in combination with asphalts used to produce asphalt cement, as disclosed, exhibit better aging and adhesion properties than with conventional materials.

U.S. Pat. No. 4,227,933 discloses the use of finely-divided particulate Trimidad Lake asphalt in combination with fine aggregate to make an essentially void-free pavement surfacing material. Use of asphalt to coat aggregate with very thin films is disclosed in U.S. Pat. No. 1,343,680 whereby foaming was found to achieve a more uniformly thin layer. These coated aggregates were used to form excellent asphalt cement as disclosed.

Mastic asphalt is disclosed in United Kingdom Patent No. GB 697,327 as a combination of finely graded mineral matter together with asphaltic cement to form a solid or semi-solid coherent mass free of voids and sufficiently fluid to be spread by means of a hand float. Asphaltic cement is disclosed herein as asphaltic bitumen, lake and natural asphalt, asphaltic resins, coal tar resins or pitches, and pitches that result from low-temperature carbonization, as well as refined natural and synthetic vegetable resins. Flux oil and combinations of these are materials are disclosed. The finely graded mineral matter is further disclosed as being any powder that does not react with asphaltic cement including limestone or siliceous powder, grit, chippings, exfoliated minerals, vermiculite, as well as fibrous materials including asbestos and wood.

U.S. Pat. No. 7,025,822 similarly discloses mastic preparations utilizing waste solids obtained from sludges including separator sludges, sludges from air flotation systems, slop oil emulsion sludges, tank bottoms, sludges from heat exchange bundles, sediment from crude oil storage tanks, clarified slurry oil tank sediments, and sludges from in-line filters, and sludges from drainage ditches in combination with asphalt materials. Incorporation of polymers and recycled asphalt pavement or "RAP" is also disclosed.

United Kingdom Patent No. GB 167,344 discloses the use of roofing felt that has completely been broken into separate fibers in combination with asphalt wherein mixing is done on the 3% to 4% dried fiber in the asphalt at a temperature between 300 and 450° F. such that the fibers are uniformly dispersed. Use of cellulosic fibers in the presence of organic bases to form asphaltic compositions that are more stable to temperature degradation is disclosed in U.S. Pat. No. 6,562,118. Such compositions are identified as fiber modified asphalt or "FMA".

U.S. Pat. No. 5,028,266 similarly discloses incorporation of fibers into bitumen. This is done by contacting the fibers in a volatile or soluble binder and incorporating this into a liquid bitumen. This formulation is then added to the bitumen such that with heat or solution the binder is removed and the fiber is uniformly and homogeneously distributed throughout the bitumen preparation.

South African Patent No. ZA 99/1678 and U.S. Pat. No. 6,558,462 disclose a stabilizer that when mixed with pelletized or powdered Trimidad Lake asphalt or polymer modified Trimidad Lake asphalt prevents coalescing of the discrete particles during storage or transport. It is further disclosed that the stabilized product can be stored in bags with which the asphalt is compatible such that the entire bag and contents can be added into the mixing process such as for road building materials. Among the stabilizers are included preferentially are clay, carbonaceous materials, silica, polymers, natural or synthetic fibers, carbon black, and charcoal. Generically the stabilizer can be any material that increases the melting point, increases the surface tension, and/or increases the softening point of the Trimidad Lake asphalt.

Separation of natural asphalt and particularly Trimidad asphalt into two or more fractions to facilitate ease of handling and transport is disclosed in United Kingdom Patent No. GB 274,540. Separation is achieved after reduction of the water content by addition of a light solvent oil such that further heat melts and dissolves the bitumen portion of the composition or approximately 55%. The bitumen solution is removed from the powdery residue and the bitumen portion can be recovered by reduction of the light solvent oil without alteration of the properties of the fractions. It is further disclosed that the separate components can be recombined without alteration of the original properties.

Solvent deasphalting is a commonly used technique to separate the undesired asphaltenes from other asphalt components in petroleum distillation processes. Conversely, the patent remains silent to solvent deasphalting that can be used to remove undesired more soluble components from the desired asphaltenes important to the asphalt industry. Various techniques, solvents and solvent combinations and their benefits are disclosed in U.S. Pat. No. 3,018,228 (extractive distillation with ethylene carbonate); U.S. Pat. No. 4,452,691 (oxygenated solvents including alcohols and hetero- and halo-modified analogs of oxygenated solvents); U.S. Pat. Nos. 4,618,413 and 4,643,821 (carbonates, thiocarbonates, and dimethyl sulfone); U.S. Pat. No. 5,346,615 (alkyl and cyclic carbonates); and U.S. Pat. No. 6,533,925 wherein the conventional solvent process is disclosed including the common solvents such as methane, ethane, propane, butane, isobutane, pentane, isopentane, neopentane, hexane, isohexane, heptane, and mono-olefinic equivalents. The process as disclosed optimizes the asphaltene separation, solvent conversion, in combination with gasification processes. U.S. Pat. No. 2,726,192 discloses the use of n-butanol, preferably in counter-current extraction to further purify the asphalt following propane solvent-deasphalting processes.

In contrast to United Kingdom Patent No. GB 252,802 hereinabove described, United Kingdom Patent No. GB 299,208 discloses the use of epure described as "natural Trimidad asphalt freed from earthy impurities". This epure is further disclosed to be elastic with a melting point between 150° and 160° C. (approximately 302° to 320° F.) but is brittle due to a high ash content. This epure is then combined with goudron, identified as a fatty asphalt with a melting point between 90° and 100° C. obtained as a distillation product mainly from Trimidad asphalt, and pitch. Asbestos fiber is added as well to confer enhanced toughness or hardness to the formulated material.

A waterproofing formulation is disclosed in United Kingdom Patent No. 320,886 in which a Trimidad type asphalt is initially heated to approximately 400° F. for approximately 18 hours to remove a relatively small amount of light naphtha by distillation. To this is added gilsonite material that has separately and similarly been heated at approximately 680° F. to remove light naphtha such that the final combination on cooling is free of lighter naphthas that are identified as detrimental to the solvent-based preparation of the invention.

United Kingdom Patent No. GB 714,091 discloses refining processes for Trimidad Lake asphalt such that the courser silica content is removed from the mineral fraction while leaving the colloidal clay component in combination with the bitumenic components. Course organic matter is removed from the melt and only silica greater than 10 microns is selectively removed as disclosed herein. The process prevents the undesirable agglomeration of the clay particles in association with organics to form lumps that prior art processes unfortunately removed. Hydraulic separation and classification is the preferred process of the instant invention. U.S. Pat. No. 2,594,929 similarly discloses the use of hydraulic separation to remove the coarse siliceous materials from the Trimidad Lake asphalt.

U.S. Pat. No. 1,948,296 discloses the preparation of asphalt from an oil containing asphalt whereby the oil is dissolved in a solvent allowing separation of the asphalt. The asphalt is then recombined with a different oil and subjected to oxidation to form a higher quality product. Propane is preferentially used to extract the petroleum oil leaving the desired asphalt residue. This asphalt residue is isolated and recombined with a fluxing oil including gas oil, light lubricating distillate, ordinary distillate, fuel oil, liquid asphalt, and road oil with heating to melt and uniformly mix the components. Oxidation is achieved by passing through the melt at elevated temperature.

Similarly, U.S. Pat. No. 2,503,175 discloses the use of petroleum-derived solvents including mineral spirits, heating oil, coal tar distillates, and solvent naphtha as well as chlorinated solvents and carbon disulfide to extract the bitumenic portion and colloidal clay allowing the sand, particularly the coarser sand components, to be removed from Trimidad asphalt. Use of water or aqueous solutions is also disclosed to facilitate the separation process.

Solvent extraction of liquid petroleum from asphalt is also disclosed in U.S. Pat. No. 2,081,473. Processes utilizing liquid sulfur dioxide to separate paraffinoid and non-paraffinoid oils are also disclosed. Polar solvent such as aniline, methyl formate, and acetone in combination with benzol are disclosed as less effective in achieving the separation.

U.S. Pat. No. 3,779,902 discloses the use of variable composition solvents to selectively extract portions from an asphaltic material such as Athabasca bitumen. Single solvents and solvent mixtures as disclosed include paraffinic or isomeric hydrocarbons, saturated substituted cycloparaffins, as well as saturated unsubstituted cycloparaffins. The solvent power of the aliphatic solvents is disclosed in comparison to that of aromatic solvents. By choice of solvents and solvent combinations, selective precipitation of asphaltenes ranging from 0% to 100% can be achieved.

The benefit of combining refined Trimidad Asphalt and refinery or petroleum asphalt to form improved more ductile asphalt concrete pavements is disclosed in U.S. Pat. No. 4,274,882. Benefit is disclosed in U.S. Pat. No. 4,428,824 whereby asphalt components are separated to yield the asphaltene material and a deasphalted oil. The oil is visbroken and subsequently recombined with the asphaltene to produce a product of lower viscosity and lower pour point. This is utilized in formulations typically requiring volumes of cutter stock such that the product disclosed significantly reduces that volume to yield a formulation of at least comparable results. Other conversion and reformulation techniques are disclosed in U.S. Pat. No. 4,514,283 wherein asphaltenes are precipitated from viscous crude oils such that the asphaltenes can be mildly thermalized, and upon recombination with the residual crude oil forms a less viscous more pumpable oil product.

Similarly U.S. Pat. Nos. 2,783,188 and 2,940,920 disclose use of paraffin and olefinic solvents in various combinations to separate the insoluble asphaltenes from the solvent-soluble portion identified as petrolenes. This document clearly discloses that separation occurs to form two immiscible or only very slightly miscible liquid phases at elevated temperature. U.S. Pat. No. 3,278,415 discloses two-phase separations in which one phase is an aliphatic solvent as above and the second phase is an aqueous phenolic solution. U.S. Pat. No. 4,211,633 discloses the use of natural gasoline fractions to effect separation such that the asphalt produced contains less heptane-soluble material.

Aqueous emulsions of asphalt are improved by addition of Trimidad asphalt, Bermudez asphalt, and montan wax as disclosed in United Kingdom Patent No. 332,591. Use of these enhanced emulsions was found to reduce decomposition on contact with porous bodies such as road stones used in paving. The enhancement is attributed to high molecular weight organic acids, identified as asphaltogens, present in these materials. United Kingdom Patent No. 462,111 extends these concepts by disclosing the use of tar pitches, oil pitches, pitches from destructive distillation of animal and vegetable matter, as well as pitches from destructive distillation of native bitumens and includes asphalts, asphaltites, coal, peat, and lignite. Asphaltites are further disclosed as gilsonite, grahamite, and glance pitch and any of these materials can be combined with any of the other materials regardless of hardness to achieve an appropriate final product emulsion. U.S. Pat. Nos. 4,073,659; 4,094,696; 4,193,815; and 4,621,108 disclose the formation of aqueous emulsions comprised of asphalt and/or gilsonite wherein some solvent can be used to better facilitate the stability of the emulsion formed.

U.S. Pat. Nos. 3,978,925; 3,983,939; and 3,993,555 discloses solvent extraction and thermal processes for recovery of oil and bitumen from tar sands. Viscous oil recovery from formations is facilitated by use of steam injections in combination with various amines as disclosed in U.S. Pat. No. 4,156,463. Comparison of effects from combinations of steam with polar solvents, nonpolar solvents, aromatic solvents, and carbon dioxide are also provided.

Asphaltenes often are problematic in wells, pipeline transport, and drilling operations and U.S. Pat. No. 5,504,063 discloses the use of alkyleneamine-fatty acid condensation reaction products in combination with polar aprotic high dielectric constant solvents to remove and inhibit such deposits. Use of acetone in combination with paraffinic, olefinic, naphthenic, and aromatic solvents for similar removal of asphaltenic deposits is disclosed in U.S. Pat. No. 2,970,958. Aliphatic ketones in combination with aromatic solvents are preferably disclosed. Similarly, the use of aromatic hydrocarbons with amines is disclosed in U.S. Pat. No. 3,914,132 and U.S. Pat. No. 4,379,490 discloses the use of amine-activated aliphatic disulfide oils to effect solution of deleterious asphaltenes.

U.S. Pat. No. 2,766,132 discloses the incorporation of polyaminoimidazolines into bituminous mixtures to enhance the wetting of the various aggregates with the bitumenic preparation. This enhancement reduces the proclivity of the aggregates, and especially carbonates, to slow leaching of the mineral content with the subsequent separation or stripping of the bitumen from the surface of the aggregate materials.

What is needed then is a process, preferably a continuous process, to form free-flowing pellets that can be packaged for further processing or use in asphalt and asphalt-containing applications such that the asphalt source materials used can be fractioned into a multiplicity of asphalt components that can be at least partially recombined as well as combined with other asphalt and modifier components that on pelletization produce those freely flowing pellets that are not subject to cold flow and are resistant to compression on packaging and storage.

BRIEF SUMMARY OF THE INVENTION

Briefly described, in preferred form, various embodiments of the present invention are directed to continuous methods for extruding asphalt and asphalt-containing materials wherein the asphalt source material can be fractioned into a multiplicity of asphalt components such that at least one, and preferably at least two or more of those components can be recombined with themselves as well as combined with other materials including asphalt and asphalt components such that a controlled pelletization process produces free-flowing pellets that can subsequently be packaged for use in other processing and applications wherein the pellets are not subject to cold flow and are resistant to compression on packaging and storage.

An embodiment of the present invention includes a method for pelletizing an asphalt component such that the pellet produced is free-flowing, non-tacky, is not subject to cold flow, and is not destructively altered by compression on packaging and storage. Furthermore, the asphalt component can undergo pre-pelletization processing that can include at least one process including thermal modification, filtration, drying, devolatilization, solvent extraction, thermal extraction, phase separation, distillation, solvent deasphalting, fractioning, pyrolysis, mixing, blending, and visbreaking such that the processes can be done singly and in combination. The pellet thusly produced on pelletization can subsequently be dried and packaged without further modification such that the packaged product can be used in post-packaging processing including usage for product applications.

Another embodiment of the present invention includes a method for pelletizing an asphalt component that can be produced from an asphalt source and can undergo asphalt source processing including at least one of thermal modification, filtration, drying, devolatilization, solvent extraction, thermal extraction, phase separation, distillation, solvent deasphalting, fractioning, pyrolysis, mixing, blending and visbreaking such that the processes be can done singly and in combination. Furthermore, the asphalt component produced can be at least one fraction of that asphalt source as obtained from separation of the asphalt source into a multiplicity of fractions and the said asphalt component on pelletization can produce a pellet that can subsequently undergo post-pelletization processing that can include at least one of thermal modification, transport fluid exchange, filtration, drying, and coating such that the processing can be done singly and in combination. The asphalt component thusly produced following that post-pelletization processing can be dried and packaged without further modification and the packaged product can be used in post-packaging processing including usage for product applications.

Still another embodiment of the present invention includes a method for pelletizing an asphalt component such that the asphalt source processing of the asphalt source as well as fractions of the asphalt source can include combination with a multiplicity of materials including other asphalts as well as other asphalt components wherein the materials and the asphalt components can undergo respective material processing that can include at least one of thermal modification, filtration, drying, devolatilization, solvent extraction, thermal extraction, phase separation, distillation, solvent deasphalting, fractioning, pyrolysis, mixing, blending, and visbreaking, such that the processes can be done singly and in combination. Furthermore the pre-pelletization processing can include combination with a multiplicity of materials that can include other asphalts and other asphalt components such that the materials and the asphalt components can undergo respective material modification that can include at least one of thermal modification, filtration drying, devolatilization, solvent extraction, thermal extraction, phase separation, distillation, solvent deasphalting, fractioning, pyrolysis, mixing, blending, and visbreaking and the processes can be done singly and in combination. Additionally the respective material processing, asphalt source processing, and the pre-pelletization processing can be done singly, serially, in tandem, in parallel, and in combinations thereof and the asphalt component does not have to be an isolable product. The post-pelletization processing can include combination with a multiplicity of materials including other asphalts and asphalt components such that the materials and asphalt components can undergo respective material modification that can include at least one of thermal modification, filtration, drying, devolatilization, solvent extraction, thermal extraction, phase separation, distillation, solvent deasphalting, fractioning, pyrolysis, mixing, blending, and visbreaking and the processes can be done singly and in combination. The respective material processing and the post-pelletization processing can also be done singly, serially, in tandem, in parallel, and in combinations thereof. Post-packaging process can include combination with a multiplicity of materials including other asphalts and other asphalt components such that the materials and asphalt components can undergo respective material modification that can include at least one of thermal modification, filtration, drying, devolatilization, solvent extraction, thermal extraction, phase separation, distillation, solvent deasphalting, fractioning, pyrolysis, mixing, blending, and visbreaking and the processes can be done singly and in combination. Furthermore the respective material processing and the post-packaging processing can be done singly, serially, in tandem, in parallel, and in combination.

Yet another embodiment of the present invention includes a method for pelletizing an asphalt component of an asphalt source that can be at least one of natural asphalt, petroleum asphalt, tars, pitches, pyrogenous asphalt, oxidized asphalt, chemically modified asphalt, polymer modified asphalt, fiber modified asphalt, reactive asphalt, asphalt obtained from tar sand or oil sand, oil shale, rock asphalt, asphaltites wherein the asphalt sources can be used singly and in combination.

An additional embodiment of the present invention includes a method for pelletizing an asphalt component wherein the packaging can include use of compatible packaging materials.

Still another embodiment of the present invention includes a method for pelletizing an asphalt component such that packaging can include combination with a multiplicity of materials including other asphalts and other asphalt components such that the materials and asphalt components can undergo respective material modification that can include at least one of thermal modification, filtration, drying, devolatilization, solvent extraction, thermal extraction, phase separation, distillation, solvent deasphalting, fractioning, pyrolysis, mixing, blending, and visbreaking such that the processes can be done singly and in combination wherein at least one of the materials included in the packaging can be moistened, and/or compressibly fused to prevent shifting of the contents of the packaging on storage and shipment.

Another embodiment of the present invention includes a method for pelletizing an asphalt component such that at least two fraction of a single asphalt source separated into a multiplicity of fractions can be recombined during at least one of asphalt source processing, pre-pelletization processing, post-pelletization processing, packaging, and post-packaging singly and in combination.

Yet another embodiment of the present invention includes a method for pelletizing an asphalt component such that all fractions of a single asphalt source separated into a multiplicity of fractions can be recombined during at least one of asphalt source processing, pre-pelletization processing, post-pelletization processing, packaging, and post-packaging processing singly and in combinations such that the pellet produced is free-flowing and non-tacky, is not subject to cold flow, and is not destructively altered by compression on packaging and storage and such that the composition of the asphalt source is not altered and such that the integrity of the pellet recombining the fractions is not the same as that of the pellet that can be formed with the asphalt source material obtained directly.

Still another embodiment of the present invention includes a method for pelletizing an asphalt component such that the asphalt can be blended with modifying materials that can include fillers, fibers, asphalt components, oils, solvents, asphalt oils, waxes, asphalt waxes, polymers, compatibilizing agents, and asphaltites.

An additional embodiment of the present invention includes a method for pelletizing an asphalt component wherein the filler materials in the asphalt component can be at least one of talc, carbon, graphite, fly ash, wax including microcrystalline, asphalt wax, detackifying agents, calcium carbonate, pigments, clay, wollastonite, minerals, inorganic salts, silica, siliceous minerals, cement, Portland cement, geopolymers, polymeric powders, organic powders, water-swellable clays, thermally expandable clays, thermally expandable graphite, and powdered aggregate used singly and in combination.

Yet an additional embodiment of the present invention includes a method for pelletizing an asphalt component such that the fibers in the asphalt component can include natural fibers, synthetic fibers, cellulosic fibers, mineral fibers, polymeric fibers, nanofibers, siliceous fibers, metal fibers, and inorganic fibers.

Still another embodiment of the present invention includes a method for pelletizing an asphalt component wherein the polymers in the asphalt component can include olefinic, aralkenyl, vinylic, substituted vinylic, condensation polymers, polymeric resins, heteroatom polymers, functionally substituted polymers, and copolymers used singly and in combination.

Another embodiment of the present invention includes a method for pelletizing an asphalt component wherein the post-pelletization processing can include one of coating the pellet formed with at least one layer.

Still another embodiment of the present invention includes a method for pelletizing an asphalt component wherein the coating of at least one layer can be at least one of an asphalt, a sealing layer, a hardening layer, and a detackifying layer.

An additional embodiment of the present invention includes a method for pelletizing an asphalt component such that the coating can include a binder layer and a coating layer.

Yet another embodiment of the present invention includes a method for pelletizing an asphalt component such that the binder can be at least one of an emulsion, a dispersion, and an asphalt.

Still yet another embodiment of the present invention includes a method for pelletizing an asphalt component wherein the coating material can be at least one of talc, carbon, graphite, fly ash, wax including microcrystalline, asphalt, wax, detackifying agents, calcium carbonate, pigments, clay, wollastonite, minerals, inorganic salts, silica, siliceous minerals, cement, Portland cement, geopolymers, polymeric powers, organic powders, water-swellable clays, thermally expandable clays, thermally expandable graphite, and powdered aggregate use singly and in combination.

BRIEF DESCRIPTION OF THE DRAWINGS

FIG. 15b is a schematic view of the streamline cutter hub rotated in perspective relative to FIG. 15a.

FIG. 15c is a cross-sectional view of the streamline cutter hub in FIG. 15a.

FIG. 17a is a schematic illustration of a comparative cutter hub with attached normal angle blade.

FIG. 17b is a schematic illustration of a steep angle cutter hub with attached blade.

FIG. 17c is a schematic illustration of a comparative perpendicular angle cutter hub with attached non-tapered or square-cut blunted tip blade.

FIG. 17d is a schematic illustration of a cutter hub with attached reduced thickness blade at normal angle.

FIG. 21 illustrates a dryer screen with deflector bars.

FIG. 22 is a cross-sectional illustration of the screen with deflector bars in FIG. 21.

DETAILED DESCRIPTION OF THE INVENTION

Figure 1:
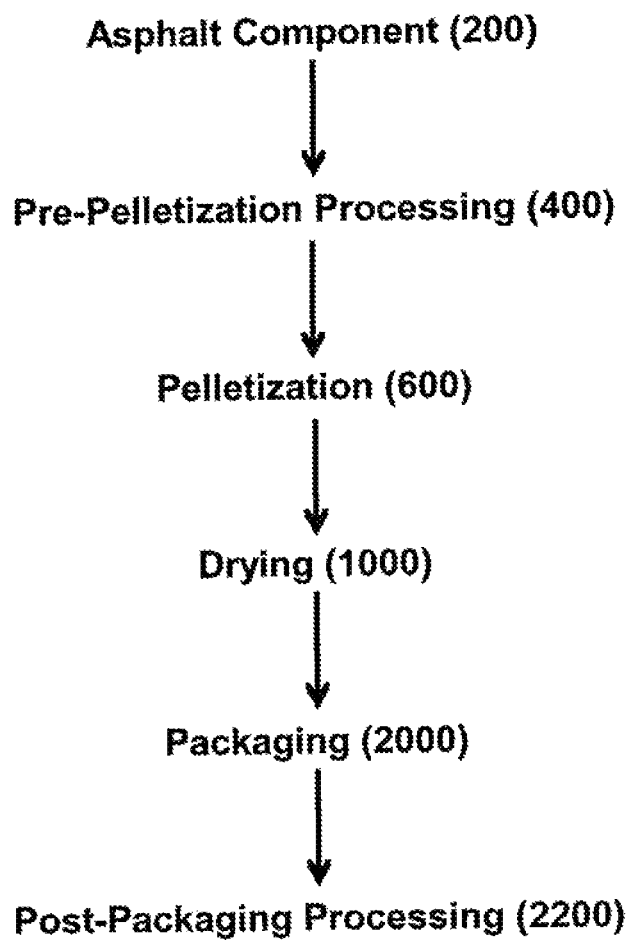
FIG. 1 illustrates a flow chart of the process wherein an asphalt component undergoes pre-pelletization processing with subsequent pelletization, drying, and packaging for subsequent post-packaging processing and applications.

Although preferred embodiments of the invention are explained in detail, it is to be understood that other embodiments are possible. Accordingly, it is not intended that the various embodiments of the present invention are to be limited in its scope to the details of construction and arrangement of components set forth in the following description or illustrated in the drawings. The various embodiments of the present invention are capable of other embodiments and of being practiced or carried out in various ways. Also, in describing the preferred embodiments, specific terminology will be resorted to for the sake of clarity.

Referring specifically to the drawings, in FIG. 1, an asphalt component 200 can undergo pre-pelletization processing 400 such that on pelletization 600 and drying 1000, the free-flowing pellet thusly produced can undergo packaging 2000 that can subsequently be subjected to additional post-packaging processing 2200 including product application. As illustrated in FIG. 2, the asphalt component 200 can be obtained from an asphalt source 10 that can be subjected to asphalt source processing 100. The asphalt component 200 of FIG. 2 similarly can undergo pre-pelletization processing 400 followed by pelletization 600 as in FIG. 1. Additionally in FIG. 2, following pelletization 600 the pellets thusly formed can undergo post-pelletization processing 800 followed by drying 1000 and packaging 2000 such that the free-flowing pellets formed can subsequently be subjected to additional post-packaging processing 2200 including product application.

Figure 3:
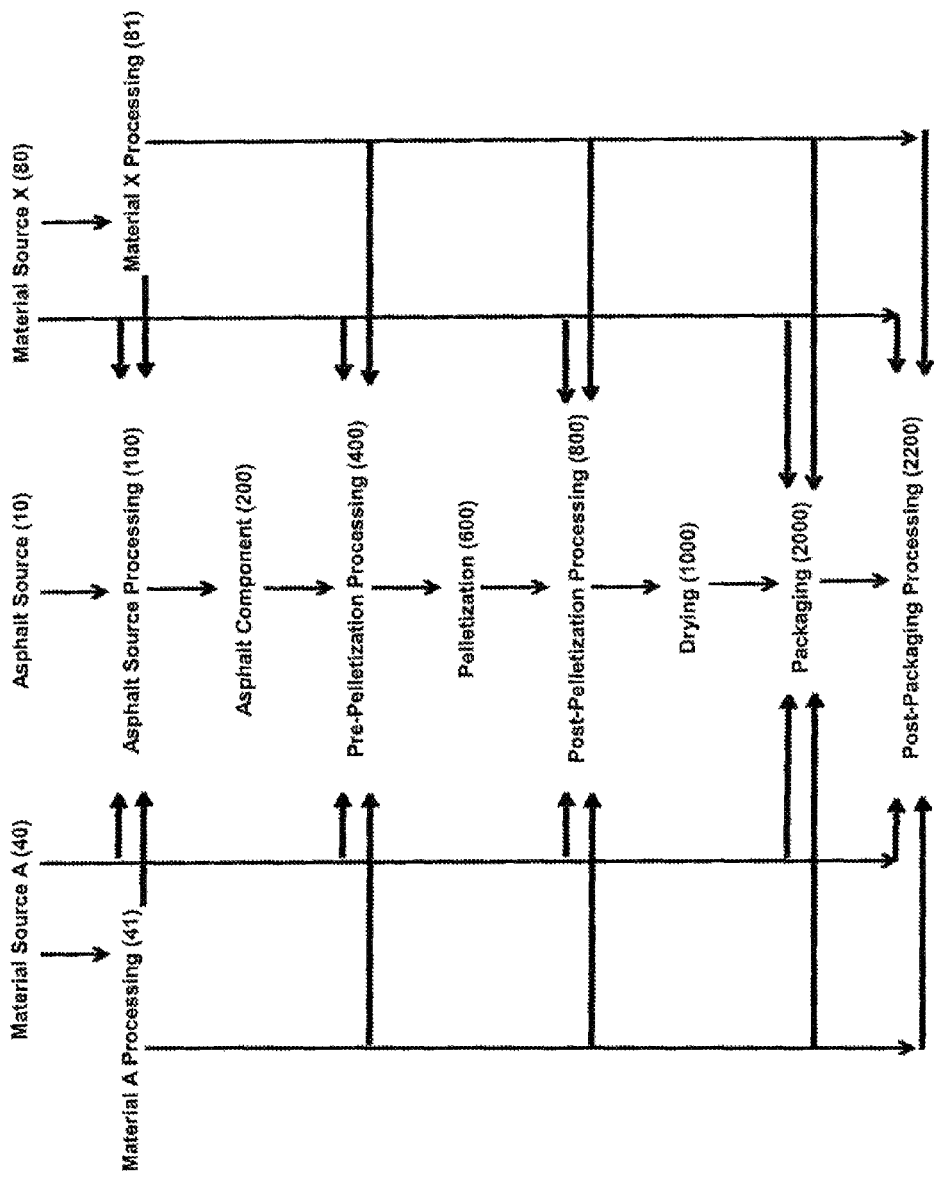
FIG. 3 illustrates a flow chart of the process wherein at least one asphalt source in combination with at least one additional material source including asphalt can be individually subjected to processing and/or combination for subsequent processing such that the various materials can be combined in at least one processing step including the asphalt source processing, pre-pelletization processing, post-pelletization processing, and/or post-packaging processing whereby the asphalt component produced is pelletized, dried, and packaged for subsequent post-processing and applications.

In FIG. 3, the asphalt component 200 can be a material that is the combination of materials including an asphalt from asphalt source 10, and can contain at least one other material source from a multiplicity of material source A 40 to material source X 80 each of which can have undergone processing as needed. Thus asphalt component 200 can include modifications of asphalt source 10 via asphalt source processing 100 and can include at least one of material source A 40 to material source X 80 wherein material source A 40 can undergo material A processing 41 with similar processing of materials up to and including material X 80 wherein material X 80 has undergone processing via material X processing 81. Thus asphalt component 200 as formulated including any combination of material A 40 to and including material X 80 and/or materials resulting from material A processing 41 to and including material X processing 81 can further be modified by pre-pelletization processing 400. Additionally material source A 40 to and including material source X 80 and/or materials derived by material A processing 41 to and including material X processing 81 can be combined with asphalt component 200 in the pre-pelletization processing 400 to subsequently undergo pelletization 600. The product from pelletization 600 can then undergo additional post-pelletization processing 800 alone or in combination with material source A 40 to and including material source X 80 and/or with material resulting from material A processing 41 to and including material X processing 81 such that the product formed can be subjected to drying 1000 and packaging 2000. Alternatively, the product from drying 1000 can be combined with material source A 40 to and including material source X 80 and/or with material resulting from material A processing 41 to and including material X processing 81 such that the product formed can be subjected to packaging 2000. The material following packaging 2000, preferably compatibly packaged, can similarly be combined with material source A 40 to and including material source X 80 and/or materials derived via material A processing 41 to and including material source X processing 81 in further downstream manipulation including product applications as post-packaging processing 2200.

Figure 4:
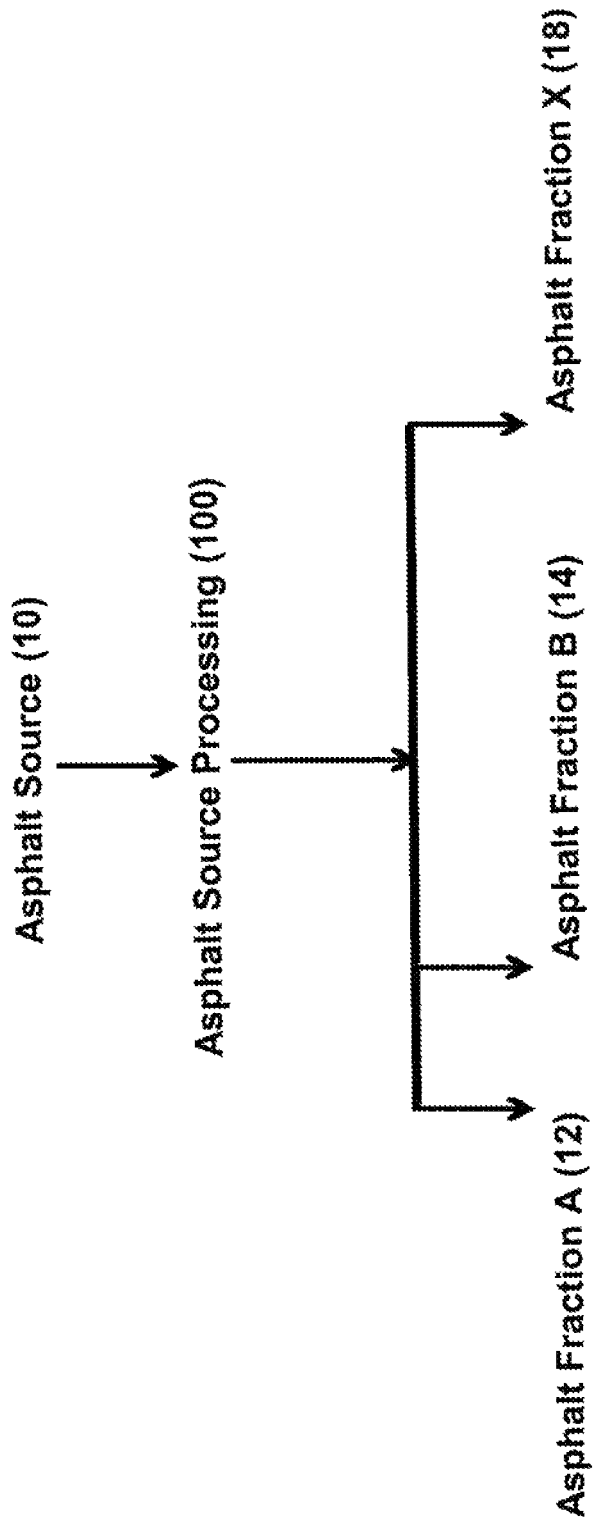
FIG. 4 illustrates a flow chart of the process wherein an asphalt source can undergo asphalt source processing such that a multiplicity of fractions are formed.
Figure 5:
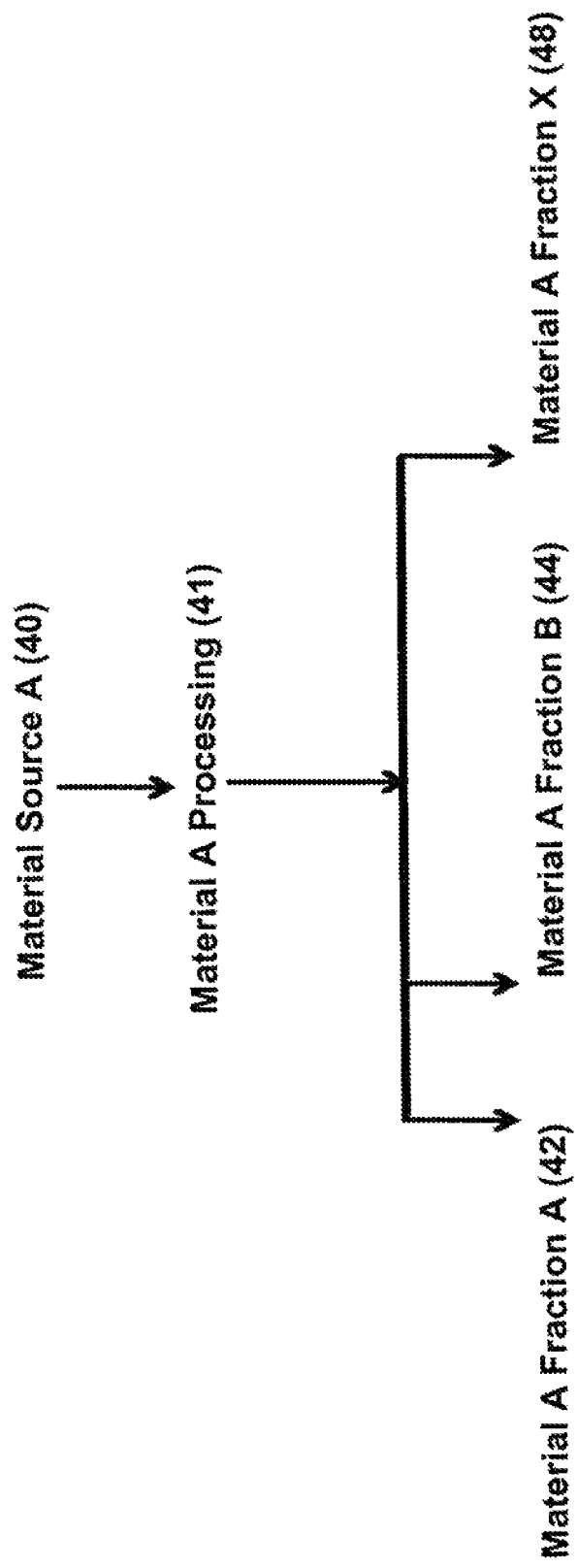
FIG. 5 illustrates a flow chart of the process wherein material source A can undergo material A processing such that a multiplicity of fractions are formed.

FIG. 4 illustrates a process wherein an asphalt source 10 can undergo asphalt source processing 100 to form a multiplicity of fractions including asphalt fraction A 12, asphalt fraction B 14 up to and including asphalt fraction X 18. Similarly FIG. 5 illustrates wherein material source A 40 can undergo material A processing 41 to form a multiplicity of fractions including material A fraction A 42, material A fraction B 44 up to and including material A fraction X 48. Any multiplicity of material sources can thus be modified by any multiplicity of material processing steps to from any multiplicity of material fractions up to and including FIG. 6 wherein it is illustrated that material source X 80 can undergo material X processing 81 to form any multiplicity of material fractions including material X fraction A 82, material X fraction δ 84 up to and including material X fraction X 88. Thus any material fraction and any combination of material fractions can serve as any material source including asphalt fractions that can be used as an asphalt source and still further fractioned such that the final pellet formed in any combination and permutation by pelletization 600 ultimately with drying 1000 and packaging 2000 is free-flowing.

Returning now to FIGS. 2 and 3, an asphalt source 10 can include natural asphalts, petroleum asphalts, tars, pitches, pyrogenous asphalt, oxidized asphalt, chemically modified asphalt, polymer modified asphalt, fiber modified asphalt, reactive asphalt, and the like and can include asphalt obtained from tar sand, oil sand, oil shale, rock asphalt, asphaltites, and the like without intending to be limited. For purposes of the present invention, asphalt and bitumen or mineral pitch are defined equivalently to be a heavy dark brown to black mixture of hydrocarbons that are both thermoplastic and viscoelastic with properties varying with temperature, and can be natural or synthetic, aliphatic and/or aromatic, including heterocyclic compounds such that the material is cementitious in nature and can serve as both a weather-resistant and chemical-resistant binder.

Natural asphalt as used herein is defined as material that has formed as a consequence of evaporative action due to wind and sun on crude petroleum oils that have worked up through geologic cracks and fissures over time such that the volatiles present in the crude oil have evaporated off leaving an asphaltic concentrate. These can occur as lakes, puddles, or pits defined herein as lake asphalt and equivalent to asphalt pits and tar pits. Natural asphalts can also occur as rock asphalt defined herein as a mineral substance impregnated with asphalt often in low concentration and is equivalent to asphalt stone and bituminous rock. Asphaltites, also a natural asphalt, are defined herein as an asphalt that is free of mineral or vegetable impurities and are distinguished from coal by their ability to be variably soluble in carbon disulfide which coal is not. Asphaltites vary in fixed carbon content as well as specific gravity and softening point and can include, without intending to be limited, albertite, impsonite, nigrite, uintaite or uintahite, grahamite, glance pitch, manjak or manjak black, and gilsonite.

Petroleum asphalts as used herein are defined as the byproducts of the petroleum refining process and can include atmospheric distillate residuum, vacuum distillation residuum, solvent-deasphalted residuum, and the like without intending to be limiting. Tars are defined as material obtained from the distillation of bituminous coal as well as a byproduct of the destructive distillation of organic material. Similarly, pitch as used herein is defined as a thick, dark, and typically sticky substance obtained from the distillation of coal tar, wood tar, and coniferous resins such as pine resin that result from the destructive distillation of those materials in the complete or partial absence of air such that complete carbon residues are not produced. These are equivalent to tar pitch, oil pitch, organic pitch, and bitumen pitch as used herein and are similarly equated to tar as defined hereinabove.

Pyrogenous asphalt or pyrobitumen include thermally treated asphalts including crudes such that the material produced is of lower molecular weight than the original asphalt as defined herein. Pyrogenous asphalt without intending to be limited can include vacuum-reduced crude, steam-reduced crude, cracked tars, and byproducts of oil shale extraction. In lieu of high temperature thermolysis such as described above, visbreaking procedures can also be utilized where catalytic fragmentation is achieved in the presence of a free-radical generating species such as peroxides, for example. Oxidation, photolytic degradation or aging, and thermolytic cleavage are similar in that the processes typically involve generation of free radical species and all can and do play a part in the reduction of molecular weight of the asphalt species.

Oxidized asphalt as defined herein include both artificial and natural oxidation of asphalt as by aging and, without intending to be bound by any theory, can modify heteroatom and/or benzylic carbon moieties present in the asphalt structure such that the chemical composition of the original asphalt has been changed. Such oxidative modification can be achieved exemplarily by blowing air through hot asphalt, blown asphalt, as well as by use of mineral acids, sulfur oxides, and the like without intending to be limited. Among the oxidation products can be included carboxylic anhydrides, carboxylic acids, aldehydes, organic sulfur oxides, and organic nitrogen oxides, for example. Oxidation can also be one of several mechanisms by which chemically modified asphalts and reactive asphalts are prepared as defined hereinbelow.

Chemically modified asphalt can include admixture of other materials with asphalt, derivatized asphalt, as well as cross-linkable and cross-linked asphalt as defined herein. The chemical modification is done in such a way as to modify the properties of the native asphalt including but not limited to penetration, flexibility, ductility, pliability, chemical resistance, weather resistance, processability, rheological modification, wettability, and affinity for a substrate including polymers, other additives, and aggregate materials, for example. Similarly, polymer modified asphalt as defined herein can include polymeric materials blended with asphalt, chemically bound to asphalt, reactive with asphalt, and can be cross-linked Examples of polymers including copolymers that can be included are olefinic, aralkenyl, vinylic, substituted vinylic, condensation polymers, polymeric resins, heteroatom polymers, functionally substituted polymers, and the like. Cross-linking can include intrapolymer cross-linking as well as cross-linking between the polymer and the asphalt or chemically modified asphalt. Cross-linkers can include sulfur and organosulfur analogs, vinyl monomers and dimers, reactive resins, reactive polyfunctional compounds, oligomers and cyclic oligomers, and the like. Cross-linking can be accomplished in the presence of catalysts, co-initiators, and other adjuvants as are known by those skilled in the art.

The chemical modification can result in formation of reactive groups within the asphalt resulting in formation of reactive asphalt. Such reactive groups can include carbonyl and thiocarbonyl species (acids, aldehydes, ketones, thioacids, thioaldehydes, thioketones, and the like), unsaturated species (olefins, imides, imines, aromatics, heteroaromatics, unsaturated heterocompounds, and the like), as well as oxidized sulfur and oxidized nitrogen analogs without intending to be limited. Reactive asphalts can also be formed by chemical bonding with reactive polymeric and polymeric generating species as well as by introduction of cross-linking groups to the asphalt moieties. Reactive asphalts can also be produced by chemical attachment of polymerizable components (free radical species, condensation polymer species, dehydration species, elimination species, monomers, oligomers, cyclic oligomers, prepolymers, and the like) to the asphalt moieties.

Fiber modified asphalt as defined herein includes asphalt to which has been added natural and/or synthetic fibers including cellulosic fibers, mineral fibers, polymeric fibers, nanofibers, siliceous fibers, metal fibers, inorganic fibers, and the like without intending to be limited. The fibers as defined herein can be treated to modify the surface properties for enhancement of the compatibility with the asphalt formulation as is known to those skilled in the art.

Tar sands and equivalently, oil sands, as defined herein include combinations of clay, sand, water, and bitumen from which the asphalt portion can be removed from surface deposits by extraction, separation, and thermal separation by way of example without intending to be limited. Asphalt can be obtained from deep deposits exemplarily by steam injection, solvent injection, and fire-flood techniques additionally without intending to be limited. The materials obtained by these techniques can also be described as non-conventional oil and/or crude bitumen as defined herein.

Oil shale as defined herein includes any sedimentary rock that contains solid bituminous materials, also known as kerogens and kerogenous materials, that can be released from the rock as fluid materials as is commonly achieved by heating and/or pyrolysis to form pyrogenous asphalt or pyrobitumen. All forms of oil shale are included collectively as defined herein to encompass the geological classifications (carbonate-rich, siliceous, and cannel shales), kerogen type classification (as defined by the hydrogen, carbon, and oxygen content of the organic component including van Krevelen diagramidentification) as well as by petrographic classification utilizing terms relating to formation locus (terrestrial, lacustrine or lake, and marine) as is similar to that of coal.

Figure 2:
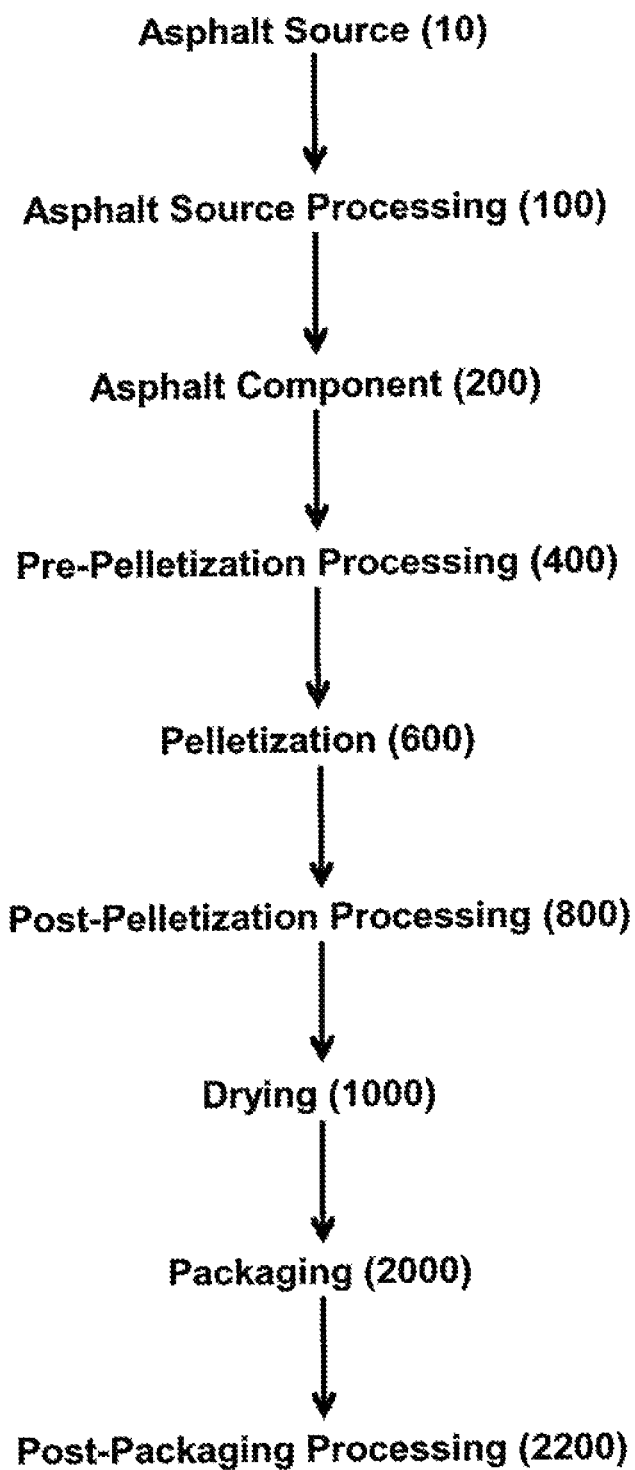
FIG. 2 illustrates a flow chart of the process wherein an asphalt source undergoes asphalt source processing to form an asphalt component that undergoes pre-pelletization processing, pelletization, post-pelletization processing, drying, and packaging for subsequent post-packaging processing and applications.

As further illustrated in FIGS. 2 and 3, asphalt source 10 is modified according to asphalt source processing 100 to form asphalt component 200 (see FIG. 1 as well). Asphalt source processing 100 can be at least one process, batch or continuous, including mixing, heating, cooling, filtering, drying, solvolysis, pyrolysis, solvent extraction, multiphase extraction, fractioning, thermal fractioning, distillation, atmospheric distillation, steam distillation, vacuum distillation, devolatilization, blending, chemical modification, formulation, deformulation, reaction, derivatization, extrusion, and the like.

The asphalt source 10 can be a solid or a liquid material provided continuously in bulk or individually packaged and can be conveyed as a solid or pumped as a liquid to the asphalt source processing 100. Any suitable pump can be used including at least one of a booster pump, a centrifugal pump, a positive displacement reciprocating pump, and a positive displacement rotary pump. Wherein a rotary pump is used it can be at least one of peristaltic, vane, screw, lobe, progressive cavity, and gear pump or melt pump as used hereinbelow. The gear pump can be of any design and can include low, medium, and high precision capabilities for generation of pressure.

The asphalt source 10 as received for the asphalt source processing 100 can be thermally modified as by heating or cooling to prepare asphalt component 200. Thermal modification can be achieved statically, as in a vessel, or dynamically, continuously and inline Heating can be achieved by utilizing heating elements, heating coils, heat exchange processes, and the like and can be provided through use of electrical, steam, thermal transfer fluids, and oil units. Cooling can be achieved through use of heat exchange fluids as is known to those skilled in the art.

The asphalt source 10, FIGS. 2 and 3, as received or thermally modified can be subjected to mixing, statically or dynamically, to insure uniformity of composition and this can be achieved in a mixing vessel with agitation including high shear, as pumped inline through static mixers, and with extruders that can be single screw, twin screw including co-rotating and counter-rotating, or multi-screw including rotary extruders. Various levels of mixing and shear are achieved by the differing styles of mixing processes. Static mixing typically has the least shear and relies more on thermal energy. Dynamic mixing depends to a large degree on blade design and mixer design. Extrusional mixing varies with type of screw, number of screws, and the screw profile and is quite capable of significant generation of shear energy. Therefore, energy is introduced into the mixing process in terms of both shear or mechanical energy and thermal energy. Heating and/or cooling of the units can be achieved, for example, electrically, by steam, or by circulation of thermally controlled liquids such as oil or water. Mixing continues until a formulation reaches an appropriate temperature or other criterion of consistency or viscosity as determined or known specifically for the process by those appropriately skilled in the art.

The mixing process can include formulation processes such as blending in other components as indicated in FIG. 3 as any one to any multiplicity of material source A 40 to material source X 80 that can include fillers, fibers, asphalt components, oils, solvents, asphalt oils, waxes, asphalt waxes, polymers, compatibilizing agents, asphaltites, and the like. Blending can further incorporate reactive agents including cross-linking agents, derivatizing agents, oxidizing agents, monomers, oligomers, reactive polymers, and the like. Exemplary of filler materials can be, but are not limited to, talc, carbon, graphite, fly ash, wax including microcrystalline, asphalt wax, detackifying agents, calcium carbonate, pigments, clay, wollastonite, minerals, inorganic salts, silica, siliceous minerals, cement, Portland cement, geopolymers, polymeric powders, organic powders, water-swellable clays, thermally expandable clays, thermally expandable graphite, and powdered aggregate and can be used singly and in many combinations. Preferably, the filler materials can be any of a multiplicity of material source A 40 to and including material source X 80 and/or materials derived via material A processing 41 to and including material source X processing 81.

Figure 7A:
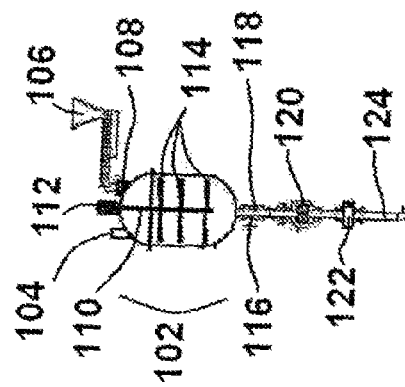
FIG. 7a is a schematic illustration of a feeder, a mixing vessel, medium pressure pump, and coarse filter.

Turning now to FIG. 7a, the asphalt source 10 as received or thermally modified can be introduced into a mixing apparatus 102 for melting, heating, or cooling as appropriate for the material as indicated by the arrow at inlet 104. Wherein the mixing process involves blending according to the asphalt source processing 100 (FIG. 3), at least one of the multiplicity of material source A 40 to and including the material source X 80 and/or the respective material resulting from material A processing 41 to and including material X processing 81 can be fed manually into the mixing apparatus as a solid or liquid. Preferably, liquids can be pumped or metered into the mixing apparatus, not shown, and solids can be added via a feed screw 106 or by other appropriate device. Feeding can be accomplished gravimetrically or volumetrically and preferably is controlled through mechanical and/or electronic feedback mechanisms as are readily known to those skilled in the art. One or more similar or different feeding mechanisms can be used, and can be placed at the same or different inlet point(s) 108 in the mixing apparatus 102. The feeding components can be ambient in temperature, heated, or cooled and can be at atmospheric conditions or pressurized, purged with air or an inert medium such as, but not limited to, argon or nitrogen preferentially, or can be subjected to a vacuum or partial vacuum to expedite flow into the mixing apparatus.

The mixing apparatus 102 chamber can be atmospheric or purged with air or inert gas, for example argon or preferably nitrogen. Components can be added continuously or portionwise with warming to temperature as required by a particular process. Mixing is achieved by rotation of the rotor 110 controlled by motor 112. Attached to rotor 112 are mixing blades 114 exemplary of which can be propeller or boat style, ploughshare style, delta or sigma style in single, double, or multiple configurations, and helical or helical dispersion blades. Alternatively, the vessel can be a kneader, Buss kneader, or Farrel internal mixer or it can be a ribbon blender, Banbury-type blender, horizontal mixer, vertical mixer, planetary mixer or equivalent devices known to those skilled in the art. On reaching the appropriate pour point, valve 116 is opened and the fluid or molten material passes into and through pipe 118 as is described hereinbelow.

Figure 7B:
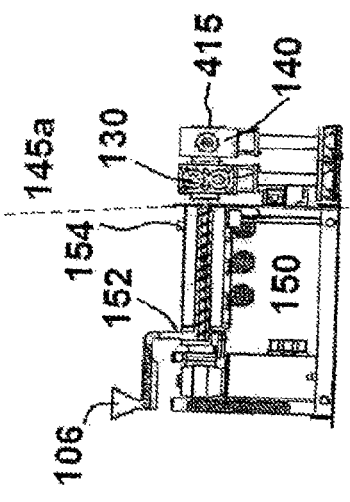
FIG. 7b is a schematic illustration of a feeder, an extruder, gear pump, and screen changer.

Alternatively, the asphalt source 10, FIGS. 2 and 3, as received or thermally modified is connectedly attached as shown in FIG. 7b to inlet 152 of an extruder 150 that that optionally can be, but is not limited to, a single screw, twin screw, multiple screw or ring extruder, or a ram extruder and is preferably a single screw, and more preferably is a twin screw extruder. The sections or zones of the screw should feed, mix, and convey the material simultaneously providing sufficient energy, thermal and mechanical, to melt, mix, and uniformly disperse and distribute the material or materials for the pelletization to follow. The extruder 150, preferably the twin screw extruder, optionally can be purged with air or an inert gas, of which nitrogen or argon are preferential but not limiting, and additionally can have one or more vent ports some or all of which can be fitted with one or more vacuum attachments or other exhaust mechanism or mechanisms as is understood by those skilled in the art. Vent ports 154 or appropriate exhaust mechanisms facilitate removal of gases, unwanted volatiles, by-products, decomposition products, and/or impurities. Venting should be used with caution and positionally placed such that any volatile components essential to the formulation are not lost or compromised after introduction to the mixing process. The configuration of the screw should be satisfactory to achieve an appropriate level of feeding, mixing dispersively and/or distributively, melting, blending, and throughput rate determined by the formulation and processing requirements for at least one of melting, heating, and/or cooling as appropriate for the material. Wherein the mixing process involves blending according to the asphalt source processing 100 (FIG. 3), at least one of the multiplicity of material source A 40 to and including the material source X 80 and/or the respective material resulting from material A processing 41 to and including material X processing 81 can be fed manually into the mixing apparatus as a solid or liquid. Preferably, liquids can be pumped or metered into the mixing apparatus, not shown, and solids can be added via a feed screw 106 or by other appropriate device. Feeding can be accomplished gravimetrically or volumetrically and preferably is controlled through mechanical and/or electronic feedback mechanisms as are readily known to those skilled in the art. One or more similar or different feeding mechanisms can be used, and can be placed at the same or different inlet point(s) not shown. The feeding components can be ambient in temperature, heated, or cooled and can be at atmospheric conditions or pressurized, purged with air or an inert medium such as, but not limited to, argon or nitrogen preferentially, or can be subjected to a vacuum or partial vacuum to expedite flow into the mixing apparatus.

Figure 7C:
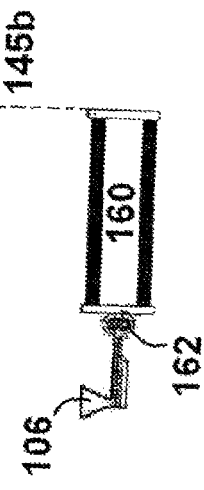
FIG. 7c is a schematic illustration of a feeder, gear pump, and static mixer assembly.

Analogously, the asphalt source 10, FIGS. 2 and 3, as received or thermally modified to be a molten fluid is connectedly attached as shown in FIG. 7c to pump 162 that can be any pump and is preferably a gear pump as described above to facilitate transfer and pressurization of the material flow into the static mixer 160. Static mixer 160 is connected to melt pump 130 positionally as indicated by dotted line 145b in FIG. 7c. Static mixer 160 in FIG. 7c can be used to heat the mixture being formed to generate a uniform molten mass or can be used effectively as a melt cooler to reduce the temperature of the molten mass. When static mixers are used in series, each unit can be used to heat and further mix the formulation wherein the temperatures, design, geometries and configurations, physical sizes, and process conditions can be the same or different among mixers. A static mixer in the series can be heating the mixture to achieve better dispersive and distributive mixing, whereas a second static mixer can actually be cooling the mixture to facilitate further processing. A static mixer 160 or melt cooler is a heat exchanger of the coil type, scrape wall, shell and tube design, or U-style tube design or other comparable style and preferably is a shell and tube design that includes static mixing blades of appropriate configuration within the individual tubes to further mix the material and bring more of the material into intimate contact with the wall of the tube outside of which is a flow preferably of, but not limited to, oil or water to provide warming or cooling as appropriate. The temperature and flow rate of the circulating medium is carefully regulated by a control unit, not shown. An important criterion for selection of conditions in static mixing or melt cooling is to do a maximum amount of work to effect mixing with a minimum pressure drop while maintaining the pressure required for proper admixture. Pressures generated by the extruder 150 and/or the melt pump 130, where present, should be sufficient to maintain flow of the molten or fluid mass through the filter 140, where applicable, into and through the subsequent downstream processes.

Mixing sections can be used alone or in combination where dynamic, extrusional, and/or static mixing as described herein are connected in series and/or in parallel. Exemplary of this is a mixing apparatus attached directly to a static mixer; or an extruder attached directly to static mixer; or alternatively an extruder attached directly to a static mixer. Additionally, an extruder can be attached to another extruder in series and/or in parallel of similar or different design type or configuration. Temperatures and process parameters can be the same or different in the various mixing sections and mixing units can be attached in combinations greater than two serially or otherwise.

Use of surface treatments and coatings to avoid adhesion, corrosion, abrasion, and wear for components including vessels, extruders, gear pumps, screen changers, diverter valves (described below), and static mixers or melt coolers are contemplated by the present invention and are included herein by way of reference without intending to be limited. Nitriding, carbonitriding, electrolytic plating, electroless plating, thermal hardening, flame spray techniques, and sintering techniques are exemplary of these surface treatments and coatings.

The asphalt source 10, FIGS. 2 and 3, as received or thermally modified can be subjected to filtration from the melt to remove bulk contaminants preferably as would be anticipated from natural asphalts as well as coarse to fine sediments not essential to the composition of the asphalt component 200 thusly produced. Filtration can be and preferably is done prior to introduction of the asphalt source 10 as received or thermally modified into the mixing apparatus, extruder, and/or static mixer. Filtration can also be done following the mixing apparatus, the extruder, and optionally the static mixer. In FIG. 7a, pipe 118 is attached to booster pump 120 that can be any suitable pump as described above and preferably is a gear pump. The pump pressure can vary, and need be sufficient to force the melt through at least a coarse filter 122 that can be a candle filter, basket filter, or screen changer, and is more preferably a basket filter of 20 mesh or coarser. The coarse filter 122 removes larger particles, agglomerates, or granular material from the melt as it flows to and through pipe 124. The dotted line 145a indicates the connection to melt pump 130. Similarly an appropriately suitable pump in combination with these filtration options can be utilized upstream of the mixing apparatus, extruder, and/or the static mixer as suggested above.

On exit from pipe 124 (FIG. 7a), or the static mixer 160 (FIG. 7c) or the extruder 150 (FIG. 7b) or any combination thereof, the molten or fluidized material optionally passes to and through a melt pump 130 that generates additional pressure on the melt, preferably at least approximately 10 bar and more preferably between approximately 30 to approximately 250 bar or more. Melt pump 130 can be a centrifugal or positive displacement reciprocating or rotary pump, and preferably is a rotary pump that can be a peristaltic, vane, screw, lobe, progressive cavity, or gear pump, and more preferably is a gear pump. Seals should be compatible with the material being processed, chemically and mechanically, the details of which are well understood by those skilled in the art. The pressurized melt passes through a filter 140, FIG. 7b, that is preferably a basket filter or screen changer, and is more preferably a screen changer of 200 mesh or coarser, and even more preferably a multilayer screen changer of two or more screens of differing mesh, most preferably a series of filters exemplary of which is 20 mesh, 40 mesh, and 80 mesh. The screen changer can be manual, plate, slide plate, rotary plate, single or dual bolt, and can be continuous or discontinuous.

The use of melt pump 130 and/or filter 140 is strongly and optionally dependent on the containment of any volatile ingredients in the formulation. Pressures can be sufficient from extrusional mixing to forego use of melt pump 130, whereas use of static and/or dynamic mixing, the static mixer 160 or the mixing apparatus 102 respectively, can require facilitation of pressurization to insure progress through and egress of the formulation from the apparatus. The filter 140 provides a safety mechanism, where employed, to insure oversize particles, lumps, amorphous masses, or agglomerates are not propagated to the downstream processes. Pressures required are dependent on the material being processed and are significantly affected by the combination of downstream processes that follow mixing as well as on the throughput rate or flow rate of the process.

The asphalt source processing 100, FIGS. 2 and 3, can include drying and/or devolatilization exemplarily by use of steam distillation, atmospheric distillation, and/or vacuum distillation. Alternatively infrared heating can be used. Wherein available, volatiles including moisture can also be eliminated through atmospheric and/or vacuum vents on the extruder. It is prudent to minimize or preferentially avoid the use of moving air in any of the drying processes as asphalt is prone to oxidation as discussed above. Inert gases, however, can be used to facilitate removal of any volatiles including moisture. Sufficient heat can also be applied to lead to thermal degradation or pyrolysis of the asphalt source 10 to lower molecular weight components that are amenable to additional downstream processing. This is often achieved in the petroleum refining process and is commonly observed in treatment of oil shales as described above.

Boussinqault in prior art has demonstrated the use of heating to separate the molten oil from the precipitable portions of an asphalt source 10. Exemplary of this is the separation of the molten oil or a petrolenes fraction from the insoluble and thus precipitated asphaltene fraction at approximately 300° C. (approximately 572° F.). This is exemplified in FIG. 4 wherein an asphalt source 10 is heated to 300° C. as the asphalt source processing 100 to form two fractions wherein the asphalt fraction A 12 would represent the petrolenes and the asphalt fraction B 14 would represent the asphaltene described hereinabove.

As a further example using FIG. 4, asphalt source 10 can undergo a multiplicity of solvent extractions as asphalt source processing 100 to form a multiplicity of fractions indicated as asphalt fraction A 12, asphalt fraction B 14, to asphalt fraction X 18. Utilizing prior art solvolysis techniques, the completely insoluble portion includes the carboids (insoluble in carbon disulfide, carbon tetrachloride, and low molecular weight paraffins), the carbon disulfide soluble carbenes (insoluble in carbon tetrachloride and low molecular weight paraffins), the soluble maltenes (soluble in carbon disulfide, carbon tetrachloride, and low molecular weight paraffins), and the low molecular weight paraffin insoluble asphaltenes (soluble in carbon disulfide and carbon tetrachloride). Such solvent extraction has been further modified utilizing various aliphatic solvents, aromatic solvents, and/or polar solvents to allow selective portions of the asphalt source 10 to be solvent extracted in one or more phases to form two or more fractions. Multiphasic extraction has also been demonstrated using at least one nonpolar solvent in combination with at least one polar solvent including water to form two or more immiscible (insoluble) phases that can be separated to yield fractions of the original asphalt source 10. The respective solvents used in the extraction processes can be concentrated and/or evaporated to yield the separated fractions such that the solvents can undergo solvent recovery processes known to those skilled in the art for recirculation by batch and/or continuous processes.

Similarly, the prior art Dana classification from the (System of Mineralogy, 1895) separates asphaltum into classes including low boiling oils vaporized at 100° C. or below, heavy oils vaporized between 100° C. and 250° C., alcohol-soluble resins, ether-soluble and alcohol-insoluble substances, ether and alcohol insoluble substances, as well as nitrogenous substances. Asphaltum as defined herein is a bituminous or asphaltic material, often found in beds of sandstone, limestone, or shale, that can be black to brown in color and can contain clay, sand, and vegetable matter The hereinabove processes can be used singly as well as in a multiplicity of combinations to produce an asphalt component 200 as illustrated in FIGS. 1, 2 and 3. It is a preferred embodiment of the instant invention that a single asphalt fraction A 12 as illustrated in FIG. 4 can serve as the asphalt component 200. It is also to be understood as a more preferred embodiment of the instant invention that at least one single asphalt fraction B 14 to asphalt fraction X 18 can be used as any material source A 40 to material source X 80 as illustrated in FIG. 3. It is also disclosed that the materials discussed hereinabove to be utilized in combination with as well as to modify the asphalt source 10 through asphalt source processing 100 to form asphalt component 200 are exemplary to at least one of material source A 40 to and including material source X 80 as illustrated in FIG. 3. It is further disclosed that at least one of any of the multiplicity of processes described in accordance with asphalt source processing 100 associated with FIGS. 2 and 3 can be utilized within the scope of the present invention to modify the individual material source A 40 to and including material source X 80 according to material A processing 41 to and including the respective material X processing 81 wherein these processing steps and any multiplicity of processing steps do not have to be the same individually and/or sequentially.

Figure 6:
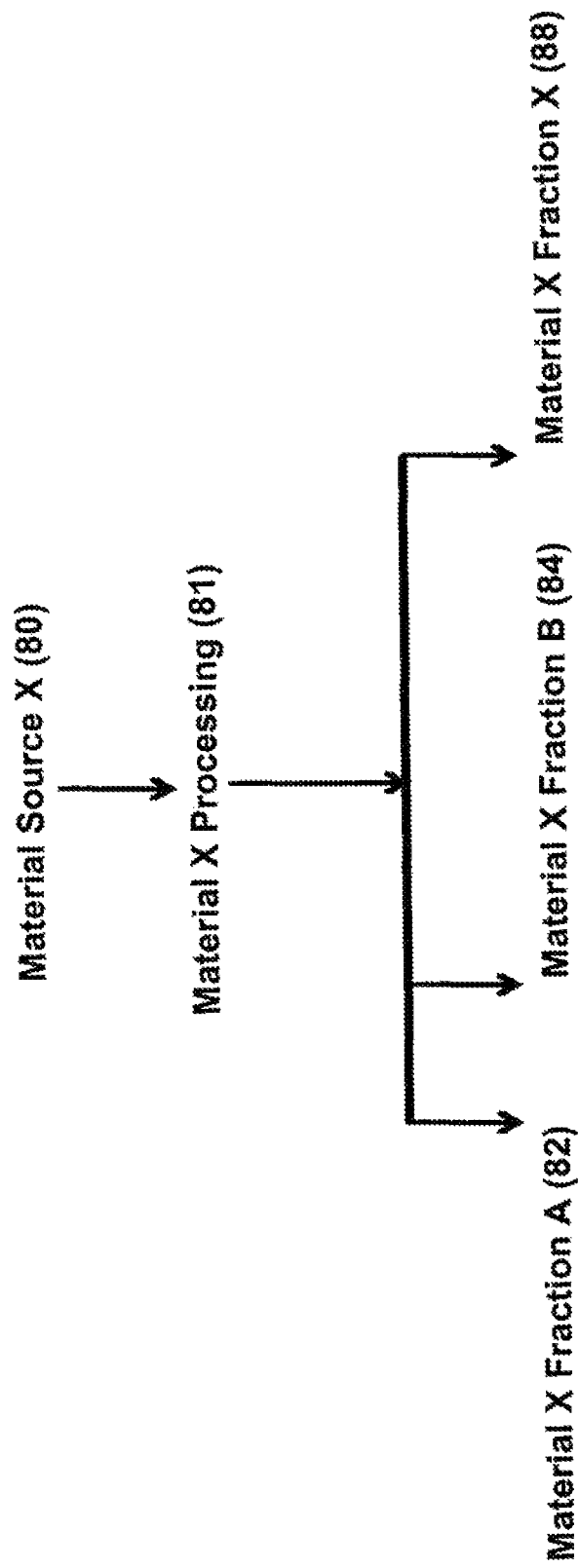
FIG. 6 illustrates a flow chart of the process wherein material source X can undergo material X processing such that a multiplicity of fractions are formed.

It is further illustrated in FIG. 3 that the materials that result from any of the multiplicity of the material A processing 41 to and including the material X processing 81 can be used in combination with any material source A 40 to and including material source X 80 and can subsequently be used in further combination with and/or in addition to the asphalt source 10 in asphalt source processing 100 to produce asphalt component 200. FIG. 5 further illustrates that material source A 40 can be processed by material A processing 41 to form a multiplicity of fractions including material A fraction A 42, material A fraction δ 44, to and including material A fraction X 48. FIG. 6 illustrates a similar situation in which material source X 80 undergoes material X processing 81 to yield a multiplicity of fractions material X fraction A 82, material X fraction δ 84, to and including material X fraction X 88. It is understood that the respective multiplicity of material sources can undergo material processing to yield a multiplicity of material fractions and that the material processing for each of the respective material sources does not have to be the same singly, sequentially, and/or in combination as any other material processing for the different material sources.

The asphalt component 200 shown in FIGS. 1, 2, and 3 can be modified by pre-pelletization processing 400. The processes heretofore described for the asphalt source processing 100 (FIGS. 2 and 3) can be used individually, sequentially, and in any combination to prepare the material for pelletization 600. It is understood that the asphalt component 200 need not be isolated between asphalt source processing 100 and pre-pelletization processing 400. Furthermore any of the source materials from material source A 40 to and including material source X 80 and any material processing from the respective material A processing 41 to and including material X processing can be combined singly and in any combination with the asphalt component 200 during the pre-pelletization processing 400 to prepare the material for pelletization 600. Similar processes utilized for the asphalt source processing 100 or any of the material A processing to material X processing do not have to be done at the same process conditions and can be done in tandem as well as sequentially to prepare the material for pelletization 600. Thus, using FIG. 2 as the simplest example, an asphalt source 10 can undergo asphalt source processing 100 to form asphalt component 200 that is immediately subject to a similar pre-pelletization process 400 to prepare the material for pelletization 600. Without intending to be limiting, the asphalt source processing 100 and the pre-pelletization processing 400 can utilize different solvents to effect a different separation or extraction. Similarly, the two processes can involve extrusion at different conditions or can use different types of extruders. The two processes can differ wherein one is heating and the other is cooling. As another example the asphalt source processing 100 can involve heating and filtration of coarse materials and the pre-pelletization processing 400 can include cooling the material to a higher viscosity to more effectively pelletize the material in pelletization 600.

The variation in asphalt source processing 100 and pre-pelletization processing 400 is important for thermal control of the asphalt component 200 such that it is modified into an optimized form to undergo pelletization 600. Material sources that require different temperatures can be optimally added in the different processes to avoid decomposition, undesirable reaction, premature reaction, and the like. Filler materials can be effectively pretreated in the asphalt source processing 100 to improve the further pre-pelletization processing 400 facilitating the enhanced compatibilization of those components prior to pelletization 600. Additional non-limiting examples will be cited subsequently in the instant invention disclosure.

Figure 8:
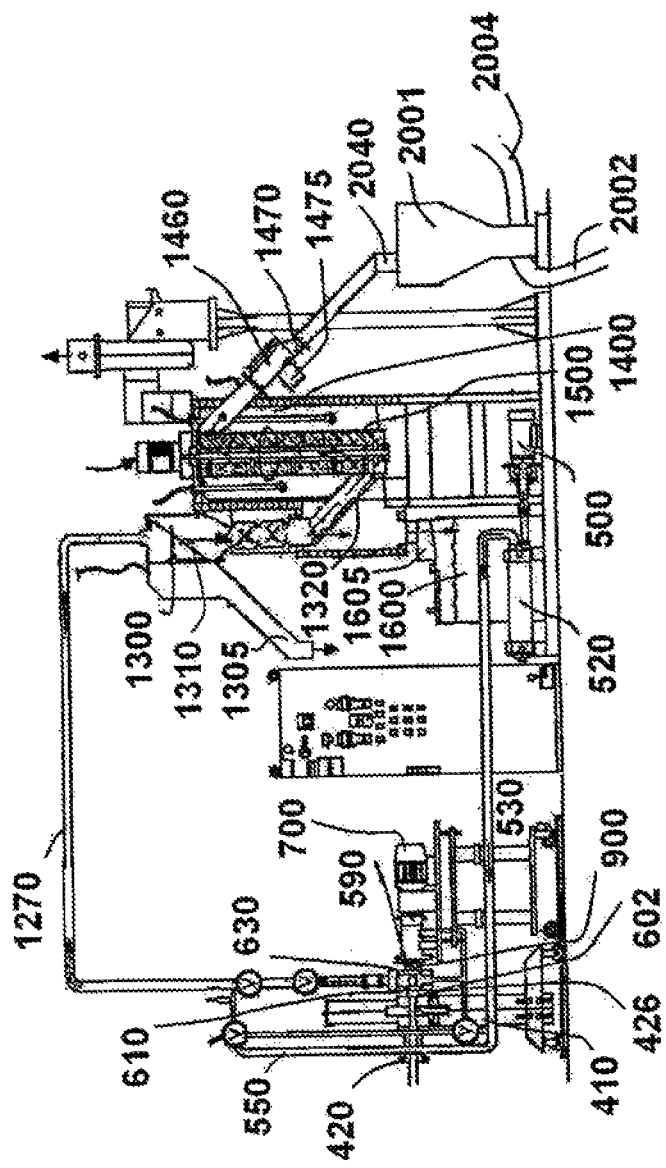
FIG. 8 is a schematic illustration of a pelletization system and transport to dewatering and drying system in series.
Figure 9:
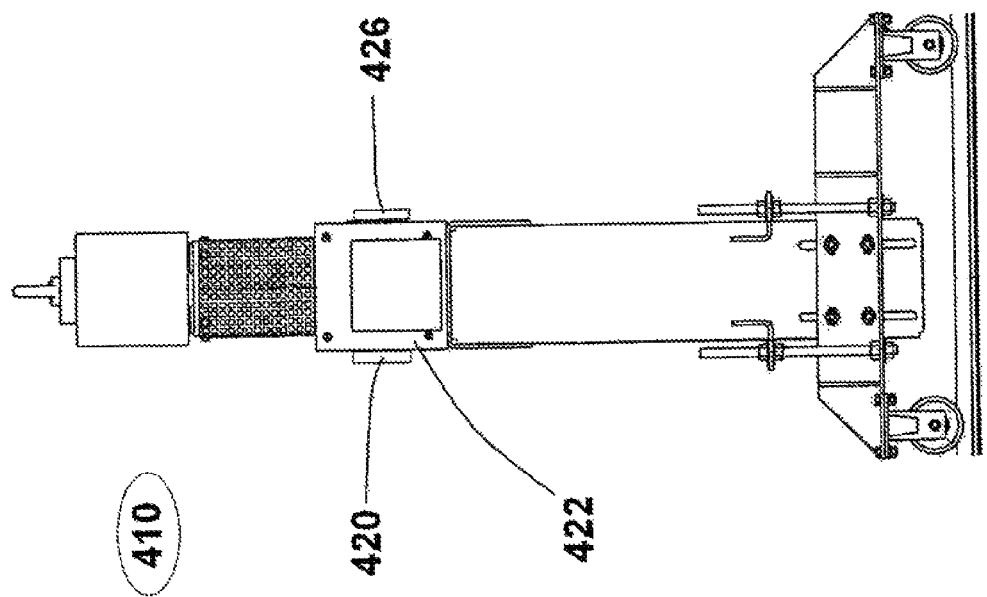
FIG. 9 is a schematic illustration of a diverter valve.

The component or components of the mixing sections illustrated in FIGS. 7a, 7b, and 7c are attachedly connected to the diverter valve 410 where the outlet 415 (FIG. 7b) is attached to inlet 420 (FIG. 8). FIG. 9 illustrates inlet 420 and outlet 426 attached to housing 422 of diverter valve 410. The movable diverter bolt, not illustrated, can be actuated electro-mechanically, hydraulically, pneumatically and many combinations thereof.

Pelletization 600 illustrated in FIGS. 1, 2, and 3, can include hot-face cutting, strand cutting, water ring cutting, and underfluid cutting and preferably is underfluid cutting. More preferably pelletization 600 is underwater pelletization as is known to those skilled in the art. Water jet pelletization, prilling, and pastille formation are prior art methods and are included herein by way of reference. Details of the pelletization process are described hereinbelow.

Figure 10:
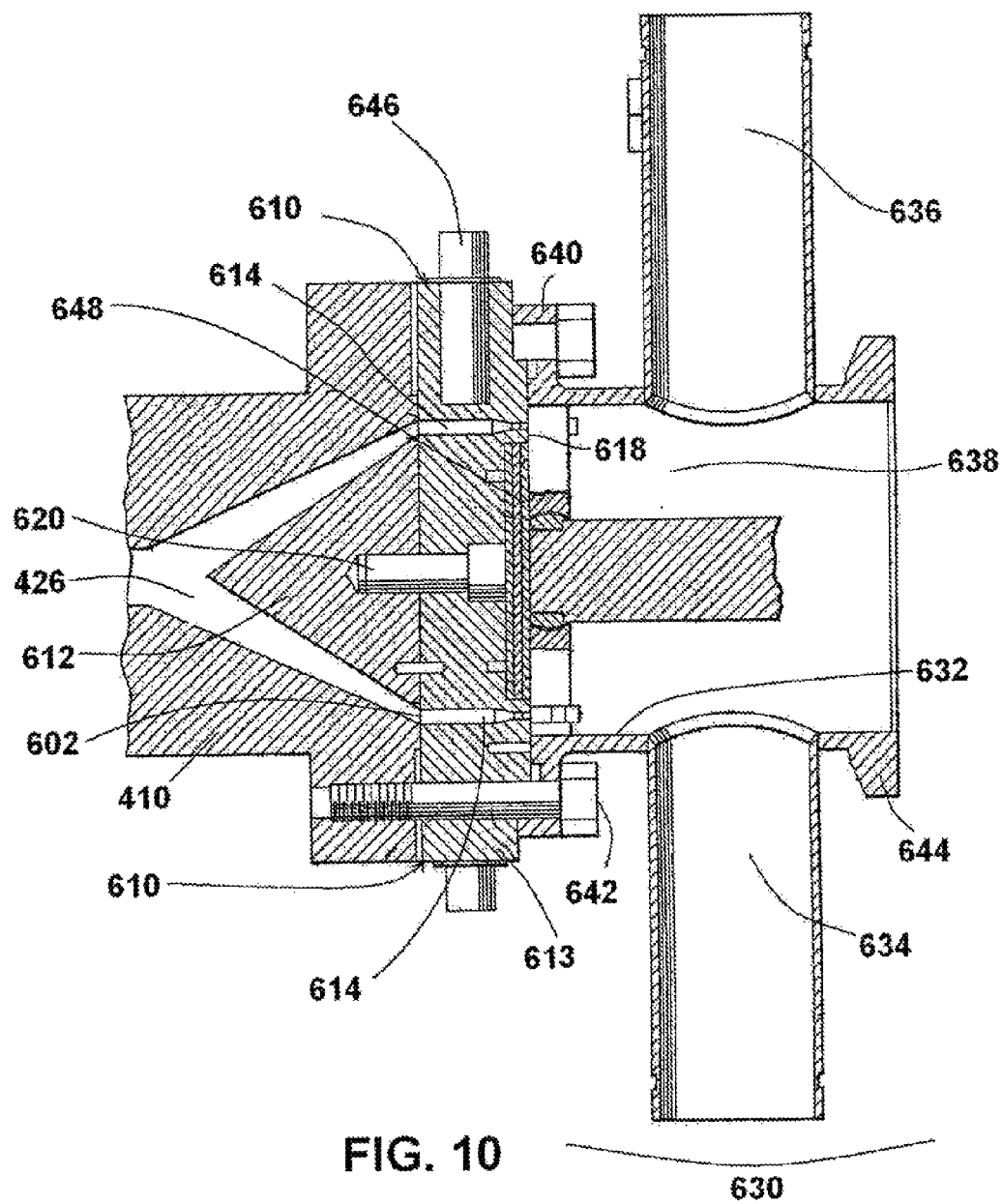
FIG. 10 is a schematic illustration of a die body with transport fluid box.
Figure 13:
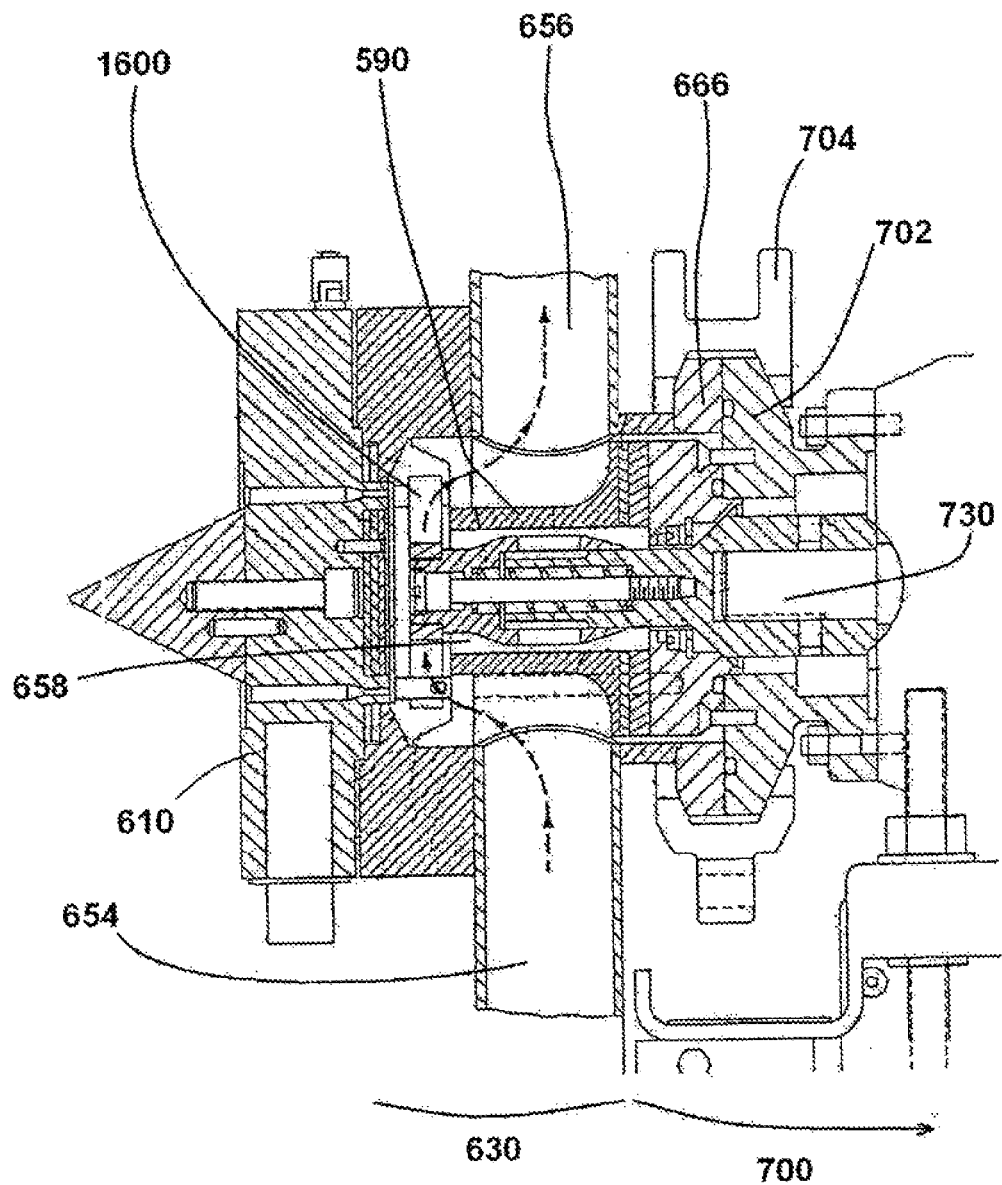
FIG. 13 is a schematic illustration of a die attached to a transport fluid box containing a flow guide.

Referring again to FIG. 8, diverter valve 410 is attached at outlet 426 to the pelletization section (illustrated in FIGS. 1, 2, and 3 as pelletization 600) at inlet 602 of the die 610, and illustrated in FIGS. 10 and 13.

The die 610 in FIG. 10 can be a single-body style including a nose cone 612 attached to die body 613 into which are fitted heating elements 646 and through which are bored multiple die holes 614 that vary in number and orientation pattern and are preferably approximately 6.5 mm in diameter or smaller. The die holes 614 can be many combinations of design including, but not limited to, increasing or decreasing taper or cylindrical or many combinations thereof and segments can vary in length as necessitated by the process and materials. Preferably the die holes 614 are placed singularly or collectively in groups or pods in one or more concentric rings as determined by the diameter of the outlet 426 of the diverter valve 410 fittedly attached thereto.

Heating elements 646 can be a cartridge or more preferably a coil type element and can be of sufficient length inside the die body 613 to remain outside the circumference of the die holes or can extend into and near the center of the die body without passing the center in length, or can extend past the center in length but not of sufficient length to contact the ring of die holes diametrically opposed as is illustrated in the prior art disclosures listed hereinabove belonging to an assignee of the instant invention and included herein by way of reference in their entirety. Positioning of the die holes will vary as would be readily recognized by one skilled in the art to accommodate the appropriate configuration of the heating elements and one or more lengths or designs of heating elements are optionally included within the scope of the present invention.

An alternative design of die 610 wherein the die body is of a removable center or insert configuration is also disclosed in the prior art and similarly is owned by an assignee of the instant invention being included herein by way of reference in its entirety. The heating elements can be of a cartridge or, more preferably, a coil configuration and can be inserted into the outer die body component whereby they are constrained in length to suitably fit within the confines of the outer die body component. The die holes 614 are contained within removable insert and are variable in design, dimension, and placement as detailed in the foregoing discussion. The removable insert is fixedly attached to outer die body component by known mechanisms.

Still another alternative design of die 610 is that in which the die body is of a removable center or insert configuration with multiple heating zones for enhanced heating efficiency and more facile thermal transfer to the molten or liquid materials as they pass through the die holes 614. The outer die body component, not shown, is comparable to that described for the removable center or insert configuration. The heated removable insert of the alternative design has an open center to which is fitted a heating element, preferably a coiled heating element, that can be thermally controlled in common with other heating elements in the outer die body component or more preferably, is autonomously regulated thermally thus allowing multizone heating capacity within the die 610. Prior art disclosures similarly owned by an assignee of the instant invention are included herein by way of reference in its entirety.

The die 610 in all configurations can contain an appropriate hardface 618 fixedly attached for a cutting surface as illustrated in FIG. 10 that is preferably an abrasion resistant, wear resistant, and where required, a corrosion resistant material and through which pass the die holes 614 for extrusion of the molten or liquid extrudate. Tungsten carbide, titanium carbide, ceramics or mixtures thereof, are common materials for hardface applications as is understood by those skilled in the art and are cited by way of example alone or in combination without intent to be limiting or otherwise restrictive within the scope of the present invention.

The bolting mechanism for the nose cone 612 is illustrated in FIG. 10 by way of example without limitation. A cover plate 648 is positionally attached by bolt 620 to the face of the die body 610 (or removable insert or heated removable insert) that can be less than or at least equal to the height dimension of the hardface 618. Alternatively, gasket material or other materials for sealing of the cover plate 648 can be used as required.

Diverter valve outlet 426 is comprised of an inner bore that is tapered diametrically and conically in increasing diameter to create a chamber continuously and proportionately larger than nose cone 612 that inserts therein. The volume of the chamber thusly generated allows unobstructed flow of the molten or liquid material to flow from the diverter valve 410 into the die hole 614. Alternatively, an adapter (not shown) can be attached to diverter valve outlet 426 which is accordingly tapered as described herein to accommodate the nose cone 612.

The diverter valve outlet 426 and alternative adapter (not shown), nose cone 612, and die body 610 in FIG. 10 as well as the removable insert and heated removable insert (not shown) can be made of carbon steel, thermally hardened carbon steel, stainless steel including martensitic and austenitic grades, thermally hardened and precipitation-hardened stainless steel, or nickel to improve resistance to abrasion, erosion, corrosion, and wear. Nitriding, carbonitriding, electrolytic plating and electroless plating techniques are for enhancement of these resistance properties are included herein by way of reference.

To provide a smooth surface for die holes 614 in FIG. 10 thusly reducing erratics from manufacturing processes including bore marks, conventional technology for the die holes 614 can include treatment by electron discharge machining (EDM) utilizing a wire that is circumferentially rotated about the die hole subsequently enhancing surface smoothness, improving uniformity of the die hole geometry, and controllably and uniformly increasing the die hole diameter. Alternatively, high-velocity abrasive and polishing grits of uniformly fine grain size can be passed through the die holes to effect improved smoothness within the die hole. Additionally, inserts to reduce abrasion and adhesion can be placed into the lands of die holes 614. Fluoropolymer, ceramic, and tungsten carbide inserts are non-limiting examples. Other surface treatments for improvement of surface properties, enhancement of corrosion and abrasion resistance, and improvement of wear can be used without intending to be limited.

Figure 11C:
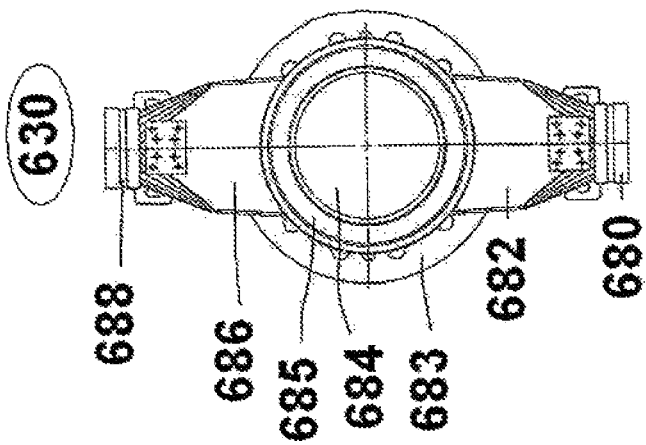
FIG. 11c is a schematic face-view illustration of the alternative transport fluid box inlet and outlet design of FIG. 11b.
Figure 11B:
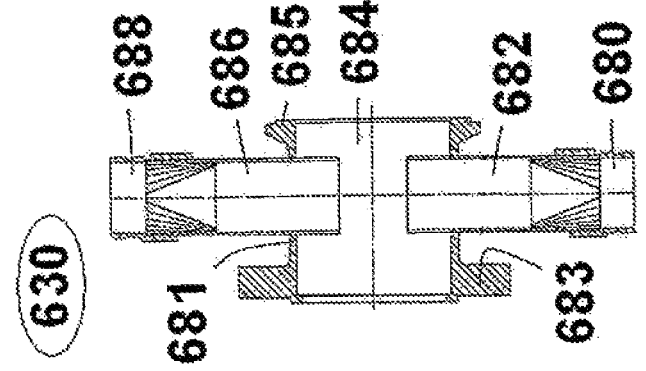
FIG. 11b is a cross-sectional illustration of an alternative transport fluid box inlet and outlet design.
Figure 11A:
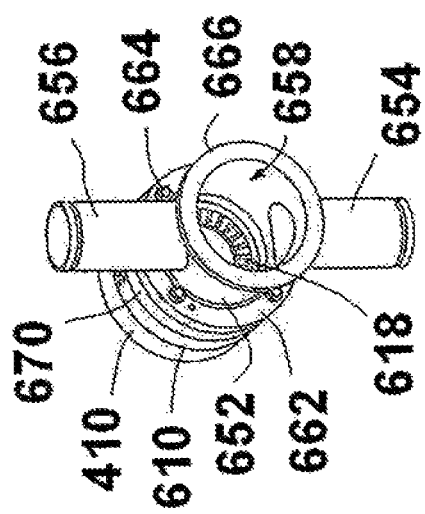
FIG. 11a is a schematic illustration of a complete assembly of a comparative two-piece transport fluid box.
Figure 12:
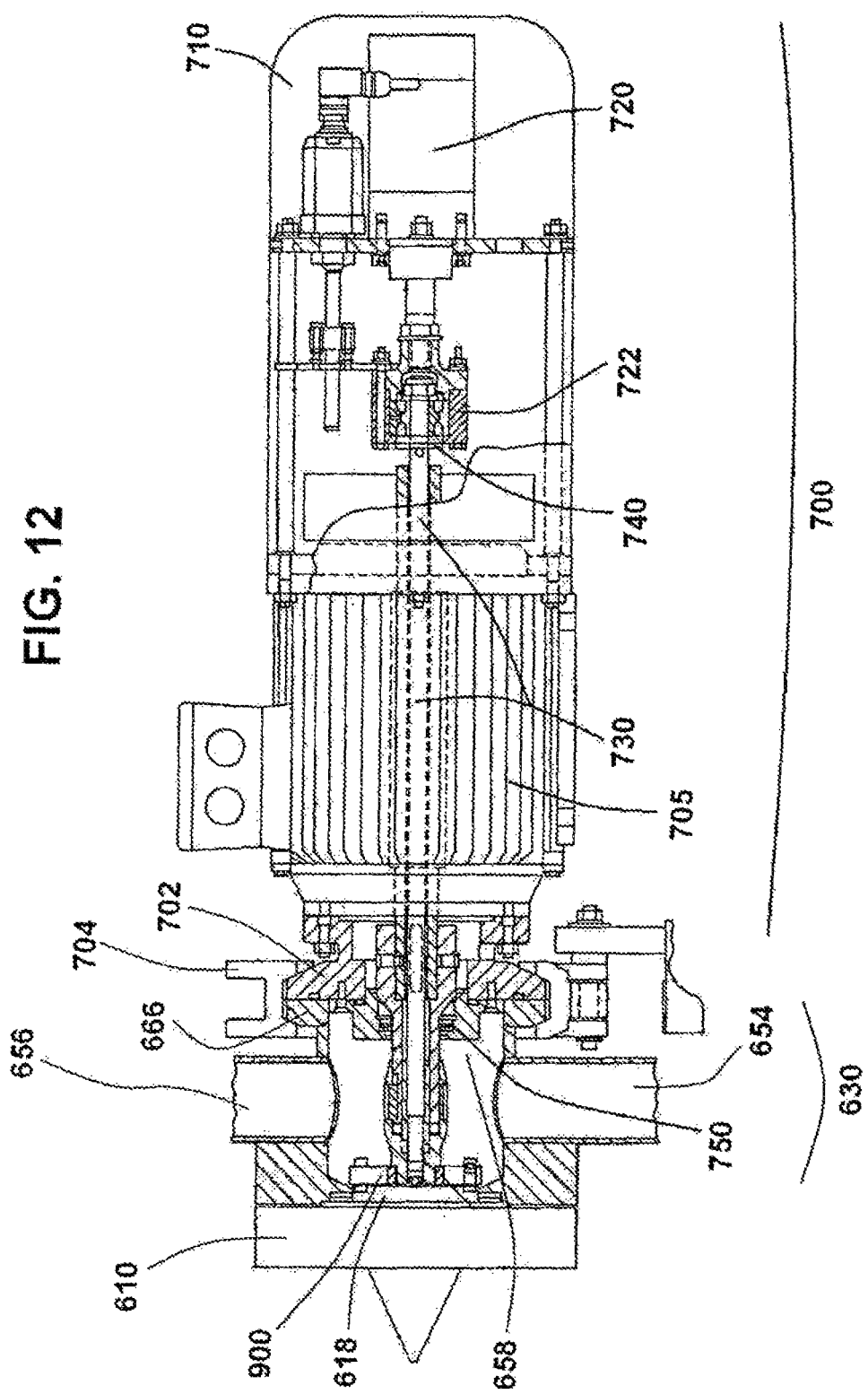
FIG. 12 is a schematic illustration of a pelletizer with attached transport fluid box showing the die.

Referring once again to FIG. 8, the die 610 is fixedly attached to transport fluid box 630 as shown in FIGS. 10 and 12 and detailed in FIGS. 11a, 11b, and 11c. FIG. 10 illustrates a configuration of a one-piece transport fluid box 630 that comprises a housing 632 to which is connected inlet pipe 634 and outlet pipe 636 of similar diameter and geometry and diametrically opposed positionally and interconnectedly attached to a rectangular, square, or preferably cylindrical or other geometrically open cutting chamber 638 surrounding and of sufficient diameter to completely encompass the die face (representationally equivalent to the surface of hardface 618). Housing 632 has mounting flange 640 through which a plurality of mounting bolts 642 pass to sealingly attach the transport fluid box or 630 and die 610 to diverter valve 410. Flange 644 on housing 632 allows attachment to the pelletizer 700 (see FIG. 8) as is detailed below. Components that are free to rotate within the cutting chamber 638 are described hereinafter. The transport fluid box 630 can be of a one-piece or two-piece configuration the details of which are disclosed in prior art references owned by an assignee of the current invention and included herein by way of reference in their entirety.

Similarly, FIG. 11a illustrates a two-piece configuration of transport fluid box 630 comprising a main body with housing 652 to which is connected inlet pipe 654 and outlet pipe 656 of similar diameter and geometry and diametrically opposed positionally and interconnectedly attached to a rectangular, square, or preferably cylindrical or other geometrically open cutting chamber 658 surrounding, and of sufficient diameter to completely encompass, the die face 618 comparably described above and as completely assembled as herein described. Housing 652 has mounting flange 662 through which a plurality of mounting bolts or studs 664 pass. Mounting flange 662 sealingly attaches to adapter ring 670 of comparable diameter, both inside and outside dimensions, through which pass a plurality of countersink bolts (not shown). Mounting bolts or studs 664 and countersink bolts are preferably alternating positionally and sealingly attach the components of and thus the complete transport fluid box 630 and die 610 to diverter valve 410. Flange 666 on housing 652 of the main body allows attachment to the pelletizer 700 (see FIG. 8) as is detailed below. Components that are free to rotate within the cutting chamber 638 in FIG. 10 and/or cutting chamber 658 in FIG. 11a are described hereinafter. Separate attachment of the adapter ring 670 to and through the die 610 allows the main body to be removed for cleaning or maintenance while leaving die 610 sealingly attached to diverter valve 410.

FIGS. 11b and 11c illustrate an alternative design for the transport fluid box or waterbox inlet and outlet in that inlet 680 is fixedly attached to a rectangular or square inlet tube 682 that taperingly increases along its length as it approaches the housing 681 to which it is attachedly connected and within which is cutting chamber 684. Similarly attached to housing 681 and diametrically opposed to inlet tube 682 is rectangular or square outlet tube 686 that taperingly decreases along its length to outlet 688 to which it is fixedly attached. Flange 683 and flange 685 in FIGS. 11b and 11c compare in design and purpose to flanges 662 and 666 in FIG. 11a previously described.

FIGS. 11a, b, and c illustrate a preferred diametrically opposed inlets and outlets. Alternatively, the inlets, 654 and 680, and outlets, 656 and 688, can be located at an angle from approximately 20° to a preferred 180° relative to and defined by the position of outlet to inlet and can be opposingly or staggeringly attached to housing 681 by way of example. Dimensions of the inlet and outlet can be the same or different and the inlet and outlet can be similar or different in design. Preferably the inlet and outlet so identified are of similar dimension and design, and are diametrically opposed.

For conventional surface treatments to reduce abrasion, erosion, corrosion, wear, and undesirable adhesion and sticture, the inner surfaces of flanges and the lumens of inlet pipes and outlet pipes can be nitrided, carbonitrided, sintered, can undergo high velocity air and fuel modified thermal treatments, and can be electrolytically plated. The exterior surfaces and exposed surfaces of die body 610 can be treated similarly. It is understood that variations illustrated in FIGS. 10 and 11a, 11b, and 11c can be treated similarly. Other surface treatments for improvement of surface properties, enhancement of corrosion and abrasion resistance, improvement of wear, improvement of wear, and/or reduction of clumping, agglomeration, and/or sticture can be used without intending to be limited.

Once again returning to the principle disclosure illustration in FIG. 8, pelletizer 700 is shown in the non-operational open position. Attached to the pelletizer is the flow guide, and cutter hub with cutter blades (not shown for simplicity of illustration). Upon operation of the equipment, pelletizer 700 is moved into position such that it can be fixedly attached to flange 644 of the one-piece configuration of transport fluid box 630 or flange 666 on the main body of the two-piece configuration of transport fluid box 630 as detailed in FIGS. 10 and 11a, respectively. Attachment is most preferably made, but not limited to quick disconnects but can be through many mechanisms. In the operating configuration, the cutter hub and cutter blades freely rotate within the cutting chamber 638 (FIG. 10) or 658 (FIG. 11a). Details of all illustrated components are contained within the ensuing discussions.

The pelletizer 700 of the instant invention is shown diagramatically in FIG. 12 and can be positionally adjustable in terms of cutter hub 900 relationally to die face 618. FIG. 12 represents the pelletizer 700 in operational position wherein it is sealingly attached via pelletizer flange 702 to transport fluid box flange 666 tightly held by removable quick disconnect clamp 704, for example. Positional adjustment of the pelletizer can be achieved manually, spring-loaded, hydraulically, pneumatically, or electromechanically, or can be achieved by combinations of these mechanisms acting cumulatively in one direction or opposingly in counter-direction of forces applied to insure appropriateness of position as necessitated to achieve even wear, increased longevity, avoidance of undue extrusion leading to melt wrap around the cutter hub or the die face 618, and consistency of the pelletized product. A preferred design is of the hydraulic-pneumatic mechanism detailed in FIG. 12 comprising a motor 705, housing 710, and containing hydraulic cylinder 720 engagedly attached to coupling 722. A rotor shaft 730 connects coupling 722 to the cutter hub 900 at the die face 618 and passes through thrust bearing 740 and sealing mechanism and preferably a mechanical sealing mechanism 750 in fluid contact with cutting chamber 658 of transport fluid box or waterbox 630. Inlet pipe 654 and outlet pipe 656 indicate flow direction of fluids, preferably water, into the cutting chamber 658, admixture of fluids and pellets in the cutting chamber 658, and subsequently, flow of the pellet slurry formed away from the cutter hub 900 as well as die face 618 and out of the cutting chamber 658.

To increase fluid velocity through the cutting chamber 658, improve pellet quality, reduce freeze off, avoid wrapping of melt around die face 618, generate or increase head pressure, and improve pellet geometry, FIG. 13 illustrates a configuration in which flow guide 590 is positioned in the cutting chamber 658 effectively reducing the fluid volume of that region. The die 610, transport fluid box 630, and pelletizer 700, shown only partially, are positionally the same as in FIG. 12. The hollow shaft rotor preferably is attached to cutter hub 1600 in cutting chamber 658 with appropriate inlet pipe 654 and outlet pipe 656 as previously described. The pelletizer 700 is sealingly and removably attached to the transport fluid box 630 through use of quick disconnect clamp 704 on pelletizer flange 702 and transport fluid box flange 666 as before. Alternative configurations for flow guide 590 are not shown in which sections can be of similar or different segmental length having consistent outside diameter that is less than the diameter of cutting chamber 658 and can be varied in accordance with the requisite diminution of volume desired in that cutting chamber 658. Flow guide spacer sections can be uniform circumferentially and diametrically but can vary in segmental length singly or plurally and are not limited in plurality. To direct and/or restrict flow, flow directing segments singly or unlimited are modified by longitudinally extending grooves that are arcuate in transverse configuration with the deepest grooved section positioned proximal to the cutter hub 600. A preferred configuration of a series of segments is not intended to be limited as to number of segments and a single flow guide component of comparable geometry and functionality is well within the scope of the present invention.

Figure 14:
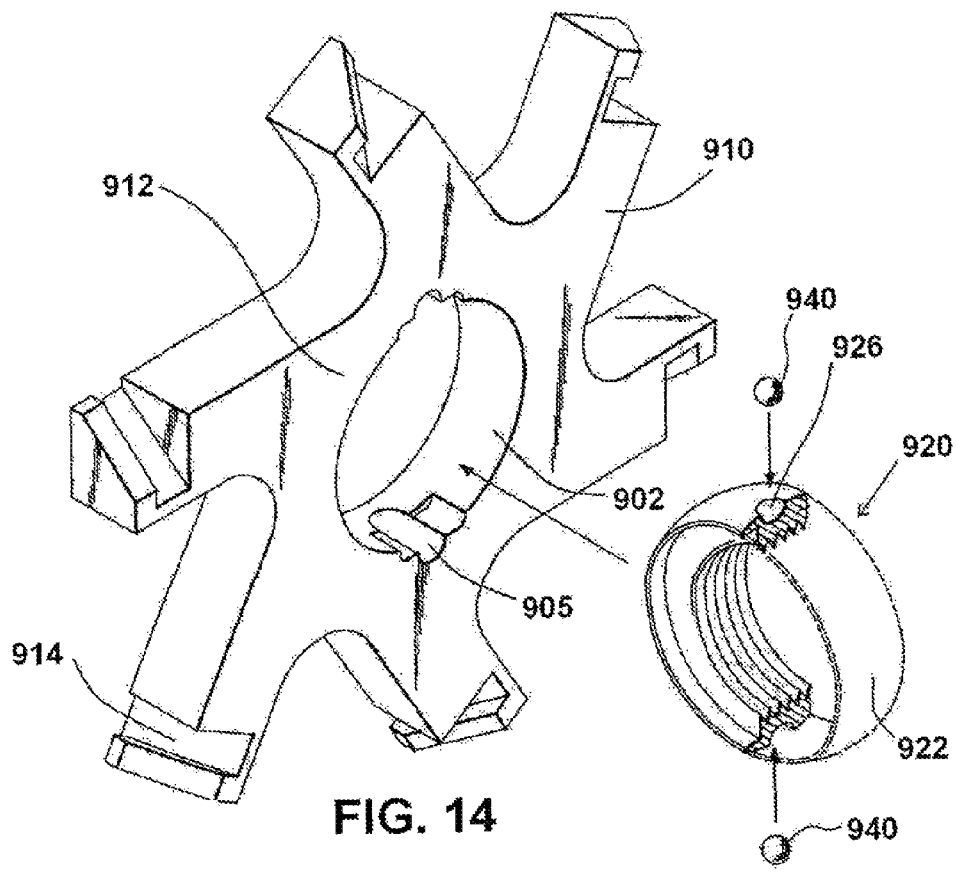
FIG. 14 is a schematic illustration of a comparative flexible cutter hub with exploded view of flexible hub component.

Returning to FIG. 12, cutter hub 900 is attached by screwing onto the threaded end of the rotor shaft 730 of pelletizer 700. The cutter hub 900 can be rigidly mounted to the rotor shaft 730 and can contain a number of cutter arms 910 in balanced proportion placed circumferentially about the cutter hub 900 as illustrated in FIG. 14. Alternatively and preferably, the cutter hub 900 is flexibly attached to rotor shaft 730 using an adapter 920 in which the adapter 920 is attachedly and threadedly connected to rotor shaft 730. Adapter 920 has a partial spherical outer surface 922 matching a similar partial spherical inner surface bore 902 in the cutter hub 900. Diametrically opposed and recessed into the partial spherical inner surface bore 902 are longitudinal recesses 905 that extend to the edge of the cutter hub 900 and into that fit ball 940. Similarly, diametrical recesses 926 for ball 940 are located on adapter 920 positionally oriented such that longitudinal recess 905 and diametrical recess 926 align to interlockingly affix balls 940 once adapter 920 is inserted orthogonally into position and rotated to a position parallel to cutter hub 900. This allows free oscillation of the cutter hub 900 about the diametrically positioned balls 940 on fixedly attached adapter 920 to rotor shaft 730 that permits rotational self-alignment of the cutter hub 900.

Figure 15A:
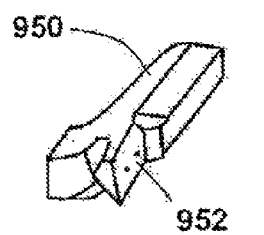
FIG. 15a is a schematic view of a portion of a streamline cutter hub.
Figure 15B:
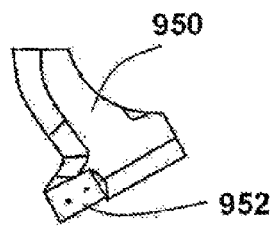
Figure 15C:
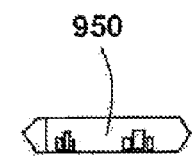

The cutter arms 910 and body of cutter hub 912 can be square or preferably rectangular in cross-section as shown in FIG. 14 or can be more streamlined to give an extended hexagonal cross-section as illustrated in FIG. 15c. FIGS. 15a and 15b shows segments of streamline cutter hub 950. Cutter blades (not shown) are fixedly attached by screw or similar mechanism at flattened angular groove 914, FIG. 14, or at flattened angular notch 952, FIGS. 15a and 15b.

Figure 16:
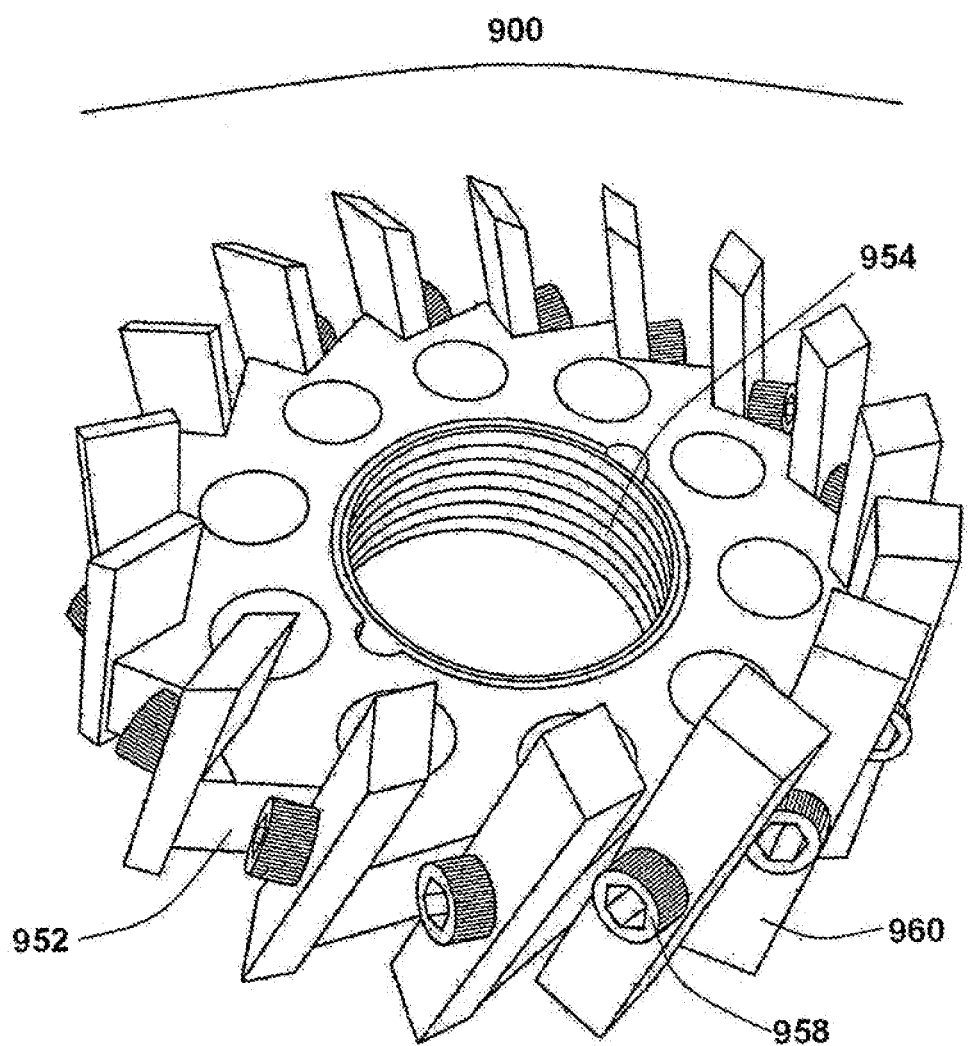
FIG. 16 is a schematic illustration of a steep angle cutter hub.

Alternatively, FIG. 16 illustrates a preferred steep-angle cutter hub 900, in which cutter arms 910 as shown in FIG. 14 are optionally replaced by cutter blade support 952 to which are attached cutter blade 960 preferably by screw 958 while other mechanisms are known to those skilled in the art and are not limited as herein described. Adapter 954 allows self-aligning flexibility with threaded attachment to rotor shaft 730, FIG. 12, as detailed previously. Other cutter hub designs that are functionally equivalent are within the scope of the present invention as are known to those skilled in the art.

FIGS. 17a, 17b, 17c, and 17d illustrate various angularly inclined positions and shapes of the cutter blades 960. The blade angle 965 can vary from approximately 0° to approximately 110° or greater, FIGS. 17a, b, and c, relative to die face 618, FIG. 10, with a blade angle 965 of between approximately 60° to approximately 79° preferred, FIG. 17b, and a blade angle of approximately 75° more preferred. The blade cutting edge 970 can be square, beveled, or angled as has been demonstrated by prior art and is preferably at a blade cutting angle 975 of approximately 20° to approximately 50° and more preferred at approximately 45°. Alternatively, and most preferred, is a half-thickness blade 980 as illustrated in FIG. 17d that can be similarly attached, similarly angled, and with comparable blade cutting angles and preferences as described above. Additionally, blade designs, dimensionally and compositionally, can prove useful depending on other process parameters.

The cutter blade 960 and half-thickness blade 980 compositionally include, but are not limited to, tool steel, stainless steel, nickel and nickel alloys, metal-ceramic composites, ceramics, metal or metal carbide composites, carbides, vanadium hardened steel, suitably hardened plastic, or other comparably durable material and can be further annealed and hardened as is well known to those skilled in the art. Wear-resistance, corrosion resistance, durability, wear lifetime, chemical resistance, and abrasion resistance are some of the important concepts influencing the utility of a particular blade relative to the formulation being pelletized. Blade dimensions of length, width, and thickness as well as number of blades used relationally with cutter hub design are not limited within the scope of the present invention.

Returning to FIG. 12, conventional surface treatments to reduce abrasion, erosion, corrosion, wear, and undesirable adhesion and sticture, can be applied to the outer surface of the exposed portion of the rotor shaft 730 that extends out from the transport fluid box flange 666 into cutting chamber 658 and can be nitrided, carbonitrided, metallized by sintering, and electrolytically plated. The extent of the surface treatment on rotor shaft 730 is reduced to the portion distal from waterbox flange 666 when flow guide 590 is utilized to reduce the volume of the cutting chamber 658 as heretofore described.

Similarly, conventional nitriding, carbonitriding, sintering, high velocity air and fuel modified thermal treatments, and electrolytic plating can also be applied to the surfaces of flow guide 590 (FIG. 13). In particular, the outlet flow surfaces the inlet flow surfaces flow guide faces distal from flange 666 and flow guide faces (not shown) proximal to flange 666, the flow guide lumen surfaces, and the flow guide circumferential surface. These same conventional treatments can be applied to the cutter hub and arm surfaces of cutter hub 912 and cutter arms 910 detailed in FIG. 14 and to cutter hub and arm surfaces of variant design cutter hub and cutter arms illustrated in FIGS. 15a and 15b. Cutter blade 960 and half-thickness blade 980 illustrated in FIGS. 17a, b, c, d may be similarly treated on the tip surfaces and edge surfaces. Alternatively, circumferential blade surfaces can optionally be treated conventionally as well. Other surface treatments for improvement of surface properties, enhancement of corrosion and abrasion resistance, improvement of wear, and/or reduction of clumping, agglomeration, and/or sticture can be used without intending to be limited.

FIG. 8 illustrates the relative position of the bypass loop 550. A transport medium, for example, water or comparable fluid for use in the bypass loop 550 and pellet transportation, is obtained from reservoir 1600 or other sources, and is transported toward the transport fluid box 630 through pump 500 that can be of a design and/or configuration to provide sufficient fluid flow into and through the optional heat exchanger 520 and transport pipe 530 to and into bypass loop 550. The heat exchanger 520 similarly can be of a design of suitable capacity to maintain the temperature of the water or other transport fluid at a temperature appropriately suitable to maintain the temperature of the pellets being formed such that pellet geometry, throughput, and pellet quality are satisfactory without tailing, and where wrap-around of molten plastic on the cutting face, agglomeration of pellets, cavitation, and/or accumulation of pellets in the transport fluid box or waterbox are maximally avoided. Temperatures and flow rates as well as composition of the transport fluid will vary with the material or formulation being processed. Transport medium/fluid temperatures are preferably maintained at least approximately 20° C. below the melting temperature of the polymer and preferably are maintained at a temperature of between approximately 30° C. to approximately 100° C. below the melt temperature. Maintenance of the transport fluid temperature is more preferably maintained from between approximately 0° C. to approximately 100° C., still more preferred from between approximately 10° C. to approximately 90° C., and most preferably from between approximately 60° C. to approximately 85° C.

Pump 500 and heat exchanger 520 in FIG. 8 are prone to abrasion, erosion, corrosion, and wear as well particularly from by-products of the pelletization process, and components (not shown) can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

Additionally processing aids, flow modifiers, surface modifiers, coatings, surface treatments including antistats and various additives known to those skilled in the art can be accommodated in the transport fluid. Piping, valving, and bypass components should be of suitable construction to withstand the temperature, chemical composition, abrasivity, corrosivity, and/or any pressure requisite to the proper transport of the pellet-transport fluid mixture. Any pressure required by the system is determined by the transport distance, vertical and horizontal, pressure level needed to suppress unwanted volatilization of components or premature expansion, pellet-transport fluid slurry flow through valving, coarse screening, and ancillary process and/or monitoring equipment. Pellet-to-transport fluid ratios should similarly be of varying proportions to be satisfactorily effective in eliminating or alleviating the above-mentioned complicating circumstances exemplary of which are pellet accumulation, flow blockage or obstruction, and agglomeration. Piping diameter and distances required are determined by the material throughput, thus the flow rate and pellet-to-transport fluid ratio, and time required to achieve an appropriate level of cooling and/or solidification of the pellets to avoid undesirable volatilization and/or premature expansion. Valving, gauges, or other processing and monitoring equipment should be of sufficient flow and pressure rating as well as of sufficient throughpass diameter to avoid undue blockage, obstruction or otherwise alter the process leading to additional and undesirable pressure generation or process occlusion. Excess transport fluid and/or additives should be readily removable from the pellets by such methods as rinsing, aspiration, evaporation, dewatering, solvent removal, filtration, or a similar technique understood by those skilled in the art. It is understood by those skilled in the art that these must be compatible with the asphalt pellets formed and can be easily removed, or where beneficial, can be incorporated in or on the pellets being transported as by dissolution, solubilization, absorption and/or adsorption, wicking, capillary action, and the like.

FIGS. 2 and 3 disclose such a post-pelletization process 800 that can include cooling of the pellets formed by pelletization 600, preliminary drying of the pellets, modification and/or exchange of the transport fluid, coating of the pellet, combination of the pellet with any material source from material source A 40 to and including material source X 80 and any modification of material source A 40 to and including material source X 80 by any respective material A processing 41 to and including material X processing 81. In the preferred embodiment of the present invention, a fraction of the asphalt source 10 is recombined with another fraction of asphalt source 10 as separated by asphalt processing 100 in accordance with FIGS. 3 and 4 such that the pellet formed is of at least similar composition to the original asphalt source 10 but is now in a form that is improved in terms of being free flowing, not subject to cold flow, and is not compressible in packaging on storage as compared to the original non-fractionated asphalt source 10.

Pelletization 600 as known to those skilled in the art is generically a process in which an asphalt melt is prepared by pre-pelletization processing 400 and is pressurized sufficiently to extrude that melt into and through a die following which the extrudate is discharged into a cutting chamber containing a rotating cutter hub with blades about a cutting face on the die. The cutting chamber is purged by a moving volume of transport fluid into and through it to remove the pellets thusly formed the details of which have been described hereinabove. The transport fluid can be any liquid, including emulsions and dispersions optionally, that is compatible with the asphalt pellets formed and is not a solvent for the pellet or a component of the pellet formed. Preferably the transport fluid is water.

Conventional coating processes can include at least one step such as coating the pellet with a material contained in the transport fluid commonly in the form of an emulsion or dispersion. They can also include two or more steps in which a binder fluid is applied after reasonable reduction of moisture content on the pellet followed by application of a second layer that can be a powder, solution, emulsion, dispersion, and the like. Conventional binders can include wax, polymers, and the like and can be tacky, at least when damp, such that the second layer is easily applied and readily adheres. It is essential to these conventional techniques that the materials used will become part of the formulation and not compromise the formulation.

Multi-step coating processes conventionally can include formation of a pellet as described during pelletization 600 such that the pellets are transport to a dewatering device or other suitable dryer such that at least a portion of the transport fluid is removed from the pellet surface. These reduced moisture pellets are discharged into the first coating process, as by tumbling and/or spraying for example, to form the first layer or binder. Subsequently the pellet with binder is discharged into a second coating process, as by tumbling and/or spraying for example, to apply the next sequential layer, continuing in the process until such coatings are satisfactory. Additional drying can be done as needed as described hereinbelow.

The optional emulsions and dispersions useful in the instant invention are materials that can adhere to the surface of the asphalt pellet and serve the purpose of at least one of providing a binding layer to which can be adhered additional components, a sealing layer, a hardening layer, a detackifying layer, and the like. In the preferred embodiment, the emulsions and dispersion are in a compatible fluid, more preferably in water, and still more preferably are asphalt emulsions and dispersions that can be formed from at least one of the material source A 40 to and including material source X 80 and processes including the respective material A processing 41 to and including material X processing 81. These preferable asphalt emulsions provide a modified surface to the pellet wherein required to enhance the free-flowing properties, reduced cold flow, and resistance to compression in packaging and storage in accordance with the preferred embodiment of the extant invention.

The transport fluid can be used to provide cooling to the pellet formed in pelletization 600 in accordance with post-pelletization process 800 wherein the temperature of the transport fluid can be regulated exemplarily by heat-exchanging processes known to those skilled in the art. Additionally the transport fluid can be removed as by filtration, dewatering, fluidized bed, centrifuge, centrifugal drier and the like, preliminarily and/or partially drying the pellets. These pellets can undergo at least one of particulate coating as by tumbling, additional fluidic coating as by spraying, and allowing admixture with at least one additional transport fluid similarly defined as above such that the transport fluids can be different in temperature, chemical composition, physical composition, and the like. Additional separation of the pellets followed by any of the heretofore described processes can be undergone by the pellets as part of the post-pelletization process 800. The materials utilized in the particulate and/or fluidic coatings can be formed from at least one of the material source A 40 to and including material source X 80 and processes including the respective material A processing 41 to and including material X processing 81. In a preferred embodiment of the instant invention, the coating materials can be a fraction of the asphalt source 10 as separated in accordance with the description and illustrated in FIG. 4 as disclosed hereinabove.

Pellets produced through the post-pelletization process 800 in FIGS. 2 and 3 are then subjected to drying 1000. Methods of drying can include at least one of atmospheric evaporation, vacuum evaporation, infrared heating, filtration, dewatering, fluidized bed, tumbling drying, counter-current air or inert gas flow particularly wherein the drying gas has a low dew point, vibratory drying with or without inert gas or air flow, centrifuge, centrifugal drier, self-cleaning centrifugal drier, and the like as are known to those skilled in the art. The fluids removed during drying 1000 can be recycled to return the fluid to the pelletization process 600 or can be recycled to return the fluid to the post-pelletization process 800 particularly wherein different transport fluids are involved. Recycling processes can include at least one of simple transport by gravity or under pressure, filtration, distillation atmospherically or in vacuo, condensation, phase separation, fractionation, and the like.

Figure 18:
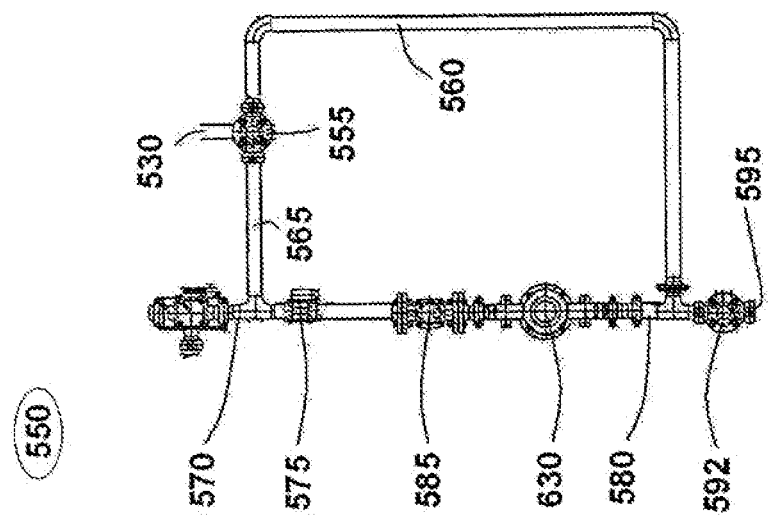
FIG. 18 is a schematic illustration of a standard bypass.
Figure 19:
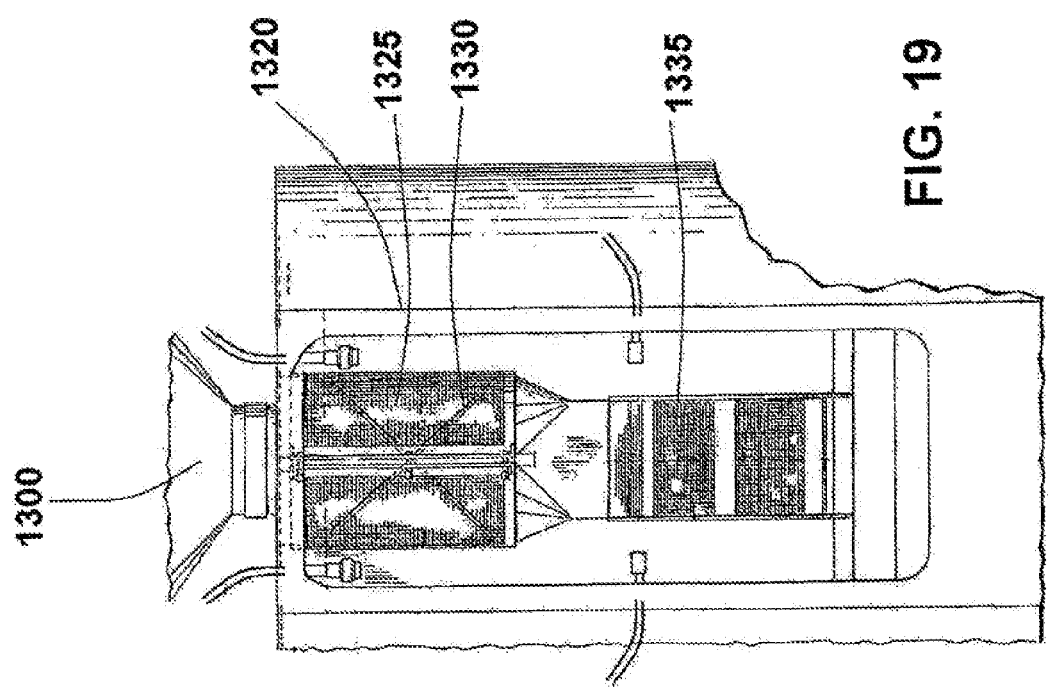
FIG. 19 is a schematic illustration of the dewatering portion of the dryer in FIG. 20.

By way of illustration of an exemplary drying process, returning to FIG. 8, the pellet transport fluid slurry generated by pelletization 600 (FIGS. 1, 2, and 3) pass through and out of the transport fluid box 630 into and through the bypass loop 550, detailed in FIG. 18, into and through pipe 1270 and is discharged into an agglomerate catcher 1300 that catches, removes and discharges pellet agglomerates through a discharge chute 1305. The agglomerate catcher 1300 can include an angled round or square bar grid, perforated plate or screen 1310 that permits passage of fluid and pellets but collects adhered, clumped, or otherwise agglomerated pellets and directs them toward the discharge chute 1305. The pellets and fluid slurry then optionally pass into a dewaterer 1320, FIG. 19 with additional detail in FIG. 20, that includes at least one vertical or horizontal dewatering foraminous membrane screen 1325 containing one or more baffles 1330 and/or an inclined foraminous membrane screen 1335 that enables fluid to pass downwardly into a fines removal screen 1605 and therethrough to the water reservoir 1600 (FIG. 8). The pellets that still retain moisture on their surfaces are discharged from dewaterer 1320 into the lower end of the centrifugal dryer 1400 at a slurry inlet 1405, FIG. 20.

The standard bypass loop 550, as illustrated in FIG. 18, allows the transport fluid, preferably water, from inlet pipe 530 to enter three-way valve 555 and be redirected into the bypass flow or toward the transport fluid box 630. To bypass the transport fluid box 630, the transport fluid is directed by three-way valve 555 into and through bypass pipe 565 into outlet pipe 570. To achieve this, blocking valve 575 is closed. Alternatively, to allow water to flow to and through the transport fluid box 630 the three-way valve 555 is directed to allow flow into and through pipe 560 and into pipe 580 with blocking valve 575 open and with drain valve 592 closed. Water proceeds into and through transport fluid box 630 and transports pellets into and through sight glass 585 through blocking valve 575 and into outlet pipe 570 for down-stream processing as described below. To drain the system and allow cleaning or maintenance of the transport fluid box 630 or die face 618 or to replace any of the die 610 components, three-way valve 555 directs flow into and through pipe 565 and into outlet pipe 570. With blocking valve 575 now closed and drain valve 592 open, the water remaining entrapped below 575, in components 585, 630, 560, and 580 drains out drain 595 for recycling or disposal.

Abrasion, erosion, corrosion, wear, and undesirable adhesion and sticture can be problematic in transport piping as illustrated FIG. 8 for pipe 1270, in FIG. 18 for bypass loop 550 piping exemplarily including pipes 530, 560, and 565. These pipes can be manufactured to form short radius and long radius right angles or alternatively can be bent to form short radius and long radius sweep angles or curves. Without intending to be bound by theory, it is anticipated that induced stresses can be introduced by such manipulations potentially leading to increased likelihood of wear-related failures due to abrasion, erosion, and/or corrosion, for example. Treatments including nitriding, carbonitriding, sintering, electrolytic plating, electroless plating, thermal hardening, plasma treatments, extrusion, rotational molding or "rotolining", slush molding, and combinations thereof can be utilized to improve the resistance to wear-related processes and to reduce adhesion and sticture. Other surface treatments for improvement of surface properties, enhancement of corrosion and abrasion resistance, improvement of wear, and/or reduction of clumping, agglomeration, and/or sticture can be used without intending to be limited.

Figure 20:
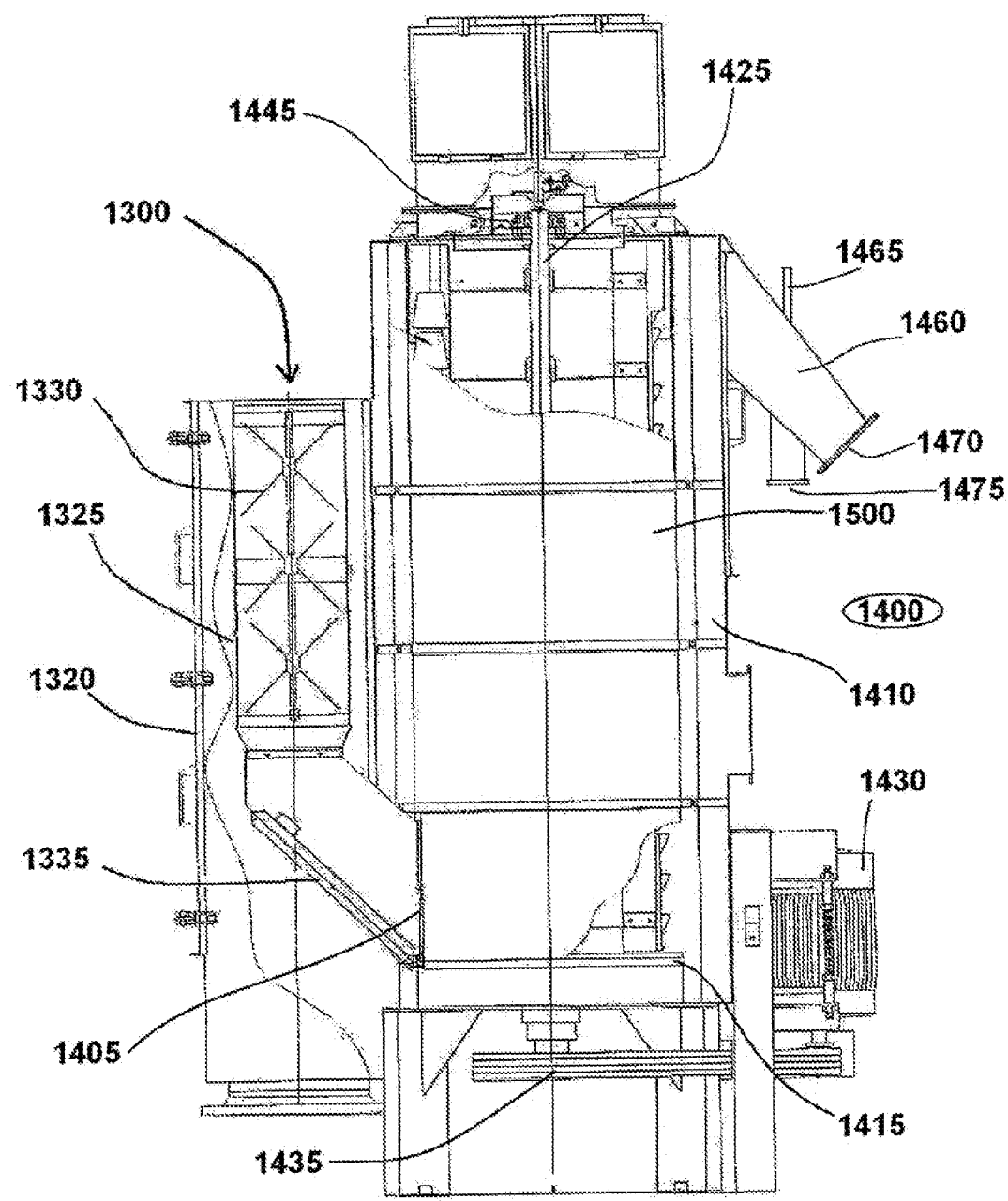
FIG. 20 is a schematic illustration of a dryer with attached dewatering section.

As illustrated in FIG. 20, the centrifugal dryer 1400 includes but is not limited to a generally cylindrical housing 1410 having a vertically oriented generally cylindrical screen 1500 mounted on a cylindrical screen support 1415 at the base of the screen, and a cylindrical screen support, not shown, at the top of the screen. The screen 1500 is thus positioned concentrically within the housing 1410 in radially spaced relation from the inside wall of the housing.

A vertical rotor 1425 is mounted for rotation within the screen 1500 and is rotatably driven by a motor 1430 that can be mounted at and/or connected to the base of the dryer or at the top of the dryer. The motor 1430 is connected to the rotor 1425 by a drive connection 1435 and through a bearing, not shown, connected with the lower end of the housing. The connection 1445 and bearing support the rotor 1425 and guide the rotational movement of the rotor. The slurry inlet 1405 is in communication with the lower end of the screen 1500 and rotor 1425 through the lower screen support section (not shown), and the upper end of the housing and rotor is in communication with a dried pellet discharge chute 1460 through a connection, not shown, in the upper screen support section at the upper end of the housing. A diverter plate 1465 (shown only as the handle as illustrated) in discharge chute 1460 can divert dried pellets out of exit 1470 or exit 1475. The lower end of the housing 1410 (FIG. 20) is connected to a water tank or reservoir 1600 (FIG. 8).

Removal of the surface moisture on the pellets is achieved by action of the rotor that elevates the pellets and imparts centrifugal forces to the pellets so that impact against the interior of the screen 1500 will remove moisture from the pellets with such moisture passing through the screen and ultimately into the reservoir 1600 in a manner well known in the art. It is understood that the present invention anticipates many designs of dryer 1400 can satisfactorily dry the pellet; including self-cleaning dryers as are known to those skilled in the art can be used effectively to achieve comparable results as disclosed herein. Prior art owned by an assignee of the present invention is cited hereinabove in consideration of alternative dryer designs and is included herein by way of reference in its entirety. Components of centrifugal dryer 1400 in FIGS. 3 and 20 can be prone to abrasion, erosion, corrosion, and wear from by-products of the pelletization process as well as from the impact and/or adhesion of pellets on the surface of those components and can optionally be surface treated utilizing conventional nitriding, carbonitriding, sintering, high velocity air and fuel modified thermal treatments, and electrolytic plating. In addition, flame spray, thermal spray, plasma treatment, electroless nickel dispersion treatments, and electrolytic plasma treatments, singly and in combinations thereof can be utilized as is known to those skilled in the art.

The screens for the process include none, one or more horizontal or vertical dewatering screens 1325, inclined dewatering screen 1335, port screens (not shown), and/or one or more cylindrically attachable screens 1500 as illustrated in FIG. 20. The size, composition, and dimensions of the screens should accommodate the pellets being generated and can be perforated, punched, pierced, woven, or of another configuration known to those skilled in the art and can be the same or different in construction, composition, and style. As the pellet size decreases in diameter, preferably the screens will be composed of two or more layers that can be of similar or different composition, design, and size. The screens are fixedly attached by latches, clamps, bolts, and many other mechanisms appropriately understood by those skilled in the art.

Figures 23, 24:
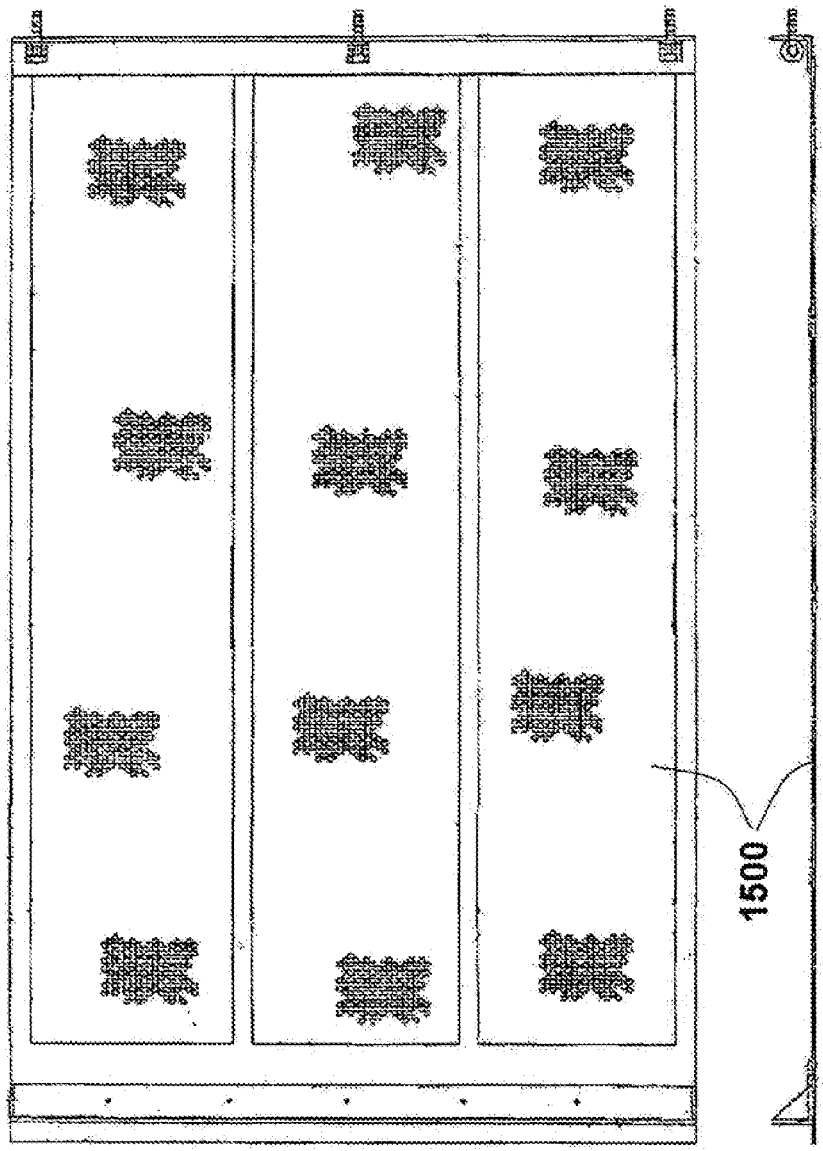
FIG. 23 illustrates a dryer screen of a configuration not requiring deflector bars.
FIG. 24 is a cross-sectional illustration of the dryer screen of FIG. 23 without deflector bars.
Figure 25:
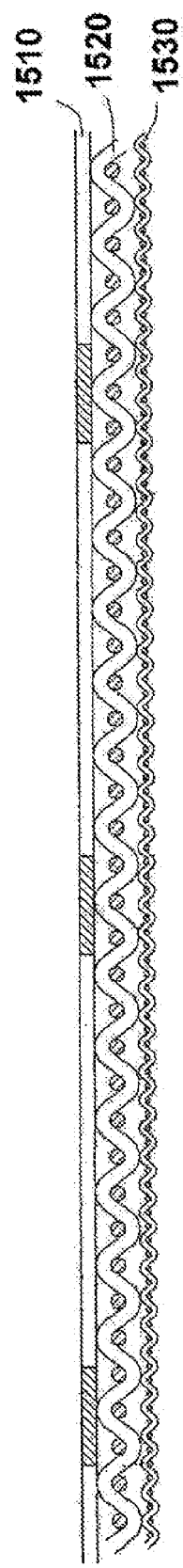
FIG. 25 illustrates an enlarged edge-on view of a three-layer screen.
Figure 26:
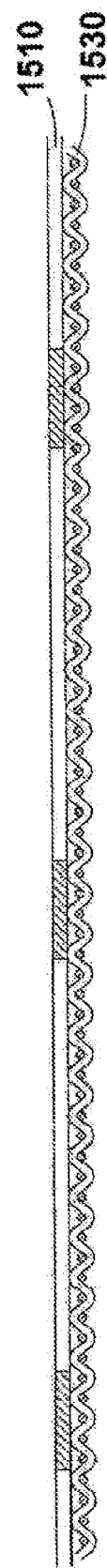
FIG. 26 illustrates an enlarged edge-on view of a two-layer screen.

The screens 1500 are preferably of suitably flexible construction as to be circumferentially placed around the dryer 1400 and rotor 1425, and can contain deflector bars 1550 as illustrated in FIG. 21, face view, and FIG. 22, edge view, that are bolted in placed effectively segmentalizing the screen area into approximately equal areas. Alternatively, the screens can by free of deflector bars as seen in the face view of FIG. 23 with an edge view illustrated in FIG. 24. As the pellet size decrease, screens 1500 can be compositionally two or more layers functionally incorporating an outer support screen 1510 and an inner screen 1530 that accomplishes the effective drying of the pellets and smaller micropellets. Additionally, one or more screen layers 1520 can be sandwiched between the outer support screen and the inner screen depending upon the particular application. FIG. 25 illustrates an edge view of a three-layer composition and FIG. 26 illustrates a similar edge view of a two-layer composition.

The screen 1500 can be composed of molded plastic or wire-reinforced plastic and compositionally can be polyethylene, polypropylene, polyester, polyamide or nylon, polyvinyl chloride, polyurethane, or similarly inert material that capably maintains its structural integrity under chemical and physical conditions anticipated in the operation of the centrifugal pellet dryers. Preferably, screen 1500 is a metal plate of suitable thickness to maintain the structural integrity of the overall screen assembly and flexible enough to be contoured, exemplarily cylindrically, to fit tightly and positionally in the appropriate centrifugal pellet dryer. The metal plate is preferably 18 gauge to 24 gauge and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel as necessitated environmentally by the chemical processes undergoing the drying operation.

The metal plate can be pierced, punched, perforated, or slotted to form openings that can be round, oval, square, rectangular, triangular, polygonal, or other dimensionally equivalent structure to provide open areas for separation and subsequent drying. Preferably the openings are round perforations and geometrically staggered to provide the maximum open area while retaining the structural integrity of the outer support screen. The round perforations are preferably at least approximately 0.075 inches (approximately 1.9 mm) in diameter and are positionally staggered to provide an open area of at least approximately 30%. More preferred is an open area geometric orientation such that the effective open area is approximately 40% or more. Most preferred are round perforations having a diameter of at least approximately 0.1875 inches (approximately 4.7 mm) that are positionally staggered to achieve an open area of approximately 50% or more.

Alternatively, the screen 1500 can be an assembled structure or screen composed of wires, rods, or bars, stacked angularly or orthogonally, or interwoven, and welded, brazed, resistance welded or otherwise permanently adhered in position. The wires, rods, or bars can be plastic or wire-reinforced plastic compositionally similar to the molded plastic described above or can be metal, similarly and compositionally delineated as above and can be geometrically round, oval, square, rectangular, triangular or wedge-shaped, polygonal or structurally similar. The wires, rods, or bars across the width or warp of the screen can be the same as or different dimensionally as the wires, rods, or bars longitudinally contained as the weft, shute, or otherwise known to those skilled in the art.

Figure 27A:
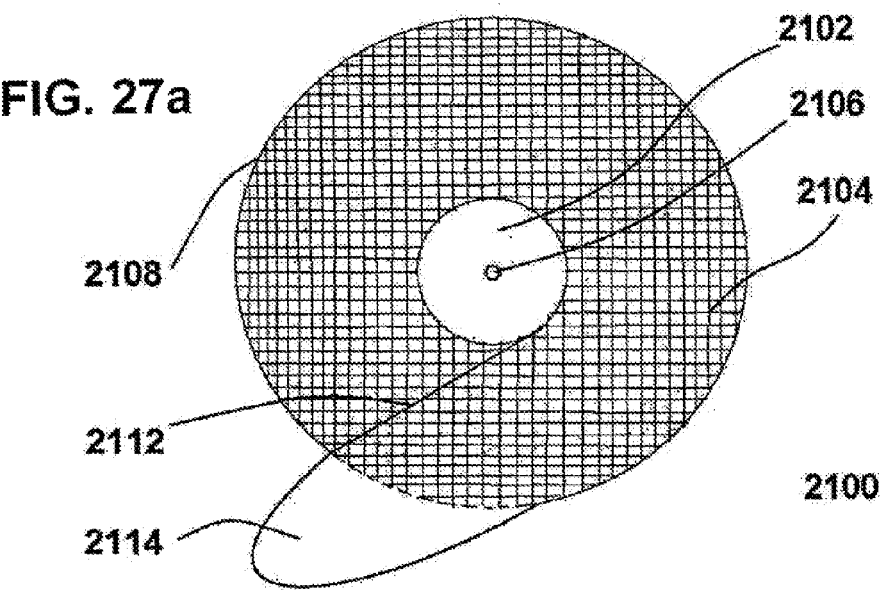
FIG. 27a is a vertical schematic view of a vibratory unit with deflector weir and pan for powder treatment of pellets.

The substantially dried pellets discharged from the dryer 1400 in FIG. 8 exit through pellet discharge chute 1460 to and through exit 1470 and optionally into and through pellet discharge chute extension 2040. These pellets optionally can be packaged, stored, transported or additionally processed as described hereinbelow in association with the post-packaging processing 2200 (FIGS. 2 and 3). Alternatively to this and the conventional coating technology heretofore described, the pellets can be introduced into a coating pan 2102, FIGS. 27*a* and 27*b*, which is fixedly attached by bolt 2106 to the sizing screen 2104, preferably centered, in an eccentric vibratory unit 2100. The design and mechanism of operation of an eccentric vibratory unit 2100 are well known to those skilled in the art. The coating pan 2102 preferably is diametrically smaller than the diameter of the sizing screen 2104, and is preferably one-half the diameter of the sizing screen 2104. The circumference of sizing screen 2104 is bounded by unit housing 2108. The coating pan 2104 is comprised of a solid circular base satisfying the heretofore described dimensional constraints with a circumferential wall at the edge of the base of at least approximately one inch (approximately 2.5 centimeters) such that the coating material is contained therein and such that the throughput volume of the pellets introduced from pellet outlet chute 1460 is confined for an appropriate time, at approximately five (5) seconds or less, and more preferably approximately two (2) seconds or less, allowing uniform coating of the pellets expedited by the vibration of the vibratory unit 2100. The screen 2104 composition can be of construction similarly described for screen assembly 1500 of at least one layer previously described herein. The unit is fittedly attached with cover 2120.

Figure 27B:
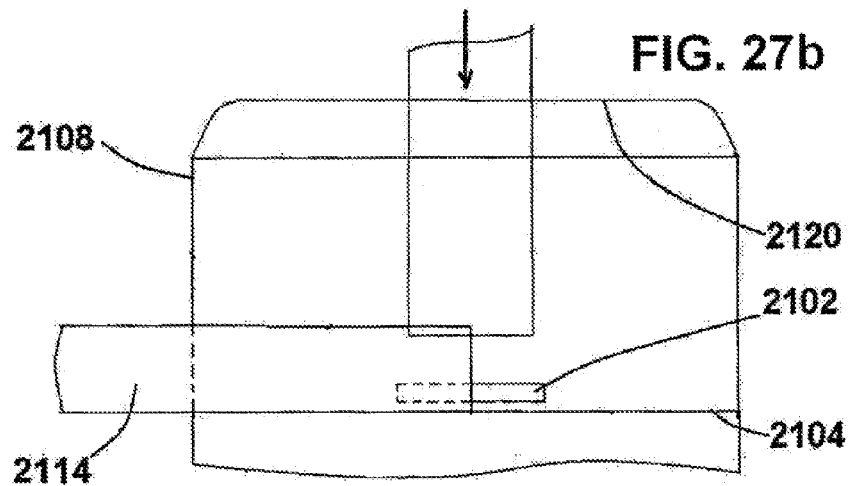
FIG. 27b is a side view illustration of a vibratory unit with deflector weir and pan for powder treatment of pellets.

The coated pellet ultimately is vibratably shaken from the coating pan 2102 onto sizing screen 2104 and circumnavigates the screen effectively removing excipient coating material that passes through the screen and is expelled from the apparatus through an outlet 2114, FIG. 27*b*. The coated pellet migrates about the screen until it encounters deflector weir 2112 that redirects the coated pellet through outlet 2114. Deflector weir 2112 is affixedly and tangentially attached to the wall of coating pan 2102 and distally to the unit housing 2108 adjacent to outlet 2114. Preferably the weir 2112 tapers in width from that equivalent to the wall height of the coating pan 2102 to at least two times that at the attachment point adjacent to the unit housing 2108.

Coatings can be applied to pellets to reduce or eliminate tack, to provide supplementary structural integrity to the pellet, to introduce additional chemical and/or physical properties, and to provide color and other esthetic enhancement. Exemplary of coating materials can be, but are not limited to, talc, carbon, graphite, fly ash, wax including microcrystalline, asphalt wax, detackifying agents, calcium carbonate, pigments, clay, wollastonite, minerals, inorganic salts, silica, siliceous minerals, cement, Portland cement, geopolymers, polymeric powders, organic powders, water-swellable clays, thermally expandable clays, thermally expandable graphite, and powdered aggregate and can be used singly and in many combinations. Preferably, the coating materials can be any of a multiplicity of material source A 40 to and including material source X 80 and/or materials derived via material A processing 41 to and including material source X processing 81. More preferably the coating material can be at least one fraction of any asphalt source and most preferably is at least one fraction of asphalt source 10 (FIGS. 2 and 3) that can be recombined with another fraction of asphalt source 10 as described above to achieve a free-flowing, non-tacky, pellet that does not cold flow and does not surface from compressive failure on packaging and storage.

Figure 28A:
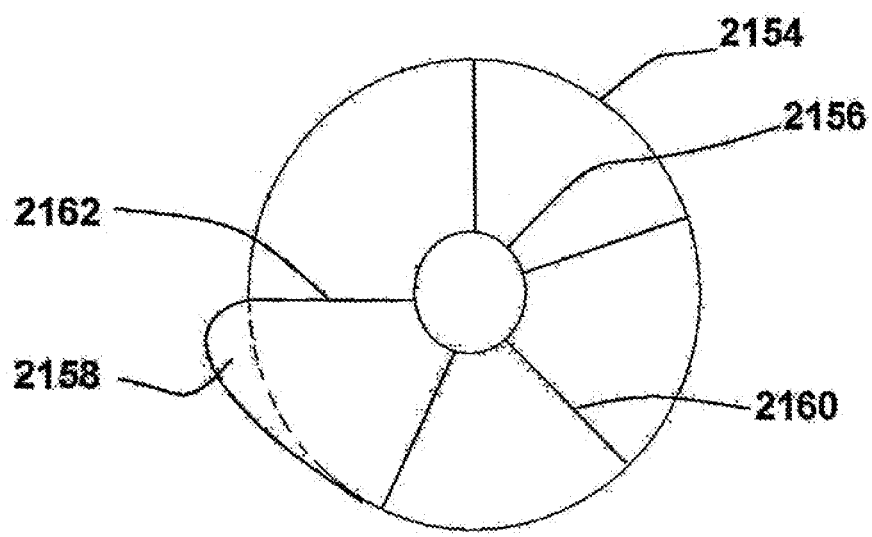
FIG. 28a is a vertical schematic view of a vibratory unit with deflector weir and retainer weirs for enhanced drying of pellets.
Figure 28B:
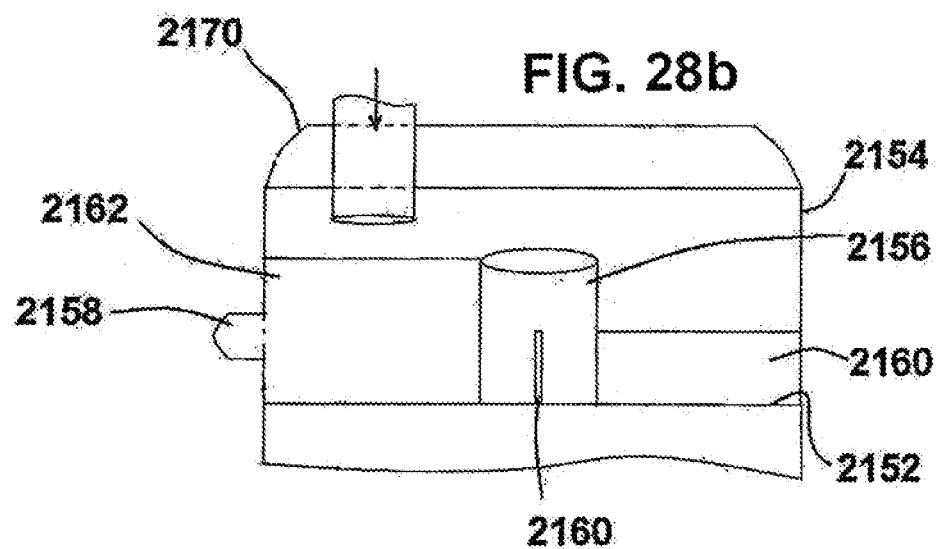
FIG. 28b is a side view illustration of a vibratory unit with deflector weir and retainer weirs for enhanced drying of pellets.

FIGS. 28*a* and 28*b* illustrate an alternative eccentric vibratory unit 2150 that can increase residence time allowing additional drying, cooling, solvent evaporation, and many combinations thereof. The unit 2150 comprises a solid plate 2152 circumferentially enclosed by and fixedly attached to the unit housing 2154. Centrally attached onto the solid plate 2152 is a cylindrical core 2156 to which are attachedly and perpendicularly connected at least one and, preferably, a plurality of weirs. Deflector weir 2162 is fixedly attached to the unit housing 2154 distally from the cylindrical core 2156 and adjacent to outlet 2158. Preferably at least one (1) retainer weir 2160 and more preferably at least two (2) retainer weirs 2160 are similarly attached to the cylindrical core 2156 and the unit housing 2154. Retainer weir or a plurality thereof are lower in height than is the deflector weir 2162 and preferably are one-half the height of the deflector weir 2156. Retainer weirs 2160 are circumferentially placed around the unit 2150 and can be positioned symmetrically, asymmetrically, or both. The unit is fittedly attached with cover 2170.

Pellets are fed into unit 2150 on the side of the deflector weir 2162 remote from outlet 2158. Movement of pellets occurs circumferentially about the unit 2150 until a retainer weir 2160 is encountered, if any, against which pellet volume accumulates until such volume exceeds the height of retainer weir 2160 and pellets fall over to migrate vibrationally therearound to the next retainer weir 2160 or deflector weir 2162 as determined by design of unit 2150. Upon encounter of the pellet and the deflector weir 2156, movement of the pellet is redirected to and through outlet 2158. The design and mechanism of operation of that eccentric vibratory unit 2150 are well known to those skilled in the art. Increasing the number of retainer weirs 2160 increases the volume of pellets allowed to accumulate, thusly increasing the residence time the pellets are retained by the eccentric vibratory unit 2150. Variance of the number and/or height of the retainer weirs 2160 can enhance the effective drying, cooling, and crystallization times for the pellets. On deflection to and through outlet 2158 the pellets can be transported to additional post-processing and/or storage as required.

The various embodiments of the present invention anticipate that other designs of eccentric vibratory units, oscillatory units, and their equivalent known to those skilled in the art can be used effectively to achieve comparable results as disclosed herein. Components of the assemblies for the eccentric vibratory units described herein can be metal, plastic or other durable composition and are preferably made of stainless steel, and most preferably are made of 304 stainless steel. The shape of the vibratory units in FIGS. 27*a*, 27*b*, 28*a*, and 28*b* may be round, oval, square, rectangular or other appropriate geometrical configuration and is not limited.

Referring again to FIGS. 27*a, b* and 28*a, b*, conventional surface treatments to reduce abrasion, erosion, corrosion, wear, and undesirable adhesion and sticture to many parts of vibratory units 2100 and 2150 can be nitrided, carbonitrided, sintered, can undergo high velocity air and fuel modified thermal treatments, and can be electrolytically plated. Other surface treatments for improvement of surface properties, enhancement of corrosion and abrasion resistance, improvement of wear, and/or reduction of clumping, agglomeration, and/or sticture can be used without intending to be limited.

Figure 29:
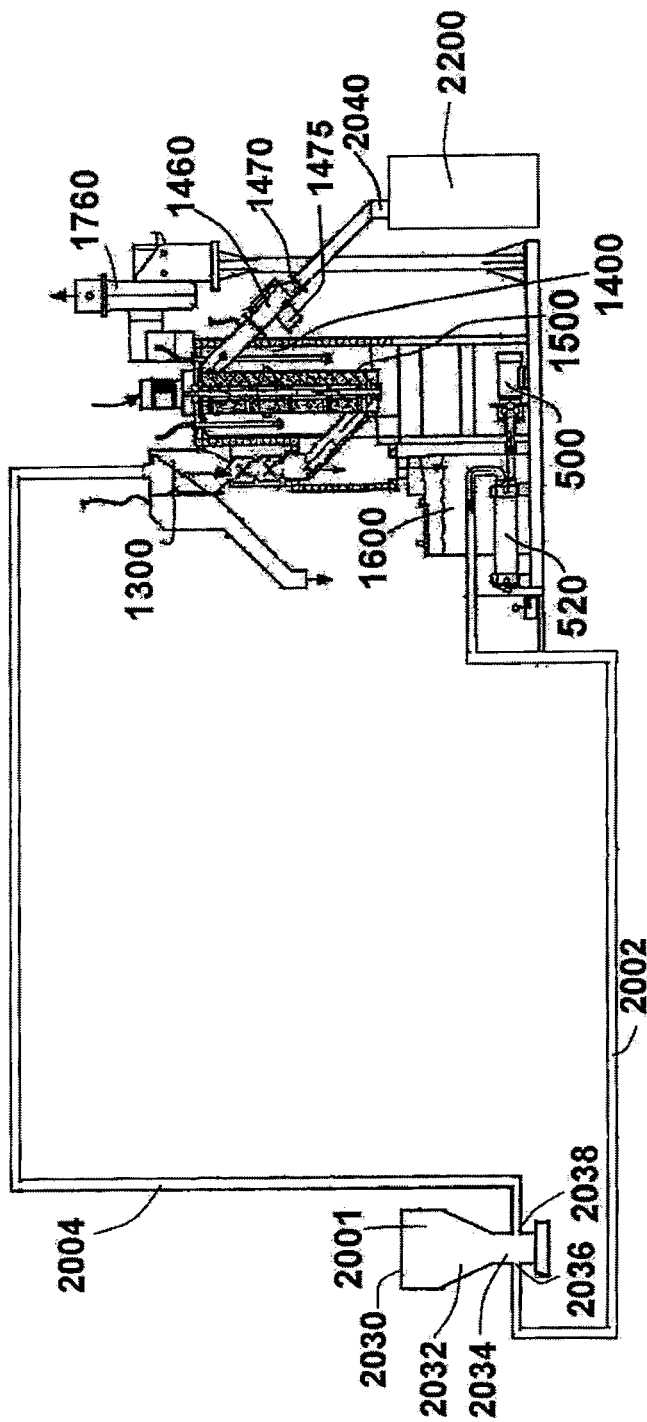
FIG. 29 is a schematic drawing illustration the split flow process including dryer.

Returning to FIG. 8, pellets discharged from dryer 1400 pass through pellet discharge chute 1460 and optionally can be deflected through exit 1475 as heretofore detailed or can pass through exit 1470 into and through pellet discharge chute extension 2040 separately positioned above and/or preferably attachedly connected to hopper or flow splitter 2001. Hopper or flow splitter 2001, as illustrated in FIG. 29, can be a metal or plastic square, round, rectangular, or other geometric configuration receiving device, without being limited, for the pellets which is of inlet 2030 diameter larger than the outside diameter of the pellet discharge chute extension 2040 to surroundingly encompass the outflow of pellets. From inlet 2030, the hopper or flow splitter 2001 taperingly decreases 2032 to chamber 2034 that can be geometrically similar or different than is inlet 2030. Hopper or flow splitter 2001 is preferably 18 gauge to 24 gauge metal and most preferably is 20 to 24 gauge in thickness. The metal can compositionally be aluminum, copper, steel, stainless steel, nickel steel alloy, or similarly non-reactive material inert to the components of the drying process. Preferably the metal is stainless steel and most preferably is Grade 304 or Grade 316 stainless steel as necessitated environmentally by the chemical processes undergoing the drying operation.

Additionally, conventional surface treatments to reduce abrasion, erosion, corrosion, wear, and undesirable adhesion and sticture can be applied to the inner surface (not shown) of hopper or flow splitter 2001 as well as any other component of the entire apparatus as described herein. The component to be treated can be nitrided, carbonitrided, sintered, can undergo high velocity air and fuel modified thermal treatments, and can be electrolytically plated. Additionally, flame spray, thermal spray, plasma treatment, electroless nickel dispersion treatments, and electrolytic plasma treatments, singly and in combinations thereof, can be applied wherein these treatments metallize the surface, preferably fixedly attach metal nitrides to the surface, more preferably fixedly attach metal carbides and metal carbonitrides to the surface, even more preferably fixedly attach diamond-like carbon to the surface, still more preferably attach diamond-like carbon in an abrasion-resistant metal matrix to the surface, and most preferably attach diamond-like carbon in a metal carbide matrix to the surface. Other ceramic materials can be used and are included herein by way of reference without intending to be limited.

Preferred surface treatments of this embodiment of the present invention can be further modified by application of a polymeric coating on the surface distal from the component substrate to reduce pellet adhesion, sticture, accumulation, and agglomeration to limit or prevent obstruction and blockage of the passageways. Preferably, the polymeric coatings are themselves non-adhesive and of low coefficient of friction. More preferably, the polymeric coatings are silicones, fluoropolymers, and combinations thereof. Most preferably, the application of the polymeric coatings requires minimal to no heating to effect drying and/or curing. The methods or application and benefits provided by these treatments for these components follow from those previously described herein.

Surface treatments as described herein can involve at least one, preferably two, and optionally multiple processes inclusive and exemplary of which are cleaning, degreasing, etching, primer coating, roughening, grit-blasting, sand-blasting, peening, pickling, acid-wash, base-wash, nitriding, carbonitriding, electroplating, electroless plating, flame spraying including high velocity applications, thermal spraying, plasma spraying, sintering, dip coating, powder coating, vacuum deposition, chemical vapor deposition, physical vapor deposition, sputtering techniques, spray coating, roll coating, rod coating, extrusion, rotational molding, slush molding, and reactive coatings utilizing thermal, radiational, and/or photoinitiation cure techniques, nitriding, carbonitriding, phosphating, and forming one or more layers thereon. The layers can be similar in composition, different in composition, and many combinations thereof in multiple layer configurations.

Materials applied utilizing these processes can include at least one of metals, inorganic salts, inorganic oxides, inorganic carbides, inorganic nitrides, inorganic carbonitrides, corrosion inhibitors, sacrificial electrodes, primers, conductors, optical reflectors, pigments, passivating agents, radiation modifiers, primers, topcoats, adhesives, and polymers including urethanes and fluorourethanes, polyolefins and substituted polyolefins, polyesters, polyamides, fluoropolymers, polycarbonates, polyacetals, polysulfides, polysulfones, polyamideimides, polyethers, polyetherketones, silicones, and the like without intending to be limited. The inorganic salts, inorganic oxides, inorganic carbides, inorganic nitrides, and inorganic carbonitrides are preferably metal salts, metal oxides, metal carbides, metal nitrides, and metal carbonitrides respectively.

As illustrated in FIG. 8 and detailed in FIG. 29, inlet pipe 2002 is attachedly connected to inlet 2036, optionally including a venturi or eductor, to introduce transport fluid to and through chamber 2034 to entrain the pellets into that transport fluid forming a pellet and liquid slurry passes through outlet 2038 into attachedly connected transport pipe 2004. The distal end of transport pipe 2004 can be attachedly connected to agglomerate catcher 1300 and centrifugal dryer 1400 as illustrated in FIG. 29 for additional drying or can be attached to the coating device illustrated in FIGS. 27a and b or can be attached to the vibratory drying unit illustrated in FIGS. 28a and b or the like. Transport fluid removed by the respective processes can be returned to the flow splitter 2001 via connection to inlet pipe 2002 in FIGS. 8 and 29.

The temperature of the transport fluid for pelletization 600 (FIGS. 1, 2, and 3) can be the same as or different than that of the split flow transport fluid introduced in the post-pelletization processing 800 (FIGS. 2 and 3). Similarly, the composition of the transport fluid for pelletization 600 can be the same as or different than that of the transport fluid in the post-pelletization processing 800. Additives including emulsions and dispersions can be the same or different in the two transport fluids. Transport fluids can be any material that is compatible with the asphalt pellets formed as described in association with the pelletization process 600 above. The transport fluids can be recycled as described as is or alternatively can be recovered and/or purified by methods known to those skilled in the art.

Once the material is dried as illustrated in FIGS. 1, 2, and 3, it is subjected to packaging 2000 such as in bags, canisters, drums, bulk bags, truck, railway car, ocean-going containers, ship, and the like. Wherein bags are employed alone as well as in liners for other containers, the bags can be at least one of removable, disposable, recyclable, and preferably the bags can be of compatible composition such that the contents including the bag can be used in subsequent post-packaging processing 2200 including use in applications. It is understood that the pellets contained in the bag are free-flowing and do not adhere to the bag preferentially and that the composition of the bag does not compromise the chemical and/or physical integrity of the pellets contained. As illustrated in FIG. 3, the packaging process 2000 can include combination of at least one of a multiplicity of material source A 40 to and including material source X 80 wherein the material sources can be modified respectively in accordance with material A processing 41 to and including material X processing 81. Thus the packaged material can be a mixture of pellets and other materials combinedly packaged such that it can be used in post-packaging processing 2200. As above, it is understood that the packaging material wherein a bag is utilized can be compatible with the contents of that bag as used in the post-packaging processing 2200.

Returning now to FIG. 1 by way of illustration, asphalt component 200 can be an asphalt wax, refined natural asphalt, high mineral-content asphalt, oxidized asphalt, pyrogenous asphalt, vacuum distilled asphalt, asphaltites, insoluble asphaltenes, and the like. The asphalt component 200 can be melted, if a solid, or cooled, if a liquid in the pre-pelletization processing 400 such that the molten or fluid material can undergo pelletization 600. The temperature achieved by the thermal modification, warming or cooling, is determined by achieving sufficient viscosity to pelletize the material underfluid and preferably underwater without wrapping the cutter hub or leading to freeze-off of the die. These materials then undergo drying 1000 wherein fluidized beds can be used for the more brittle materials and centrifugal drying can be used for the non-brittle materials, for example. Packaging 2000 of the pellets, preferably compatibly, provides a product that is ready for post-packaging processing 2200. These materials are particularly useful as additives or intermediates in other asphalt and/or adhesive formulations and pelletization and appropriate packaging facilitates improvement over current technologies wherein they must be broken up into useable fragments and/or melted prior to blending and use. Smaller pellet sizes are particularly beneficial in that the higher surface area presents a greater bulk density than coarse pellets or granules and as the pellet size decreases the pellet weight decreases and the effective surface area increases leading to faster admixture, melting and uniformity in the downstream applications. These materials produce freely-flowing pellets on packaging that do not cold flow at normal storage temperatures, are not tacky, and are not easily compressible on packaging and storage.

Natural asphalts such as Trimidad lake asphalt that contain high filler loading can also be pelletized in accordance with FIG. 1 but pellets tend to retain slight tack and suffer with long-term cold flow leading to agglomeration. Compression on packaging can also be problematic on long storage. Thus, a more practical process for Trimidad lake asphalt follows that of FIG. 2 wherein the material is removed from the asphalt source 10, a natural pitch lake, and transported to a vessel wherein the material is melted and maintained at a temperature sufficient fluid to allow excess moisture to volatilize and be removed. Agitation is optional as the migration of the gases being generated maintains slow admixture of the materials in the vessel. Excipient volatiles other than water can be removed at this stage as well. Thus the asphalt source processing 100 involves heating with devolatilization and molten material is coarse filtered to remove macrocontaminants. This filtered material can be subjected to additional heating and filtration, preferably pressurized filtration, to prepare asphalt component 200. A heated vessel, mixing apparatus with agitation, and/or an extruder, can be used for the asphalt source processing 100 and can be used singly and in serial combination.

The asphalt component 200 produced can be processed, preferably continuously in the pre-pelletization process 400 wherein the asphalt component is thermally modified to an appropriate viscosity for pelletization 600. The pre-pelletization process 400 can use a vessel or a mixing vessel with or without agitation from which the material is gravity fed or preferably pumped to and through a filter in preparation for pelletization 600. Alternatively, the asphalt component 200 is charged into an extruder, preferably continuously from the upstream processes and can be thermally modified, vented as required, and processed through a filter, preferably pumped through a screen-changer in preparation for pelletization 600. As above the processes can be performed in any combination individually or serially. Preferably, the asphalt source processing 100 and the pre-pelletization processing 400 are done serially and continuously. Thermal modification can involve heating, cooling, and combinations thereof.

Pelletization 600 is done underfluid, and preferably underwater and the resultant pellet/transport fluid slurry is pumped to a dewatering device for preliminary drying as part of the post-pelletization processing 800. Dewatering and drying can be achieved by vibratory separation in a counter-current air flow or alternatively in a centrifugal dryer wherein the transport fluid, preferably water, is maintain sufficiently cool to avoid adhesion to the upper walls of the dryer as well as prevent agglomeration of the pellets themselves. Presence of coarse filtration or an agglomerate catcher in the respective dewatering processes facilitates removal of any agglomerates should they form. The reduced moisture pellets are then coated with a binder layer, preferably an asphalt emulsion, by charging the pellets into a tumbler. From here the binder-coated pellets are immediately charged into a coating apparatus, preferably a tumbling device or a vibratory coater as disclosed hereinabove wherein a detackifying material, preferably a clay or siliceous powder, is fixedly bound to the binder. Final drying 1000 of the coated adhesive pellet can be done by ambient evaporation, careful use of infrared, and preferably by fluidized bed. As dust is a problematic issue it is preferable that the coating container and the conveying devices including the fluidized bed be enclosed. As before, free-flowing, non-tacky pellets are formed that can be packaged according to packaging 2000 for use, preferably compatibly, in downstream post-packaging processing 2200 and applications.

In FIG. 3, Trimidad lake asphalt is obtained from the lake asphalt source 10. This material can be separated according to asphalt source processing 100 into at least two phases and preferably more than two phases. This can be done by a sequence of solvent extractions such that the maltenes portion can be dissolved in an aliphatic solvent such as heptane, hexanes, and the like. The asphaltene portion can be extracted or dissolved in an organic solvent such as toluene or xylene, and the insolubles consisting predominantly of siliceous material and insoluble organic components can be removed by filtration. On concentration and recycling or recovery of the solvents, the residua can then be reused for later manipulations. The portions of the material extracted can be adjusted by use of a solution containing variable composition of aliphatic and aromatic to modify the components obtained. Increased organic character favors increase in the asphaltene portion of the extract whereas increased aliphatic character favors more maltene componency. Thus, fractioning by solvent extraction as illustrated above can lead to three components asphalt fraction A 12, asphalt fraction B 14, and asphalt fraction X 18, for example.

Analogously, Trimidad lake asphalt can be extracted with pentane to remove the most soluble components and the balance of the asphalt can be thermally separated to produce a pentane solution component, an organic melt component, and a filterable mineral component. More practically, the thermal separation can be performed without any prior solvent extraction leading to the organic melt and the filtered mineral components. Utilizing the organic melt component obtained continuously by the asphalt source processing 100 the molten material is charged into a mixing vessel, or preferably an extruder where the melt is slowly cooled to increase its viscosity according to pre-pelletization processing 400. The material is underfluid pelletized, preferably underwater pelletized (pelletization 600) and is passed through a tumble dryer wherein the mineral component now being added as a material source A 40 is re-added to the soft tacky material in the form of an external coating according to post-pelletization processing 800. Subsequent drying 1000 on a fluidized bed provides a solid pellet for packaging 2000 that is freely flowing, tack-free, minimally compressible under packaging and storage and is of the same chemical composition as the original asphalt source material 10 wherein no solvent extraction was performed. This packaged pellet, preferably compatibly packaged, can be used in combination with other asphalts for road applications and the like according to post-packaging processing 2200.

In another example, atmospherically and vacuum distilled petroleum residua as asphalt source 10 is combined with a small portion, approximately 5%, of high-boiling flux oil in asphalt source processing 100 to form a more fluid asphalt component 200. Trimidad lake asphalt is thermally separated wherein the lake asphalt as material source A 40 is thermally separated according to material A processing 140 such that the molten fraction is represented as material A fraction A 42 in FIG. 5 and the mineral content is material A fraction δ 44. According to pre-pelletization processing 400, FIG. 3, the material A fraction A 42 is combined with the petroleum residua and flux oil asphalt component 200 to form a molten fluid that undergoes pelletization 600. The transport fluid contains an aqueous asphalt emulsion produced from an oxidized asphalt as material X 80 as formed according to conventional emulsion-forming material X processing 81 that on underwater pelletization provides a coated pellet that is dewatered and charged into a tumble dryer wherein it is combined with the mineral content material A fraction δ 44 to form a coated pellet that can then undergo drying 1000 and subsequent packaging 2000 to form a freely flowing pellet that is not tacky and is not detrimentally compressible as packaged. The material produced can be used in post-packaging processing 2200 for road-making applications and the like as are known to those skilled in the art.

In a more advanced example according to FIG. 3, the following materials are prepared:

Trimidad lake asphalt source 10 is melted in a vessel and the water is evaporated as described above. This material is then thermally phase separated with filtration according to asphalt source processing 100 to form the molten asphalt fraction A 12 and the mineral component asphalt fraction B 14. Mineral component asphalt fraction B 14 is set aside for use in other applications.

Oxidized asphalt as material source A 40 is solvent separated using heptane according to material A processing 41 to form a solvent solution of maltenes as material A fraction A 42 and filtering results in an undissolved asphaltene material A fraction δ 44 according to FIG. 5. The solvent solution of maltenes as material A fraction A 42 is now mixed with a powdered limestone material source X 80 according to material X processing 81 with stirring.

The molten asphalt fraction A 12 is combined with the undissolved asphaltene material A fraction δ 44 in the pre-pelletization processing 400 by mixing in an extruder and the material undergoes underwater pelletization 600. The pellets formed are dewatered, atmospherically dried, and the reduced moisture pellets are then combined by tumbling with the solvent solution maltenes in combination with the limestone to form a coated pellet on evaporation of solvent according to post-pelletization processing 800. This pellet is now combined with unprocessed limestone (material source X 80) by additional tumbling to form a complete coated pellet suitable for packaging 2000. Alternatively, the pellet from the post-pelletization processing 800 can be combined with the unprocessed limestone in the package directly rather than as a coating such that the proportion of the powdered limestone is significantly greater than necessary for application as a coating. The packaged material can be blended with other binder and/or aggregate in road paving applications exemplarily according to post-packaging processing 2200.

In packaging the final product, asphalt pellets can be combined with pulverulent aggregate that contains small percentages, less than 0.5% of a moisture sensitive material such as certain fly ash such as class C fly ash, Portland cement, geopolymers including polysialates, polysialatedisiloxo geopolymers, and polysialatesilox geopolymers, and the like. Alternatively and/or additionally small asphalt pellets different from the main asphalt pellets and preferably such that the small asphalt pellets are slightly more tacky and prone to compressional deformation. These additions advantageously bind, though weakly, the aggregate pellet mixture to prevent undue shifting during transportation and storage of the materials without altering the proportions of the product as package and reversibly such that the product on application can be used as anticipated without hindrance.

Post-packaging processing 2200 and subsequent applications can include warm-mix asphalt, hot-mix asphalt, cold-mix asphalt, asphalt emulsions, asphalt dispersions, asphalt paint, asphalt coatings, water-proofing coatings, roofing formulations, roofing felt impregnation products, mastic, asphalt sealers, stone-mastic asphalt, asphalt cement or macadam (blends of asphalt with aggregate), sealants, adhesives, and the like.

As is obviated by the exemplary discussions, asphalt sources can readily be fractioned and combined with other materials, other asphalts, and other asphalt fractions. Preferably, the asphalt fractions can be recombined as is and/or modified, to maintain and improve the desirable composition qualities of the asphalt formulation. Thus the qualities of the asphalt pellet desired can be designed to optimize the properties such that the pellet produced for packaging is free-flowing, non-tacky, and not subject to detrimental compression and packaging and storage. The invention is illustrated by the foregoing examples which do not, however, limit its scope as set forth in the claims.

What is claimed is:

1. A method of forming one or more coated asphalt pellets from an original asphalt source material, the method comprising:
   asphalt source processing comprising separating out one or more individual components of a portion of the original asphalt source material;
   pre-pelletization processing comprising blending one or more of the individual components with another portion of the original asphalt source material to form a blended asphalt material;
   pelletizing the blended asphalt material to form uncoated pellets; and
   post-pelletization processing comprising coating the uncoated pellets with one or more of the individual components,
   wherein the coated pellets are free-flowing, non-tacky, not destructively alterable by compression on packaging and storage, and of similar composition to the original asphalt source material.

2. The method of claim 1, further comprising packaging the coated pellets.

3. The method of claim 2, wherein packaging the coated pellets comprises combining the coated pellets with a multiplicity of materials comprising other asphalts and other asphalt components.

4. The method of claim 2, wherein packaging the coated pellets comprises placing the coated pellets into one or more bags of compatible composition such that the bagged pellets and the one or more bags can be used in subsequent post-packaging processing.

5. The method of claim 1, wherein the asphalt source material comprises at least one of natural asphalt, petroleum asphalt, tars, pitches, pyrogenous asphalt, oxidized asphalt, chemically modified asphalt, polymer modified asphalt, fiber modified asphalt, reactive asphalt, asphalt obtained from tar sand, oil sand, oil shale, rock asphalt, and asphaltites, singly and in combinations thereof.

6. A method of forming one or more coated asphalt pellets from an original asphalt source material, the coated asphalt pellets being free flowing, relatively tack-free, and minimally compressible under packaging and storage, the method comprising:
   asphalt source processing comprising separating out one or more individual components of a portion of the original asphalt source material;
   pre-pelletization processing comprising blending one or more of the individual components with another portion of the original asphalt source material to form a blended asphalt material;
   pelletizing the blended asphalt material to form uncoated pellets; and
   post-pelletization processing comprising coating the uncoated pellets with one or more layers of the individual components.

7. The method of claim 6, wherein the one or more individual components comprises a plurality of individual components, and all of the individual components are recombined during at least one of the prepelletization processing and the post pelletization processing such that the coated pellets are of similar composition to the original asphalt source material.

8. The method of claim 6, wherein the one or more layers of the individual components is formed of at least one of an asphalt, a sealing layer, a hardening layer, and a detackifying layer.

9. The method of claim 6, wherein the one or more layers of the individual components comprises a binder layer and a coating layer.

10. The method of claim 9, wherein the binder layer is at least one of an emulsion, a dispersion, and an asphalt.

11. The method of claim 6, wherein the post-pelletization processing further comprises additionally coating the pellets with a layer of at least one of talc, carbon, graphite, fly ash, wax including microcrystalline, asphalt wax, detackifying agents, calcium carbonite, pigments, clay, wollastonite, minerals, inorganic salts, silica, siliceous materials, cement, Portland cement, geopolymers, polymeric powders, organic powders, water-swellable clays, thermally expandable clays, thermally expandable graphite, and powdered aggregate, used singly or in combination.

12. The method of claim 6, wherein the pre-pelletization processing further comprises combining a multiplicity of materials comprising other asphalts and other asphalt components.

13. The method of claim 6, further comprising packaging the coated pellets.

14. The method of claim 13, wherein packaging the coated pellets comprises combining the coated pellets with a multiplicity of materials comprising other asphalts and other asphalt components.

15. The method of claim 13, wherein packaging the coated pellets further comprises placing the coated pellets into one or more bags of compatible composition such that the bagged pellets and the one or more bags can be used in subsequent post-packaging processing.

16. The method of claim 6, wherein the pre-pelletization processing further comprises blending the blended asphalt material with one or more modifying materials comprising filler materials, fibers, asphalt components, oils, solvents, asphalt oils, waxes, asphalt waxes, polymers, compatibilizing agents, and asphaltites.

17. The method of claim 16, wherein the filler materials comprise at least one of talc, carbon, graphite, fly ash, wax including microcrystalline, asphalt wax, detackifying agents, calcium carbonate, pigments, clay, wollastonite, minerals, inorganic salts, silica, siliceous minerals, cement, Portland cement, geopolymers, polymeric powders, organic powders, water-swellable clays, thermally expandable clays, thermally expandable graphite, and powdered aggregate and are used singly and in combination.

18. The method of claim 16, wherein the fibers comprise at least one of natural fibers, synthetic fibers, cellulosic fibers, mineral fibers, polymeric fibers, nanofibers, siliceous fibers, metal fibers, and inorganic fibers.

19. The method of claim 16, wherein the polymers comprise at least one of olefinic, aralkenyl, vinylic, substituted vinylic, condensation polymers, polymeric resins, heteroatom polymers, functionally substituted polymers, and copolymers used singly and in combination.

20. The method of claim 6, wherein the asphalt source material comprises at least one of natural asphalt, petroleum asphalt, tars, pitches, pyrogenous asphalt, oxidized asphalt, chemically modified asphalt, polymer modified asphalt, fiber modified asphalt, reactive asphalt, asphalt obtained from tar sand, oil sand, oil shale, rock asphalt, and asphaltites, singly and in combinations thereof.

21. A method for pelletizing an asphalt component, the method comprising:
   separating an asphalt source into a plurality of fractions;
   blending at least two of the fractions of the asphalt source to form an asphalt component;
   subjecting the asphalt component to pre-pelletization processing comprising at least one of thermal modification, filtration, drying, devolatilization, solvent extraction, thermal extraction, phase separation, distillation, solvent deasphalting, fractioning, pyrolysis, mixing, blending, or visbreaking;
   pelletizing the asphalt component to form an asphalt component pellet;
   coating the uncoated asphalt component pellet with one or more of the plurality of fractions of the asphalt source; and
   drying and/or packaging the asphalt component pellet produced by pelletization, without further modification such that the packaged product is compatible for use in post-packaging processing including product applications.

22. The method of claim 21, further comprising subjecting the asphalt component pellet to post-pelletization processing comprising at least one of thermal modification, transport fluid exchange, filtration, drying, coating, singly and in combination.

23. The method of claim 22, wherein the asphalt component pellet produced by the post-pelletization processing is dried and packaged without further modification such that the packaged product is used in post-packaging processing including product applications.

24. The method of claim 22, wherein the post-pelletization processing comprises combining a multiplicity of materials comprising other asphalt components, and the other asphalt components undergo respective material modification that includes at least one of thermal modification, filtration, drying, devolatilization, solvent extraction, thermal extraction, phase separation, distillation, solvent deasphalting, fractioning, pyrolysis, mixing, blending, and visbreaking, singly and in combination.

25. The method of claim 22, wherein the post-packaging processing comprises combining a multiplicity of materials comprising other asphalt components, and the other asphalt components undergo respective material modification that includes at least one of thermal modification, filtration, drying, devolatilization, solvent extraction, thermal extraction, phase separation, distillation, solvent deasphalting, fractioning, pyrolysis, mixing, blending, and visbreaking, singly and in combination.

26. The method of claim 23, wherein the pre-pelletization processing, the post-pelletization processing, and the post-packaging processing is done singly, serially, in tandem, in parallel, and combinations thereof.

27. The method of claim 22, wherein at least two fractions of a single asphalt source separated into a multiplicity of fractions are recombined during at least one of the asphalt source processing, the pre-pelletization processing, the post-pelletization processing, the packaging, and the post-packaging processing, singly and in combinations thereof.

28. The method of claim 22, wherein all fractions of a single asphalt source separated into a multiplicity of fractions are recombined during at least one of the asphalt source processing, the pre-pelletization processing, the post-pelletization processing, the packaging, and the post-packaging processing, singly and in combinations thereof such that the pellet produced is free-flowing and non-tacky, is not subject to cold flow, and is not destructively altered by compression on packaging and storage and such that the composition of the asphalt source is not altered and such that the integrity of the pellet recombining the fractions is not the same as that of the pellet that is formed with the asphalt source material obtained directly.

29. The method of claim 22, wherein the post-pelletization processing includes coating the pellet formed with at least one layer.

* * * * *